United States Patent
Komatsu et al.

(10) Patent No.: US 9,195,066 B2
(45) Date of Patent: Nov. 24, 2015

(54) VIRTUAL IMAGE DISPLAY APPARATUS

(71) Applicant: SEIKO EPSON CORPORATION, Tokyo (JP)

(72) Inventors: Akira Komatsu, Tatsuno-machi (JP); Takashi Takeda, Suwa (JP); Takahiro Totani, Suwa (JP); Toshiaki Miyao, Matsumoto (JP); Masayuki Takagi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/471,447

(22) Filed: Aug. 28, 2014

(65) Prior Publication Data

US 2015/0061975 A1    Mar. 5, 2015

(30) Foreign Application Priority Data

Sep. 3, 2013   (JP) ................. 2013-182161
Dec. 20, 2013  (JP) ................. 2013-263479

(51) Int. Cl.
  *G02B 27/01*  (2006.01)
  *G02B 17/08*  (2006.01)

(52) U.S. Cl.
  CPC .......... *G02B 27/017* (2013.01); *G02B 27/0172* (2013.01); *G02B 17/086* (2013.01); *G02B 2027/015* (2013.01); *G02B 2027/0152* (2013.01); *G02B 2027/0178* (2013.01)

(58) Field of Classification Search
  CPC ............ G02B 27/017; G02B 27/0172; G02B 2027/015; G02B 2027/0152; G02B 2027/0178; G02B 17/086
  See application file for complete search history.

(56) References Cited

U.S. PATENT DOCUMENTS

| 5,453,877 A | 9/1995 | Gerbe et al. | |
| 7,944,616 B2 * | 5/2011 | Mukawa ............ | G02B 27/0176 359/630 |
| 2009/0009877 A1 * | 1/2009 | Inoguchi ............ | G02B 27/0172 359/630 |

FOREIGN PATENT DOCUMENTS

| JP | A-7-134264 | 5/1995 |
| JP | A-7-151993 | 6/1995 |
| JP | B2-2746697 | 5/1998 |

* cited by examiner

*Primary Examiner* — Abbas Abdulselam
(74) *Attorney, Agent, or Firm* — Oliff PLC

(57) ABSTRACT

A light guide member includes a plurality of non-axisymmetric curved surfaces, whereby a wide viewing angle and reduction in size and weight are achieved as the whole apparatus. A curved surface is formed such that a blur amount of video light on a position of an image surface of an intermediate image is greater (for example, greater than 10 times a blur amount on a position of an image surface of a video element). With this, even when there is a scratch, dust, or stain on the surface of the light guide member near the intermediate image or there is a contaminant or air bubble inside the light guide member, a situation in which the scratch or the like is enlarged and noticeable to degrade video quality is avoided, and high performance is achieved.

12 Claims, 25 Drawing Sheets

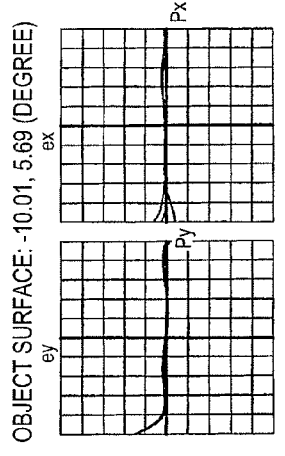
FIG. 9C
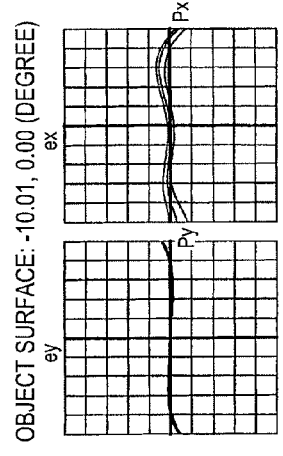
FIG. 9F
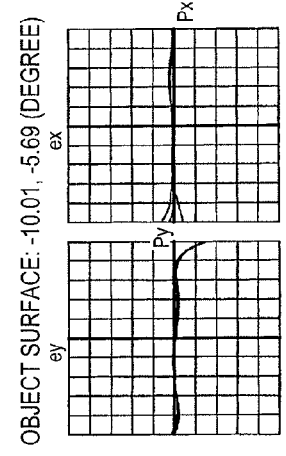
FIG. 9I
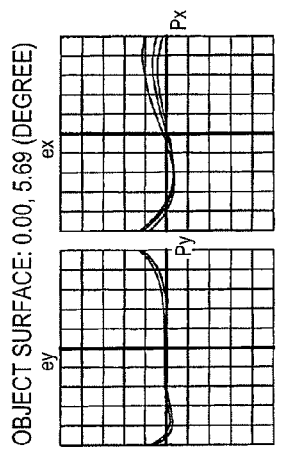
FIG. 9B
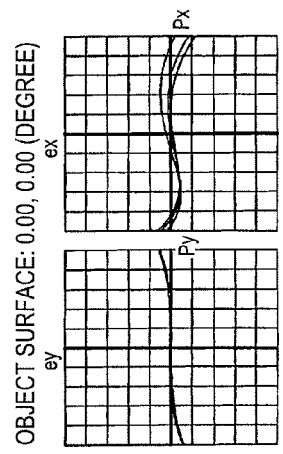
FIG. 9E
FIG. 9H
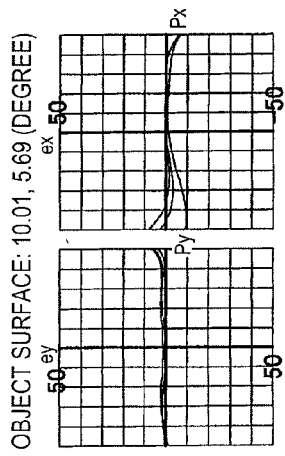
FIG. 9A
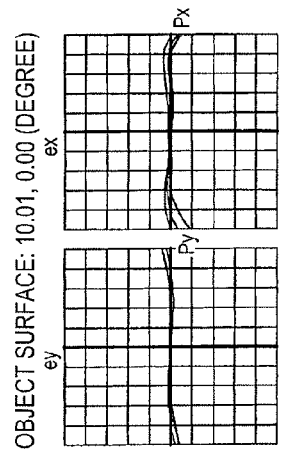
FIG. 9D
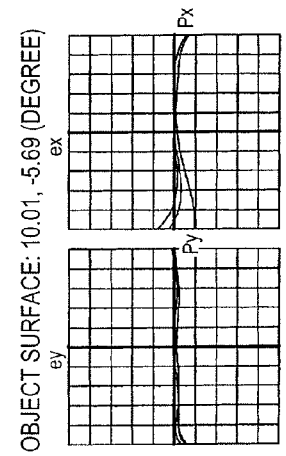
FIG. 9G

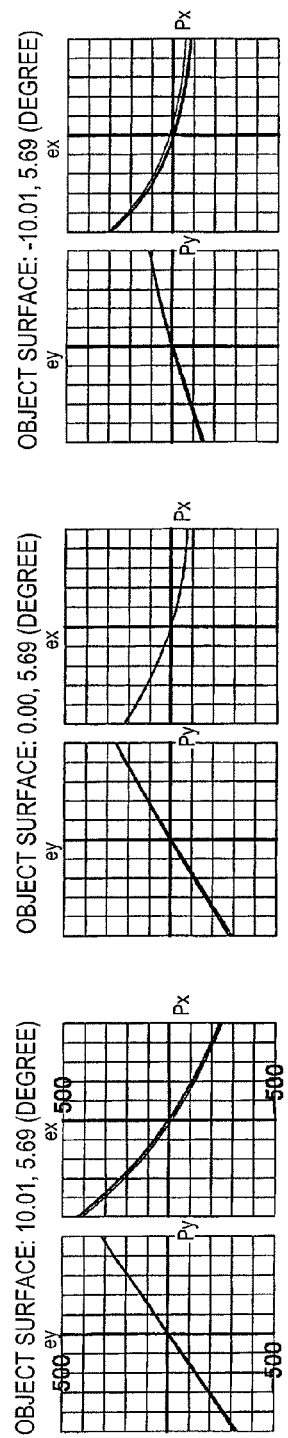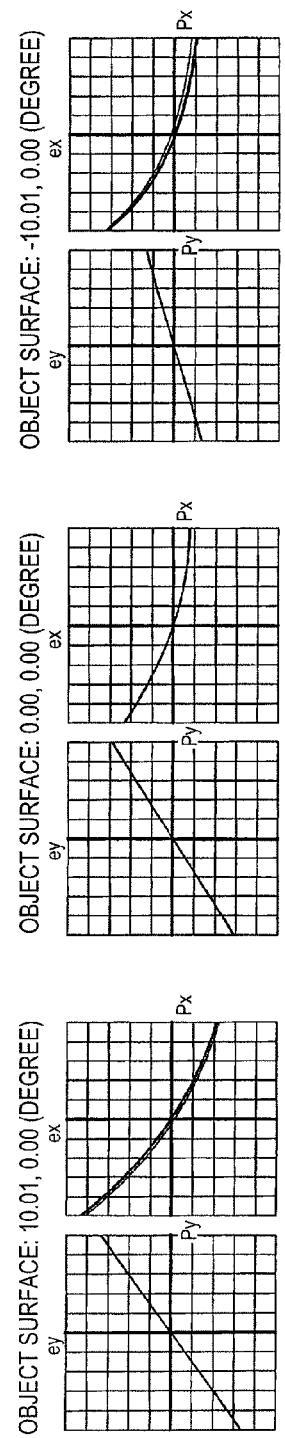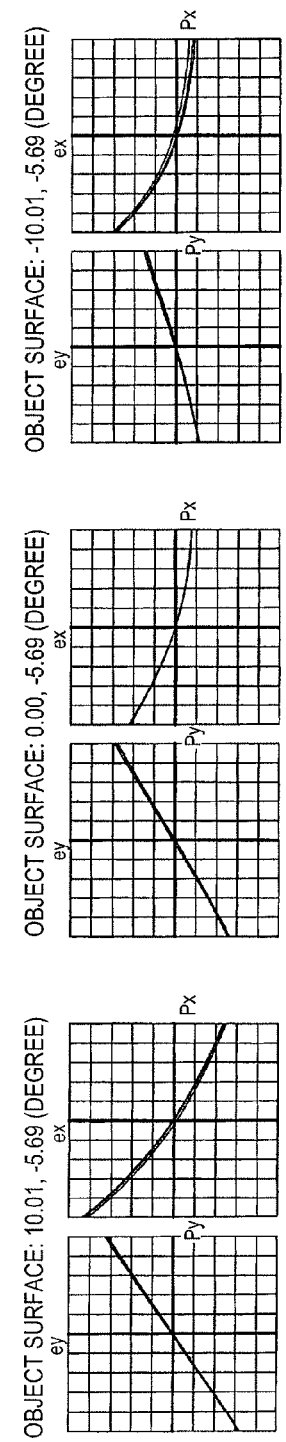

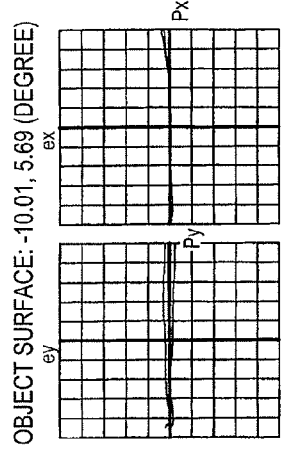
FIG.12C
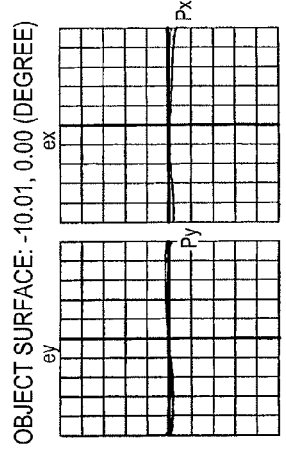
FIG.12F
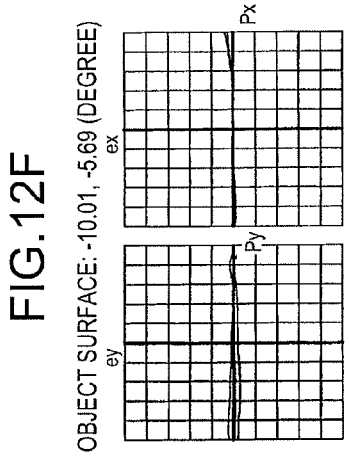
FIG.12I
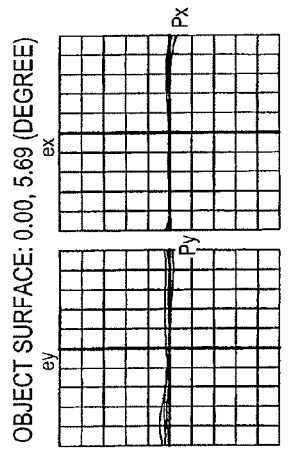
FIG.12B
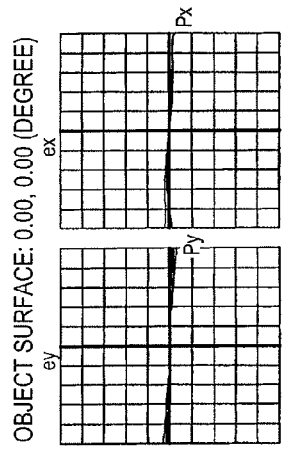
FIG.12E
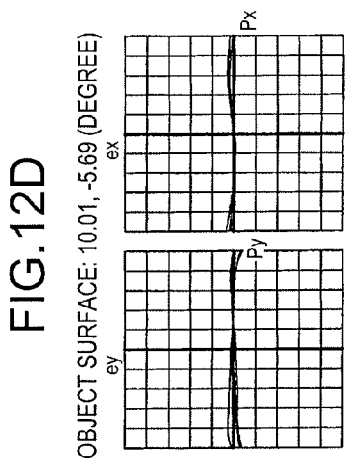
FIG.12H
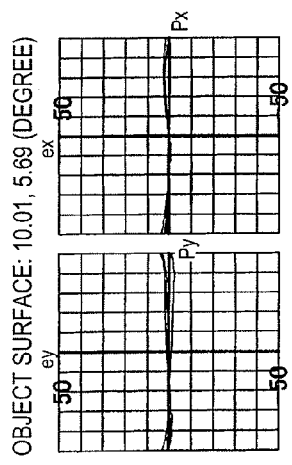
FIG.12A
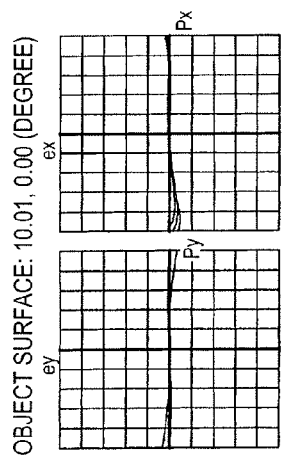
FIG.12D
FIG.12G

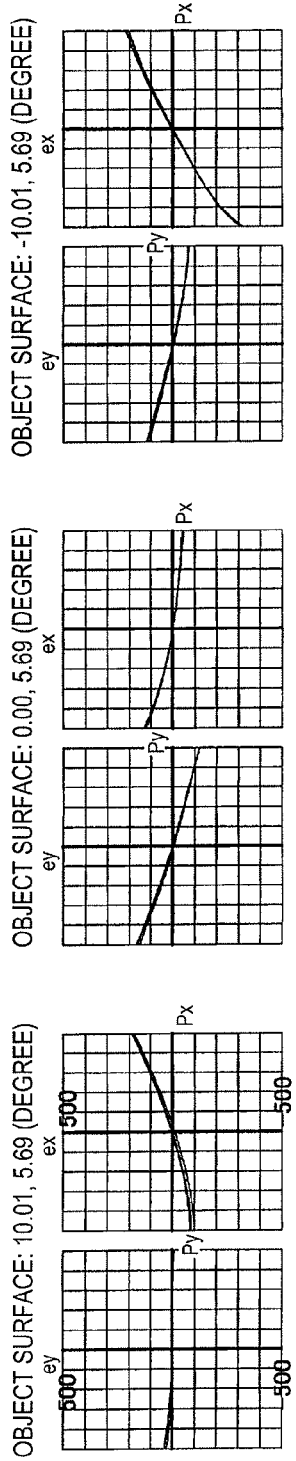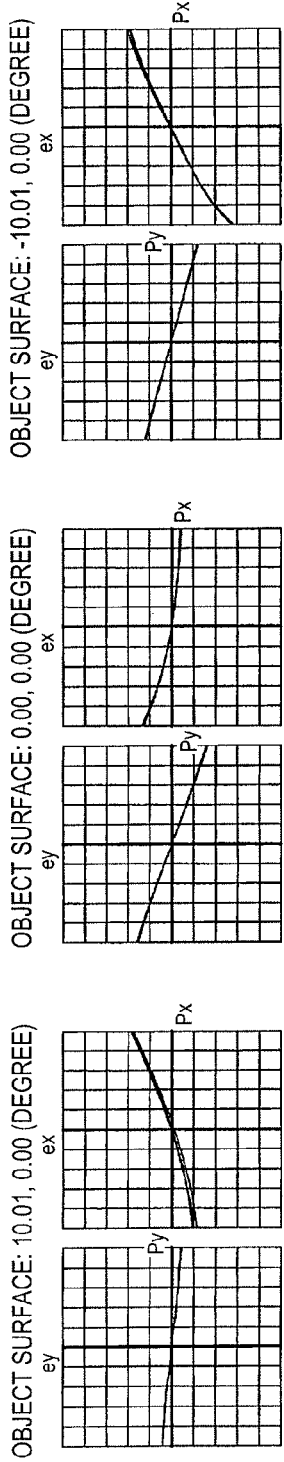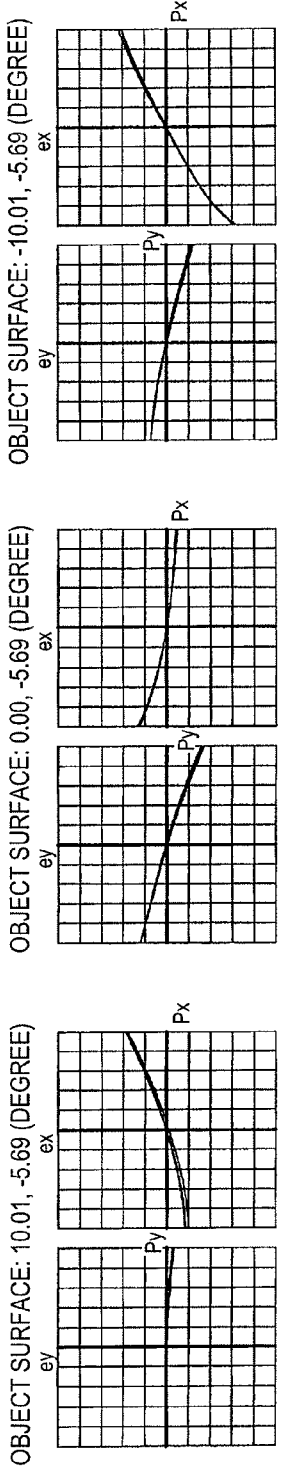

VIRTUAL IMAGE DISPLAY APPARATUS

CROSS-REFERENCE TO RELATED APPLICATIONS

The present application is a non-provisional application of Japanese Patent Application No. 2013-182161, filed on Sep. 3, 2013, and Japanese Patent Application No. 2013-263479, filed on Dec. 20, 2013, both of which are hereby incorporated by reference in their entireties.

BACKGROUND

1. Technical Field

Embodiments of the present invention relate to a virtual image display apparatus which provides video formed by an image display element or the like to an observer, and in particular, to a virtual image display apparatus which is suitable for a head-mounted display mounted to the head of the observer.

2. Related Art

Various optical systems have been proposed as an optical system which is assembled in a virtual image display apparatus, such as a head-mounted display (hereinafter, referred to as an HMD) mounted to the head of an observer (see JP-A-2-297516, JP-A-7-134264, and JP-A-7-151993).

In regard to the virtual image display apparatus, such as an HMD, it is desirable to enlarge a viewing angle of video light and to reduce the weight of the apparatus. In particular, in order to improve the fit, it is important to reduce the thickness in a visual axis direction of the observer and to bring the center of gravity close to the observer.

If the field of view of the observer is completely covered and thus only video light is viewed, an external scene is not noticed by the observer, causing uneasiness for the observer. Furthermore, the external scene and video are displayed in an overlapping manner, and accordingly various new usages, such as virtual reality, are produced. For this reason, there is a need for a display which displays video light in an overlapping manner without obstructing the field of view of the external scene.

In order to improve the fit for the observer and to improve the appearance of the form, it is desirable to arrange a video display device across the face, instead of being disposed above the eyes.

In order to reduce the size of the optical system and to position the video display device separately from the position of the eyes of the observer not to obstruct the field of view, it is preferable to image display image light on the optical system once to form an intermediate image, and a relay optical system which enlarges the intermediate image to be displayed.

However, when forming an intermediate image using a relay optical system, if there is a scratch, dust, or stain on the surface of an optical member near the intermediate image, since the scratch or the like is viewed on an enlarged scale for the observer, there is a problem in that video quality is significantly degraded. Even when an intermediate image is formed inside an optical member, such as a prism, if there is a contaminant or air bubble in the material of the optical member or discoloring or the like occurs locally in the optical member due to aging degradation, the contaminant or the like is enlarged, causing degradation in display quality.

For example, JP-A-2-297516 proposes a relay optical system which uses a parallel planar light guide plate, in which a parabolic mirror is provided at an end surface thereof, and a projection lens, and forms an intermediate image inside the light guide plate. However, in the case of the optical system of JP-A-2-297516, since the projection lens is large in size and heavy, the projection lens cannot be provided across the face, and the whole HMD increases in size. Since the intermediate image overlaps the surface of the light guide plate, a scratch or stain is displayed on an enlarged scale.

JP-A-7-134264 proposes an optical system which uses a relay lens optical system and is reduced in weight. In the case of this optical system, since an intermediate image is formed in a space between lenses, a contaminant or a scratch is unlikely to be viewed. However, in this optical system, a large half mirror and a concave mirror are required in front of the eyes of the observer, and the appearance is significantly damaged. The number of projection lenses is large, and the full length increases. In order to observe an external scene, since a concave mirror should be a half mirror, and video light is reflected by the half mirror two times and is further transmitted through the half mirror, video becomes very dark.

In order to reduce the size of the optical system, it is effective to reduce the width of a light beam flux (light flux) passing through the optical system. If a sufficient light beam flux is not provided at the position of the pupil of the observer, the visual field of video is lacking, and some person cannot observe video depending on an individual difference in pupillary distance. Considering this point, in JP-A-7-151993, a relay optical system is configured, and a diffusion plate is placed at the position of the intermediate image to diffuse a light beam, and accordingly the light beam flux width in the pupil is expanded. However, since an image on the diffusion plate is enlarged by an eyepiece lens system, a contaminant or a scratch on the diffusion plate is also enlarged, and there is a concern that video quality is damaged.

SUMMARY

An advantage of some aspects of the invention is to provide a small and lightweight virtual image display apparatus which has a wide viewing angle and high performance.

A virtual image display apparatus according to the first aspect of the invention includes a video element which generates video light, and a light guide member which includes two or more non-axisymmetric curved surfaces and is a part of an optical system, an intermediate image being formed inside the light guide member. The light guide member includes a first surface and a third surface that are arranged to face each other. Video light from the video element is totally reflected by the third surface, is totally reflected by the first surface, is reflected by the second surface, is transmitted through the first surface, reaches the eyes of an observer, and provides video to the observer. In this virtual image display apparatus, in regard to a light flux reversed with respect to an advancing direction of video light from a position of an incidence pupil to be assumed as a position where the eyes of the observer are arranged toward an arbitrary point of the virtual image, the spreading width of the light flux at each position within a whole range excluding the vicinity of the video element is greater than the spreading width of the light flux on the video element. In this specification, the light flux means a group of light beams (light beam flux).

Here, video light is light which is formed by the video element or the like and can be recognized as a virtual image to the eyes, and as described above, forms an intermediate image inside the light guide member. It is assumed that the spreading width of the light flux is specified based on a result of tracking a light beam reversed from the incidence pupil with respect to the advancement of video light and calculating the distribution of the degree of spreading on each surface of the light beam. In regard to the light flux reversed with respect to the advancement of video light, the whole range excluding the vicinity of the video element means a portion on the video element where the spreading width of the light flux is rapidly narrowed or a portion other than a vicinal portion. For example, the whole range refers to a whole range in which the light flux passes in the light guide member, or if an optical system, such as a projection lens, is provided between the light guide member and the video element, the whole range refers to a whole range in which the light flux passes in a part of the projection lens along with the light guide member. Here, it may be assumed that the two or more non-axisymmetric curved surfaces in the light guide member are not intended to indicate specific surfaces, and for example, the first surface or the third surface may be a non-axisymmetric curved surface or may be a flat surface.

In the image display apparatus described above, the intermediate image is formed inside the light guide member by the optical system or the like, and video light which is reflected in order of the third surface, the first surface, and the second surface is transmitted through the first surface and reaches the observer. For this reason, it is possible to realize high-performance display with a wide viewing angle while reducing the thickness of the light guide member to reduce the size and weight of the entire optical system. The spreading width of the light flux at a location other than the vicinity of the video element is greater than the spreading width of the light flux in the vicinity of the video element. With this, for example, even when there is a scratch, dust, or stain on the surface of the light guide member near the intermediate image, or there is a contaminant or air bubble inside the light guide member, it is possible to avoid a situation in which the scratch or the like is enlarged and noticeable, causing degradation in video quality.

In another aspect of the invention, the light guide member causes video light and external light to be visually recognized, and when the external scene is visually recognized through the first surface and the third surface, diopter substantially becomes 0. With this, it is possible to reduce defocusing or distortion of external light when observing external light in a see-through manner.

In still another aspect of the invention, when making a light beam reversed from the advancement of video light enter from the position of the incidence pupil and evaluating the spreading of a light flux imaged on the video element, if the spreading width W of the light flux on a surface at an arbitrary position orthogonal to an optical axis is given by the following expressions at positions $(x_1, y_1)$, $(x_2, y_2)$, ..., and $(x_n, y_n)$ on each image surface of n light beams reversely tracked from the position of the incidence pupil, $$W = \sqrt{\frac{1}{n}\sum_{i=1}^{n}\{(x_i - \tilde{x})^2 + (y_i - \tilde{y})^2\}}$$

$$\tilde{x} = \frac{1}{n}\sum_{i=1}^{n} x_i, \; \tilde{y} = \frac{1}{n}\sum_{i=1}^{n} y_i$$

the spreading width Wa of the light flux at each position within the whole range excluding the vicinity of the video element and the spreading width Wb of the light flux on the position of the image surface of the video element have the following relationship within a whole viewing angle range.

$$10 Wb < Wa$$

In this case, it is possible to suppress image deterioration due to the occurrence of a contaminant or air bubble in the whole light guide member.

In yet another aspect of the invention, the video element is a video display element which has a plurality of pixels, and the spreading width on the position of the image surface of the video element has a value corresponding to the size of the pixel.

In still yet another aspect of the invention, when an expression of a surface shape is expanded as a polynomial in terms of orthogonal coordinates x and y extending in a tangential direction from the origin with the origin of each surface constituting the optical system as a reference, and the coefficient of a term $x^m \cdot y^n$ of a polynomial expression representing a k-th surface is $Ak_{m,n}$, the following conditions of (1) to (3) are satisfied.

$$-10^{-1} < A1_{0,2} + A1_{2,0} < 10^{-2} \quad \text{and} \quad -10^{-1} < A3_{0,2} + A3_{2,0} < 10^{-2} \tag{1}$$

$$|A1_{2,0} - A1_{0,2}| < 10^{-1} \text{ and } |A3_{2,0} - A3_{0,2}| < 10^{-1} \tag{2}$$

$$|A1_{2,0} - A3_{2,0}| < 10^{-2} \text{ and } |A1_{0,2} - A3_{0,2}| < 10^{-2} \tag{3}$$

Here, a local coordinate (x,y,z) including the orthogonal coordinates x and y of each surface has a certain point on the surface as an origin, the z axis is in a direction normal to the surface, the x axis and the y axis are in a tangential direction of the surface, and the curved surface shape is specified in the local coordinate. It is assumed that the origin of the curved surface is, for example, a position through which the center of a light flux passes.

In this case, an aspheric surface is used in the light guide member, and the degree of freedom of the curved surface shape is effectively used to succeed in obtaining a high image quality optical system. The characteristic of the action of the curved surface is basically the curvature of the curved surface, and the curvature near the origin is primarily determined by the values of the coefficients $Ak_{2,0}$ and $Ak_{0,2}$ (where k=1, 3). For this reason, it is important to appropriately set the values of the coefficients $Ak_{2,0}$ and $Ak_{0,2}$.

The condition (1) specifies the magnitude of the mean curvature of the first surface and the mean curvature of the third surface near the origin. If the magnitude exceeds an upper limit of the condition (1), the first surface and the third surface have a convex shape to the observer, and accordingly, the whole shape increases and aberration correction is difficult. If the magnitude exceeds a lower limit of the condition (1), the curvature is excessively enhanced, aberration correction is not easily performed, and the position of the light guide member becomes close to the face, causing damage to the fit.

The condition (2) specifies the difference between the curvature in the x-axis direction and the curvature in the y-axis direction of the first surface and the third surface. If the difference exceeds an upper limit of the condition (2), astigmatism which is generated in the first surface and the third surface excessively increases, and aberration correction is difficult.

The condition (3) specifies the difference between the curvature of the first surface and the curvature of the third surface relating to the x-axis direction and the y-axis direction, and affects the diopter of the light guide member to external light. If the thickness of the light guide member is T and the refractive index is N, the diopter Dx in the x-axis direction and the diopter Dy in the y-axis direction on the optical axis of the light guide member are given by the following expressions.

$$Dx = 2000(N-1)(A1_{2,0} - A3_{2,0}) + (2T(N-1)/N) \times A1_{2,0} \times A3_{2,0})$$

$$Dy = 2000(N-1)(A1_{0,2} - A3_{0,2}) + (2T(N-1)/N) \times A1_{0,2} \times A3_{0,2})$$

In general, if an error of far diopter exceeds ±1D, displeasure is caused, thus, it is desirable that the diopter of the light guide member is suppressed within a range of ±1D.

The first surface and the third surface have the shape satisfying the conditions (1) to (3), whereby aberration correction of both external light and video light are performed satisfactorily and excellent image quality can be obtained.

In further another aspect of the invention, a half mirror is formed on the second surface, video light is provided to an observer, a light transmission member is arranged integrally outside the second surface, diopter to external light is substantially set to 0, and external light and video light are provided to the observer in an overlapping manner. In this case, it is possible to reduce defocusing or distortion of external light when observing beyond the second surface.

In still further another aspect of the invention, the virtual image display apparatus further includes a projection lens which makes video light from the video element enter the light guide member, in which at least a part of the light guide member and the projection lens constitute a relay optical system which forms an intermediate image.

In yet further another aspect of the invention, the video image display apparatus further includes a projection lens which makes video light from the video element enter the light guide member, in which the projection lens is constituted by an axisymmetric lens and includes at least one aspheric surface.

In still yet further another aspect of the invention, the video image display apparatus further includes a projection lens which makes video light from the video element enter the light guide member, in which the projection lens includes at least one non-asymmetric aspheric surface. In this case, in addition to the light guide member, a function of correcting non-axisymmetric aberration can be provided in the projection lens.

In a further aspect of the invention, the optical system including the light guide member covers a part in front of the eyes of the observer, and a portion where the front of the eyes is not covered is provided.

In a still further aspect of the invention, the video element has a signal light forming unit which emits signal light modulated corresponding to an image, and a scanning optical system which scans signal light entering from the signal light forming unit to emit signal light as scanning light.

A virtual image display apparatus according to a second aspect of the invention includes a video element which generates video light, and a light guide member which includes two or more non-axisymmetric curved surfaces and is a part of an optical system, an intermediate image being formed inside the light guide member. The light guide member includes a first surface and a third surface that are arranged to face each other. Video light from the video element is totally reflected by the third surface, is totally reflected by the first surface, is reflected by the second surface, is transmitted through the first surface, and reaches an observation side, a first condensing position where video light is most condensed in an optical axis direction when the light flux of video light is cut in a first direction which is one of directions along an optical axis direction and a second condensing position where video light is most condensed in an optical axis direction when cut in a second direction orthogonal to the first direction are separated from a position relating to the optical axis direction of the image surface of the intermediate image, and the length of the distance between the first condensing position to the second condensing position is greater than the total length of the width of the light flux relating to the first direction at the first condensing position and the width of the light flux relating to the second direction at the second condensing position.

In the virtual image display apparatus described above, the first condensing position where video light is most condensed in the first direction and the second condensing position where video light is most condensed in the second direction are separated from the position of the image surface of the intermediate image representatively specified among the positions having a high degree of condensing at a sufficient distance from each other. This corresponds to the occurrence of a so-called astigmatic difference. In this case, as a result, a configuration is made in which the spreading of the light flux on the position of the intermediate image is present to some extent, and for example, even when there is a scratch, dust, or stain on the surface of the light guide member near the intermediate image or there is a contaminant or air bubble inside the light guide member, it is possible to avoid a situation in which the scratch or the like is enlarged and noticeable, causing degradation in video quality.

A virtual image display apparatus according to a second aspect of the invention includes a video element and a light guide member configured to form an intermediate image therein. The virtual image display apparatus includes a first surface and a third surface arranged with the first surface so that the first and third surfaces face each other. The video element generates light that is reflected by the third surface, is reflected by the first surface, is reflected by a second surface, is transmitted through the first surface, and then reaches an observation side. When a light flux is reversed with respect to an advancing direction of light from a position of an incidence pupil, a spreading width of the light flux at each position within the light guide member is greater than a spreading width of the light flux on the video element.

BRIEF DESCRIPTION OF THE DRAWINGS

The invention will be described with reference to the accompanying drawings, wherein like numbers reference like elements.

FIGS. 9A to 9I are diagrams illustrating aberration on a reference position of a video element in the optical system of Example 1.

FIGS. 10A, 10B, 10C, 10D, 10E, 10F, 10G, 10H, and 10I are diagrams illustrating aberration on a position of an intermediate image in the optical system of Example 1.

FIGS. 12A, 12B, 12C, 12D, 12E, 12F, 12G, 12H, and 12I are diagrams illustrating an aberration on a reference position of a video element in the optical system of Example 2.

FIGS. 16A, 16B, 16C, 16D, 16E, 16F, 16G, 16H, and 16I are diagrams illustrating an aberration on a position of an intermediate image in the optical system of Example 3.

DESCRIPTION OF EXEMPLARY EMBODIMENTS

Hereinafter, an embodiment of a virtual image display apparatus according to the invention will be described in detail referring to FIG. 1 and the like.

Figure 1:
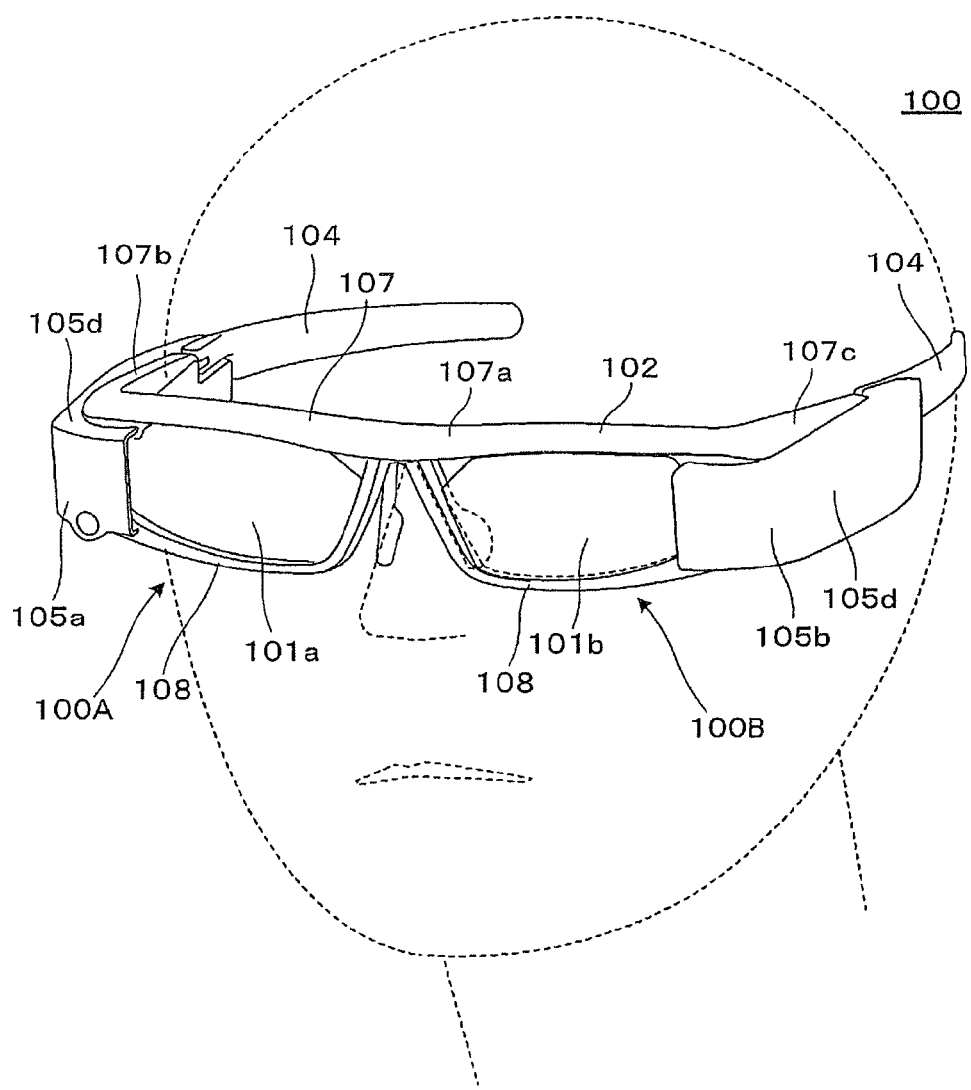
FIG. 1 is a perspective view illustrating the appearance of a virtual image display apparatus according to an embodiment of the invention.

As shown in FIG. 1, a virtual image display apparatus 100 of this embodiment is a head-mounted display which has an appearance like glasses, and can allow an observer or a user who mounts the virtual image display apparatus 100 to visually recognize image light by a virtual image and allow the observer to visually recognize or observe an external scene image in a see-through manner. The virtual image display apparatus 100 includes first and second optical members 101a and 101b which cover the front of the eyes of the observer in a see-through manner, a frame part 102 which supports both optical members 101a and 101b, and first and second image forming body parts 105a and 105b which are attached to portions from both of left and right ends of the frame part 102 to rear temple parts (temples) 104. A first display device 100A in which the first optical member 101a and the first image forming body part 105a on the left side of the drawing are combined is a part which forms a virtual image for a right eye, and functions as a virtual image display apparatus singly. A second display device 100B in which the second optical member 101b and the second image forming body part 105b on the right side of the drawing are combined is a part which forms a virtual image for a left eye, and functions as a virtual image display apparatus singly.

Figure 2A:
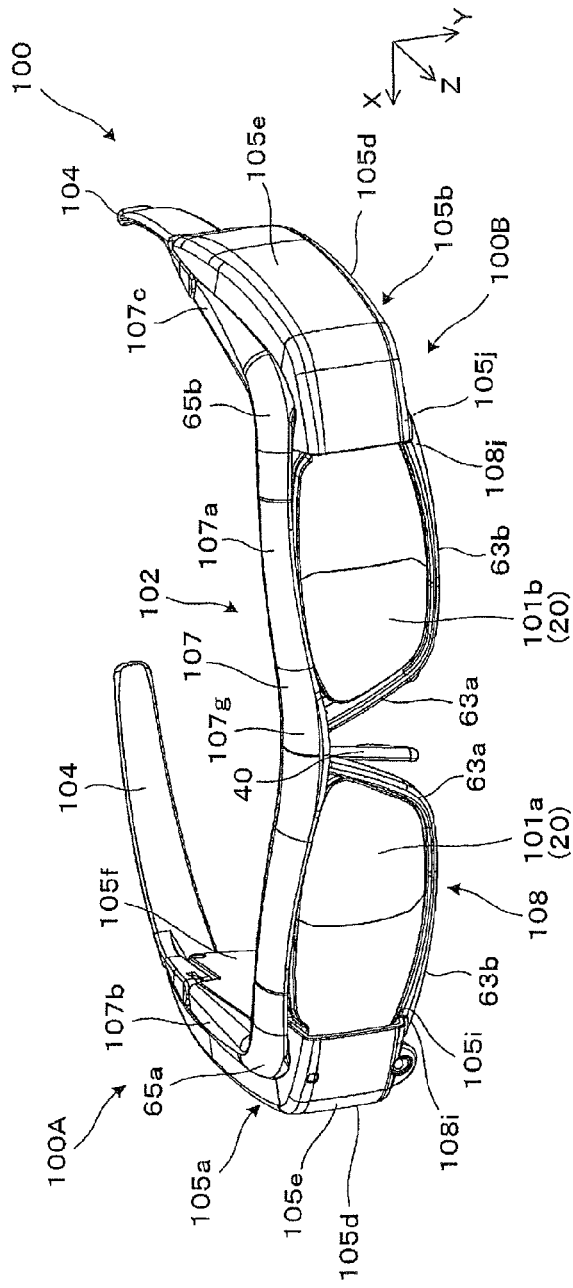
FIG. 2A is an appearance perspective view of the virtual image display apparatus of FIG. 1.
Figure 2B:
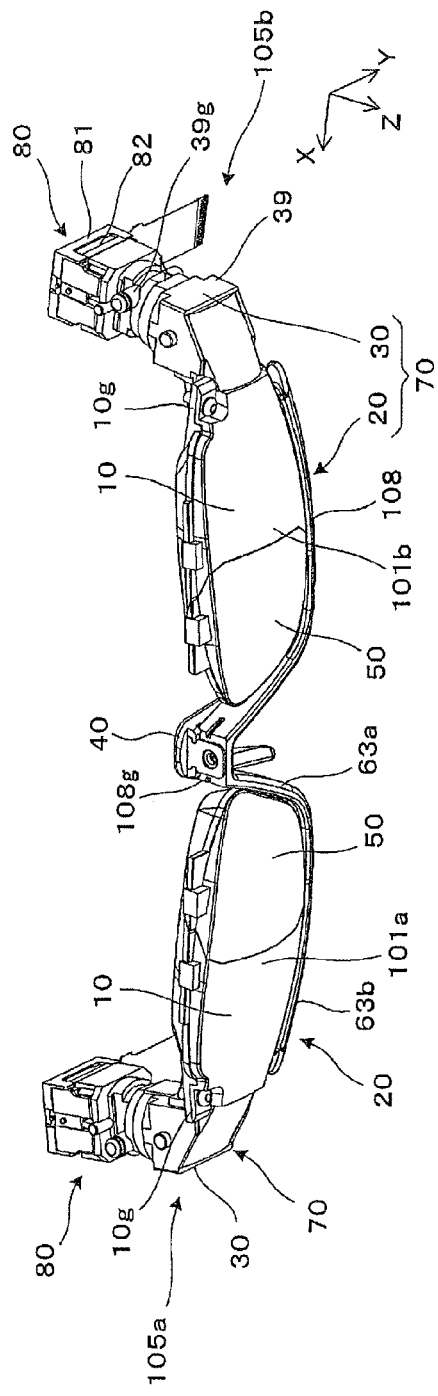
FIG. 2B is a perspective view showing an internal structure in which a frame or an exterior member is removed from the virtual image display apparatus of FIG. 1.

FIG. 2A is a perspective view illustrating the appearance of a front side of the virtual image display apparatus 100, and FIG. 2B is a perspective view of the front side when the virtual image display apparatus 100 is partially disassembled.

As shown in the drawing, the frame part 102 provided in the virtual image display apparatus 100 includes a frame 107 which is arranged on an upper side, and a protector 108 which is arranged on a lower side. In the frame part 102, the frame 107 on the upper side shown in FIG. 2A is an elongated sheet-like member which is bent in a U shape within an XZ plane, and includes a front portion 107a which extends in a right-left horizontal direction (X direction), and a pair of side portions 107b and 107c which extend in a front-back depth direction (Z direction). The frame 107, that is, the front portion 107a and the side portions 107b and 107c are a metal integral component formed of aluminum die casting or various metal materials. The width in the depth direction (Z direction) of the front portion 107a is sufficiently greater than the thickness or width of the light guide device 20 corresponding to the first and second optical members 101a and 101b. On the left side of the frame 107, specifically, in a lateral end portion 65a which is a portion from a left end portion in the front portion 107a to the side portion 107b, the first optical member 101a and the first image forming body part 105a are aligned and directly fixed by screws to be thus supported. On the right side of the frame 107, specifically, in a lateral end portion 65b which is a portion from a right end portion in the front portion 107a to the side portion 107c, the second optical member 101b and the second image forming body part 105b are aligned and directly fixed by screws to be thus supported. The first optical member 101a and the first image forming body part 105a are aligned with each other by fitting, and the second optical member 101b and the second image forming body part 105b are aligned with each other by fitting.

The protector 108 shown in FIGS. 2A and 2B is an under rim-like member, and is arranged and fixed below the frame 107 shown in FIG. 2A. A central portion 108g of the protector 108 is fitted and fixed to a central portion 107g of the frame 107 by screws. The protector 108 is an elongated sheet-like member which is bent in a two-stage crank shape, and is integrally formed of a metal material or a resin material. A first distal end portion 108i of the protector 108 is fixed in a state of being fitted into a concave portion 105i provided in an external member 105e of a cover-like exterior member 105d covering the first image forming body part 105a. A second distal end portion 108j of the protector 108 is fixed in a state of being fitted into a concave portion 105*j* provided in an external member 105*e* of an exterior member 105*d* covering the second image forming body part 105*b*.

The frame 107 plays a part in not only supporting the first and second image forming body parts 105*a* and 105*b* but also protecting the inside of the first and second image forming body parts 105*a* and 105*b* in corporation with the exterior member 105*d*. The frame 107 and the protector 108 are separated from or is in loose contact with an elliptical peripheral portion of the light guide device 20 excluding the root side connected to the first and second image forming body parts 105*a* and 105*b*. For this reason, even if there is a difference in coefficient of thermal expansion between the central light guide device 20 and the frame part 102 including the frame 107 and the protector 108, expansion of the light guide device 20 inside the frame part 102 is permitted, whereby it is possible to prevent the occurrence of distortion, deformation, and damage of the light guide device 20.

A bridge part 40 is provided together with the frame 107. The bridge part 40 plays a part in coming into contact with the nose of the observer to support the frame part 102. That is, the frame part 102 is arranged in front of the face of the observer by the bridge part 40 supported by the nose and a pair of temple parts 104 supported by the ears. The bridge part 40 is fixed by screws to be sandwiched between the central portion 107*g* of the front portion 107*a* of the frame 107 constituting the frame part 102 and the central portion 108*g* of the protector 108 constituting the frame part 102.

Figure 3:
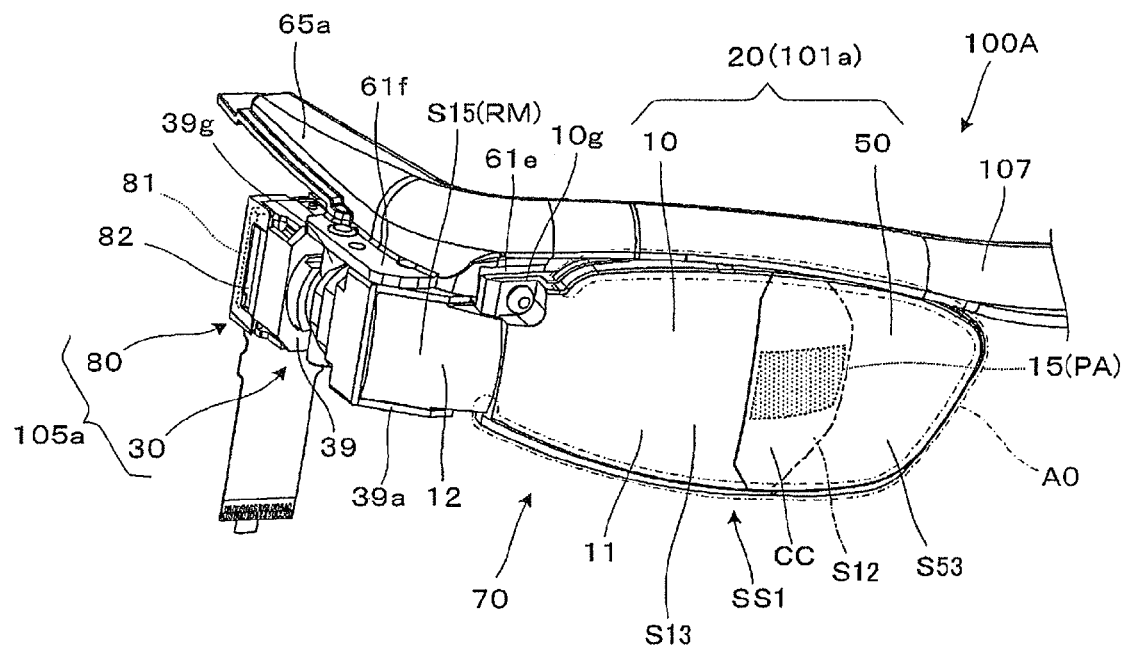
FIG. 3 is a perspective view illustrating the structure of a first display device of the virtual image display apparatus of FIG. 1 and showing a state where an exterior member and the like are removed.

As shown in FIG. 3, the first display device 100A can be considered to include a projection see-through device 70 which is an optical system for projection, and an image display device 80 which forms video light. The projection see-through device 70 plays apart in projecting an image formed by the first image forming body part 105*a* on the eyes of the observer as a virtual image. The projection see-through device 70 includes a light guide member 10 for light guide and see-through, a light transmission member 50 for see-through, and a projection lens 30 for imaging. That is, the first optical member 101*a* or the light guide device 20 is constituted by the light guide member 10 and the light transmission member 50, and the first image forming body part 105*a* is constituted by the image display device 80 and the projection lens 30.

Figure 4:
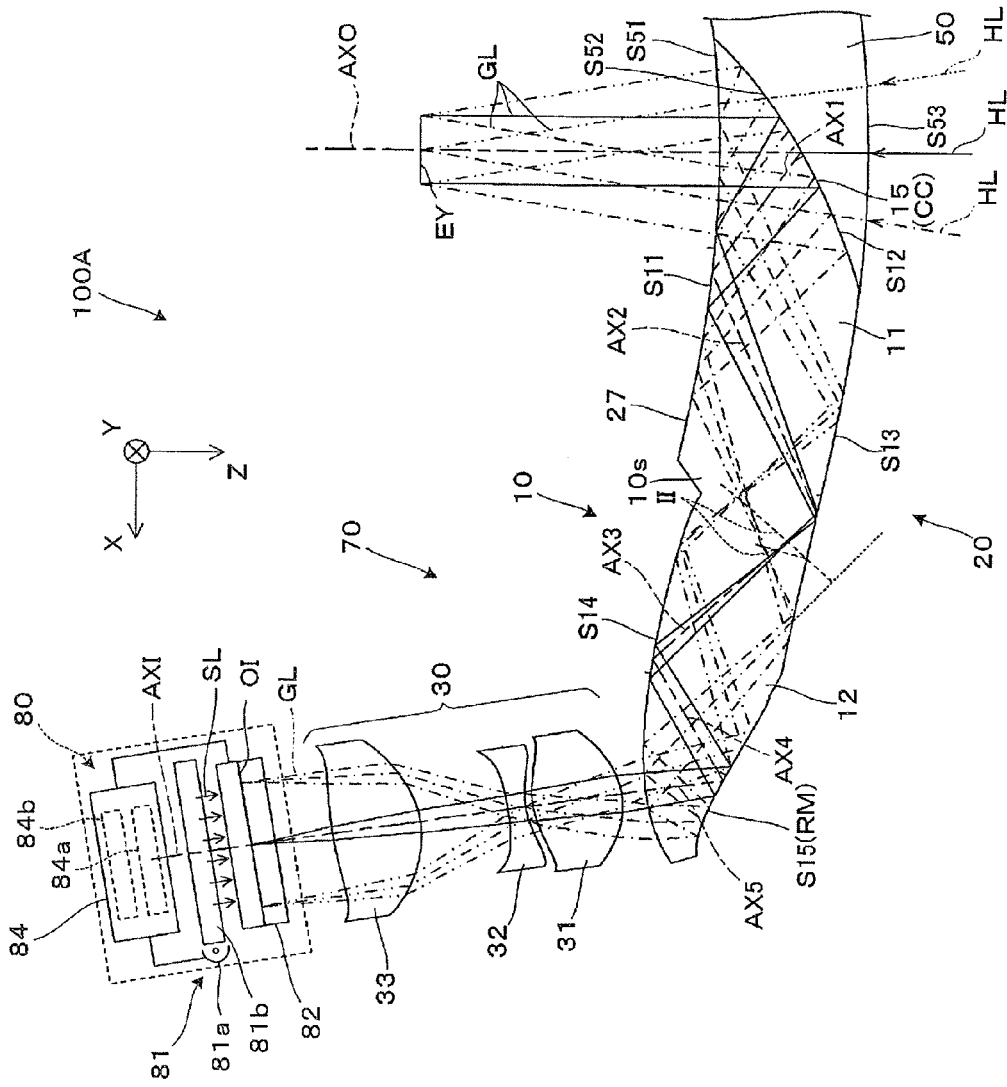
FIG. 4 is a sectional view of a main body portion of the first display device constituting the virtual image display apparatus of FIG. 1 in plan view.

Hereinafter, the image display device 80 and the projection lens 30 constituting the first image forming body part 105*a* will be described referring to FIGS. 3, 4, and the like.

The image display device 80 has an illumination device 81 which emits illumination light, a video display element 82 which is a transmissive spatial light modulation device, and a drive control unit 84 which controls the operation of the illumination device 81 and the video display element 82.

The illumination device 81 of the image display device 80 has a light source 81*a* which generates light including three colors of red, green, and blue, and a backlight guide part 81*b* which diffuses light from the light source to convert light to a light flux having a rectangular cross-section. The video display element (video element) 82 is constituted by, for example, a liquid crystal display, has a plurality of pixels, and spatially modulates illumination light from the illumination device 81 to form image light to be displayed, such as a motion image. The drive control unit 84 includes a light source drive circuit 84*a* and a liquid crystal drive circuit 84*b*. The light source drive circuit 84*a* supplies power to the illumination device 81 to emit illumination light with stable luminance. The liquid crystal drive circuit 84*b* outputs an image signal or a drive signal to the video display element (video element) 82, thereby forming color video light or image light to be a source of a motion image or a still image as a transmittance pattern. Although an image processing function can be provided in the liquid crystal drive circuit 84*b*, the image processing function may be provided in an external control circuit.

The projection lens 30 is a projection optical system which includes three optical elements (lenses) 31 to 33 along an incidence-side optical axis AXI as components, and includes a lens barrel 39 which stores and supports the optical elements 31 and 33. The optical elements 31 to 33 are, for example, axisymmetric aspheric lenses, and forms an intermediate image corresponding to a display image of the video display element 82 inside the light guide member 10 in corporation with a part of the light guide member 10. The lens barrel 39 has a rectangular frame-like engagement member 39*a* on the front end side. The engagement member 39*a* is engaged with the distal end portion of the light guide member 10 on a second light guide portion 12 side, and enables positioning of the light guide member 10 with respect to the lens barrel 39.

Hereinafter, the function, operation, and the like of the projection see-through device 70 and the like will be described in detail referring to FIG. 4. In the projection see-through device 70, the light guide member 10 which is a part of the prism-type light guide device 20 is an arc-like member which is, for example, bent to follow the face in plan view. In the light guide member 10, a first light guide portion 11 is arranged on the center side near the nose, that is, a light emission side, and has a first surface S11, a second surface S12, and a third surface S13 as a lateral surface having an optical function. A second light guide portion 12 is arranged on a peripheral side separated from the nose, that is, a light incidence side, and has a fourth surface S14 and a fifth surface S15 as a lateral surface having an optical function. Of these, the first surface S11 and the fourth surface S14 are continuously adjacent to each other, and the third surface S13 and the fifth surface S15 are continuously adjacent to each other. The second surface S12 is arranged between the first surface S11 and the third surface S13, and the fourth surface S14 and the fifth surface S15 are adjacent to each other at a large angle.

In the light guide member 10, the first surface S11 is a free-form surface which has, as a local z axis, an emission-side optical axis AXO parallel to the Z axis, the second surface S12 is a free-form surface which has, as a local z axis, an optical axis AX1 included in a reference surface (a cross-section in the drawing) parallel to the XZ plane and inclined with respect to the Z axis, and the third surface S13 is a free-form surface which has, as a local z axis, the emission-side optical axis AXO. The fourth surface S14 is a free-form surface which has, as a local z axis, an optical axis parallel to a bisector of a pair of optical axes AX3 and AX4 included in the reference surface parallel to the XZ plane and inclined with respect to the Z axis, and the fifth surface S15 is a free-form surface which has, as a local z axis, an optical axis parallel to a bisector of a pair of optical axes AX4 and AX5 included in the reference surface parallel to the XZ plane and inclined with respect to the Z axis. On the extension of the optical axis AX5 on the fifth surface S15 side, an incidence-side optical axis AXI is arranged. The first to fifth surfaces S11 to S15 have a symmetrical shape in terms of the vertical Y-axis direction while sandwiching the reference surface (the cross-section in the drawing), which is in parallel with the XZ plane extending in a horizontal direction and through which the optical axes AX1 to AX5 and the like pass.

Among a plurality of surfaces constituting the light guide member 10, at least one free-form surface which is a surface other than a surface from the first surface S11 to the third surface S13 includes at least one point different in sign of curvature depending on direction. With this, it is possible to reduce the size of the light guide member 10 while controlling the light guide of video light accurately.

In the light guide member 10, a main body 10s is formed of a resin material having a high light transmission property in a visible region, and is molded by injecting and solidifying thermoplastic resin inside a mold. As the material of the main body 10s, for example, cycloolefin polymer or the like may be used. Although the main body 10s is an integrated product, as described above, the guide member 10 can be considered in the first light guide portion 11 and the second light guide portion 12 functionally. The first light guide portion 11 enables light guide and emission of video light GL and enables see-through of external light HL. The second light guide portion 12 enables incidence and light guide of video light GL.

In the first light guide portion 11, the first surface S11 functions as a refraction surface which emits video light GL outside the first light guide portion 11 and functions as a total reflection surface which totally reflects video light GL on the inner surface side. The first surface S11 is arranged in front of an eye EY, and is formed to have, for example, a concave surface shape to the observer. The first surface S11 is a surface which is formed of a hard coat layer 27 on the surface of the main body 10s.

The second surface S12 is the surface of the main body 10s, and a half mirror layer 15 is attached thereto. The half mirror layer 15 is a reflection film (that is, transflective film) having a light transmission property. The half mirror layer (transflective film) 15 is formed on a narrowed partial area PA of the second surface S12 in terms of the vertical direction along the Y axis of the second surface S12 instead of the entire second surface S12 (see FIG. 3). The half mirror layer 15 is formed by forming a metal reflection film or a dielectric multilayer film on the partial area PA of the underlayer surface of the main body 10s. The reflectance of the half mirror layer 15 to video light GL is set to be equal to or greater than 10% and equal to or less than 50% within an assumed incidence angle range of video light GL from the viewpoint of facilitating the observation of external light HL in a see-through manner. Specifically, the reflectance of the half mirror layer 15 to video light GL in a specific example is set to, for example, 20%, and the transmittance of the half mirror layer 15 of video light GL is set to, for example, 80%.

The third surface S13 functions as a total reflection surface which totally reflects video light GL on the inner surface side. The third surface S13 is arranged in front of the eye EY, and, similarly to the first surface S11, has a concave surface shape to the observer. When external light HL passing through the first surface S11 and the third surface S13 is viewed, diopter is substantially 0. The third surface S13 is a surface which is formed of the hard coat layer 27 on the surface of the main body 10s.

In the second light guide portion 12, the fourth surface S14 functions as a total reflection surface which totally reflects video light GL on the inner surface side. The fourth surface S14 also functions as a refraction surface which makes video light GL enter the second light guide portion 12. That is, the fourth surface S14 doubles as a light incidence surface which makes video light GL enter the light guide member 10 from the outside, and a reflection surface which makes video light GL propagate through the light guide member 10. The fourth surface S14 is a surface which is formed of the hard coat layer 27 on the surface of the main body 10s.

In the second light guide portion 12, the fifth surface S15 is formed by forming a light reflection film RM formed of an inorganic material on the surface of the main body 10s, and functions as a reflection surface.

As described above, the light transmission member 50 is fixed integrally with the light guide member 10 and is constituted as the single light guide device 20. The light transmission member 50 is a member (auxiliary optical block) which assists a see-through function of the light guide member 10, and has a first transmission surface S51, a second transmission surface S52, and a third transmission surface S53 as a lateral surface having an optical function. The second transmission surface S52 is arranged between the first transmission surface S51 and the third transmission surface S53. The first transmission surface S51 is on a curved surface extended from the first surface S11 of the light guide member 10, the second transmission surface S52 is a curved surface which is bonded integrally to the second surface S12 by an adhesive layer CC, and the third transmission surface S53 is on a curved surface extended from the third surface S13 of the light guide member 10. Of these, the second transmission surface S52 and the second surface S12 of the light guide member 10 are integrated by bonding through the thin adhesive layer CC, and thus have a shape having the substantially same curvature.

The light transmission member (auxiliary optical block) 50 exhibits a high light transmission property in a visible region, and a main body portion of the light transmission member 50 is formed of thermoplastic resin having the substantially same refractive index as the main body 10s of the light guide member 10. The light transmission member 50 is formed by hard coat deposition along with the main body 10s in a state where the main body portion is bonded to the main body 10s of the light guide member 10. That is, similarly to the light guide member 10, in the light transmission member 50, a hard coat layer 27 is formed on the surface of the main body portion. The first transmission surface S51 and the third transmission surface S53 are surfaces which are formed of the hard coat layer 27 on the surface of the main body portion.

Hereinafter, the optical path of video light GL or the like in the virtual image display apparatus 100 will be described. Video light GL emitted from the video display element (video element) 82 is converged by the projection lens 30 and enters the fourth surface S14 having positive refractive power provided in the light guide member 10.

Video light GL passing through the fourth surface S14 of the light guide member 10 advances while being converged, when passing through the second light guide portion 12, is reflected by the fifth surface S15 having comparatively weak negative refractive power, enters the fourth surface S14 from the inside again, and is then reflected.

Video light GL reflected by the fourth surface S14 of the second light guide portion 12 enters and is totally reflected by the third surface S13 having comparatively weak positive refractive power in the example shown in the drawing in the first light guide portion 11, and enters and is totally reflected by the first surface S11 having comparatively weak negative refractive power in the example shown in the drawing.

Before and after passing through the third surface S13, video light GL forms an intermediate image in the light guide member 10. An image surface II of the intermediate image corresponds to an image surface OI of the video display element 82. Although an image surface II of an intermediate image shown in the drawing is formed on the optical path of video light from the third surface S13 to the fourth surface S14, the image surface II may be formed at other positions, and in this embodiment, it is assumed that the image surface II is formed on the optical path of video light from the second surface S12 to the fifth surface S15. In this case, it is possible to maintain the size balance between the front stage side and the rear stage side of the optical system with the image surface II of the intermediate image interposed therebetween to reduce the size as the whole of the optical system.

While video light GL totally reflected by the first surface S11 enters the second surface S12, in particular, video light GL entering the half mirror layer 15 is partially transmitted through and partially reflected by the half mirror layer 15 and enters and passes through the first surface S11 again. The half mirror layer 15 acts as having comparatively strong positive refractive power to video light GL to be reflected by the half mirror layer 15. The first surface S11 acts as having negative refractive power in the example shown in the drawing to video light GL passing therethrough.

Video light GL passing through the first surface S11 enters the pupil of the eye EY of the observer or an equivalent position as a substantially parallel light flux. That is, the observer observes an image formed on the video display element (video element) 82 by video light GL as a virtual image.

As in the optical member including the light guide member 10 of this embodiment or the like, when forming an intermediate image using the optical member as a relay optical system, in general, if there is a scratch, dust, or stain on the surface of the optical member near the intermediate image, there is a contaminant or air bubble inside the optical member, or discoloring occurs locally in optical member due to aging degradation, the scratch or the like significantly affects video light passing through the optical member, and the scratch or the like is viewed to the observer on an enlarged scale, causing degradation in video quality. In contrast, in this embodiment, in order to avoid this situation, a configuration is made in which the spreading of the light flux at the position of the image surface II of the intermediate image in the optical path of the light guide member 10 (the degree of spreading of each partial light flux constituting video light) is sufficiently large. That is, each partial light flux constituting video light is not condensed on or near the intermediate image too much. With this, even when a contaminant or the like is generated at least near the image surface II of the intermediate image in the optical path of the light guide member 10, it is possible to make the contaminant or the like unnoticeable at the position of the eyes, thereby preventing the contaminant or the like from affecting an image. The amount of spreading or the like will be described below in detail.

Out of external light HL, a light component which enters a +X side from the second surface S12 of the light guide member 10 passes through the third surface S13 and the first surface S11 of the first light guide portion 11, and at this time, positive and negative refractive power are cancelled and aberration is corrected. That is, the observer observes an external scene image with little distortion over the light guide member 10. Similarly, out of external light HL, a light component which enters a −X side from the second surface S12 of the light guide member 10, that is, a light component which enters the light transmission member 50 passes through the third transmission surface S53 and the first transmission surface S51 provided in the light transmission member 50, and at this time, positive and negative refractive powers are cancelled and aberration is corrected. That is, the observer observes an external scene image with little distortion over the light transmission member 50. Out of external light HL, a light component which enters the light transmission member 50 corresponding to the second surface S12 of the light guide member 10 passes through the third transmission surface S53 and the first surface S11, and at this time, positive and negative refractive powers are cancelled and aberration is corrected. That is, the observer observes an external scene image with little distortion over the light transmission member 50. The second surface S12 of the light guide member 10 and the second transmission surface S52 of the light transmission member 50 have the substantially same curved surface shape and the substantially same refractive index, and the gap between both surfaces is filled with the adhesive layer CC having the substantially same refractive index. That is, the second surface S12 of the light guide member 10 or the second transmission surface S52 of the light transmission member 50 does not act as a refraction surface to external light HL.

However, since external light HL entering the half mirror layer 15 is partially transmitted through and partially reflected by the half mirror layer 15, external light HL from a direction corresponding to the half mirror layer 15 is vulnerable to the transmittance of the half mirror layer 15. On the other hand, since video light GL is entered from a direction corresponding to the half mirror layer 15, the observer observes an external scene image along with an image formed on the video display element (video element) 82 in the direction of the half mirror layer 15.

Out of video light GL which propagates through the light guide member 10 and enters the second surface S12, alight component which has not been reflected by the half mirror layer 15 enters the light transmission member 50, and is prevented from being returned to the light guide member 10 by an antireflection portion (not shown) provided in the light transmission member 50. That is, video light GL passing through the second surface S12 is prevented from being returned on the optical path and becoming stray light. Furthermore, external light HL which enters from the light transmission member 50 side and reflected by the half mirror layer 15 is returned to the light transmission member 50, and is prevented from being emitted to the light guide member 10 by the antireflection portion (not shown) provided in the light transmission member 50. That is, external light HL reflected by the half mirror layer 15 is prevented from being returned on the optical path and becoming stray light.

Figure 5:
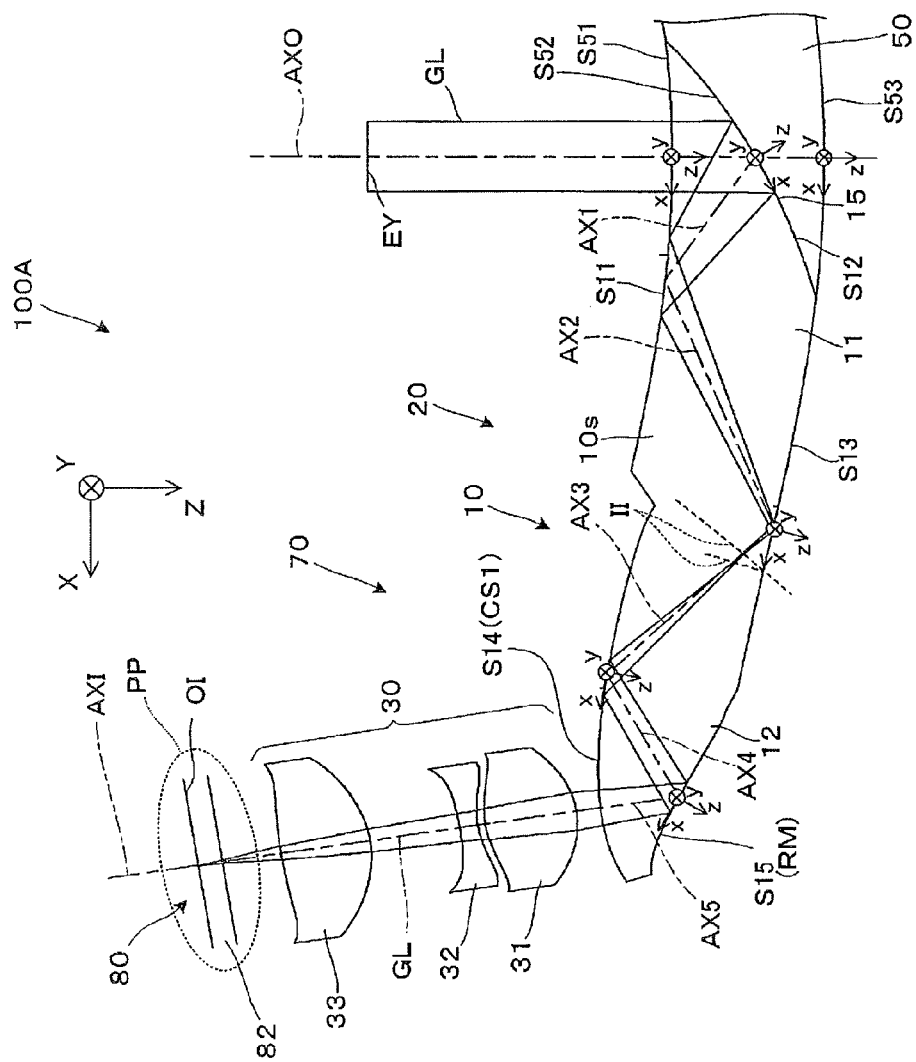
FIG. 5 is a sectional view illustrating an optical surface or an optical path in a light guide member of the first display device of FIG. 3.

FIG. 5 is a diagram illustrating the optical axes AX1 to AX4 in the light guide member 10 or local coordinates. In the following description, considering the evaluation of the optical system or convenience of expression, an optical surface or an optical path is specified in terms of a reversing direction from the eye EY of the observer toward the video display element 82 of the image display device 80. In an actual optical system, while light emitted from the video display element 82 sequentially passes through the projection lens 30 and the light guide member 10 and reaches the eye EY, in this state, the evaluation of the optical system is difficult. For this reason, evaluation and design are performed assuming that light from an infinitely distant light source from a stop at the position of the eye EY enters the light guide member 10 and is imaged on the video display element 82 through the projection lens 30, and data of the optical system described below in detail is displayed in this order. The light transmission member 50 which is bonded to the light guide member 10 and used integrally is the extension of the shape of the light guide member 10, and description thereof will be omitted.

In the light guide member 10 shown in the drawing, the optical axis of the first surface S11 matches the emission-side optical axis AXO, and the local coordinate (x,y,z) of the first surface S11 has a translational relationship with a global coordinate (X,Y,Z) and has an origin on the first surface S11. That is, a z direction of the local coordinate is an advancing direction (a reversing direction of a light beam) on the emission-side optical axis AXO, and a y direction of the local coordinate is in parallel with the Y direction of the global coordinate. In the subsequent surfaces, the y direction of the local coordinate is in parallel with the Y direction of the global coordinate.

The optical axis of the second surface S12 is appropriately inclined with respect to the emission-side optical axis AXO, and the local coordinate of the second surface S12 is appropriately rotated around the Y axis and translated with respect to the global coordinate and has an origin on the second surface S12. A z direction of the local coordinate of the second surface S12 is an intermediate direction between the emission-side optical axis AXO and the optical axis AX1 at the center of a light flux from the second surface S12 toward the first surface S11.

The optical axis of the third surface S13 matches the emission-side optical axis AXO, and the local coordinate of the third surface S13 has a translational relationship with the global coordinate and has an origin on the extended surface of the third surface S13, that is, on the third transmission surface S53.

With the above, an intermediate direction between the optical axis AX1 at the center of a light flux from the second surface S12 toward the first surface S11 and the optical axis AX2 at the center of a light flux from the first surface S11 toward the third surface S13 matches a direction normal to the first surface S11 at the center (an intersection point of the optical axes AX1 and AX2) of a light flux on the first surface S11. An intermediate direction between the optical axis AX2 at the center of a light flux from the first surface S11 toward the third surface S13 and the optical axis AX3 at the center of a light flux from the third surface S13 toward the fourth surface S14 matches a direction normal to the third surface S13 at the center (an intersection point of the optical axes AX2 and AX3) of a light flux on the third surface S13.

In an optical path from the third surface S13 toward the next fourth surface S14, the local coordinate corresponds to an advancing direction (a reversing direction of a light beam). That is, a z direction of the local coordinate from the third surface S13 to the fourth surface S14 matches the optical axis AX3 at the center of the light flux, and a y direction of the local coordinate is in parallel with the Y direction of the global coordinate.

The origin of the local coordinate of the fourth surface S14 is on the fourth surface S14. A z direction of the local coordinate of the fourth surface S14, that is, the optical axis of the fourth surface S14 is a bisector of the optical axis AX3 at the center of the light flux from the third surface S13 toward the fourth surface S14 and the optical axis AX4 at the center of the light flux from the fourth surface S14 toward the fifth surface S15.

The origin of the local coordinate of the fifth surface S15 is on the fifth surface S15. A z direction of the local coordinate of the fifth surface S15, that is, the optical axis of the fifth surface S15 is a bisector of the optical axis AX4 at the center of the light flux from the fourth surface S14 toward the fifth surface S15 and the optical axis AX5 at the center of the light flux from the fifth surface S15 toward the fourth surface S14.

The shape of the first surface S11 of the light guide member 10 is expressed by the following expression using the local coordinate (x,y,z) of the first surface S11.

$$z = \Sigma \{A1_{m,n} \cdot (x^m \cdot y^n)\} \quad (4)$$

Here, $A1_{m,n}$ is a coefficient of a (m·n)th term expanded as a polynomial, and m and n are an integer equal to or greater than 0.

The shape of the second surface S12 of the light guide member 10 is expressed by the following expression using the local coordinate (x,y,z) of the second surface S12.

$$z = \Sigma \{A2_{m,n} \cdot (x^m \cdot y^n)\} \quad (5)$$

Here, $A2_{m,n}$ is a coefficient of a (m·n)th term expanded as a polynomial.

The shape of the third surface S13 of the light guide member 10 is expressed by the following expression using the local coordinate (x,y,z) of the third surface S13.

$$z = \Sigma \{A3_{m,n} \cdot (x^m \cdot y^n)\} \quad (6)$$

Here, $A3_{m,n}$ is a coefficient of a (m·n)th term expanded as a polynomial.

In this embodiment, the first to third surfaces S11 to S13 of the light guide member 10 satisfy the following three conditions.

$$-10^{-1} < A1_{0,2} + A1_{2,0} < 10^{-2} \quad \text{and} \quad -10^{-1} < A3_{0,2} + A3_{2,0} < 10^{-2} \quad (1)$$

$$|A1_{2,0} - A1_{0,2}| < 10^{-1} \text{ and } |A3_{2,0} - A3_{0,2}| < 10^{-1} \quad (2)$$

$$|A1_{2,0} - A3_{2,0}| < 10^{-2} \text{ and } |A1_{0,2} - A3_{0,2}| < 10^{-2} \quad (3)$$

The shapes of the first to third surfaces S11 to S13 are set to satisfy the three conditions, whereby aberration correction of both external light HL and video light GL can be performed satisfactorily and excellent image quality can be obtained.

An interval between the first surface S11 and the third surface S13 of the light guide member 10 is equal to or greater than 5 mm and equal to or less than 15 mm. An inclination angle of the second surface S12 with respect to the first surface S11 is equal to or greater than 20° and equal to or less than 40°.

The fourth surface S14 or the fifth surface S15 of the light guide member 10 is provided for optical path adjustment or aberration correction.

The shape of the fourth surface S14 of the light guide member 10 is expressed by the following expression using the local coordinate (x,y,z) of the fourth surface S14.

$$z = \Sigma \{A4_{m,n} \cdot (x^m \cdot y^n)\} \quad (7)$$

Here, $A4_{m,n}$ is a coefficient of a (m·n)th term expanded as a polynomial.

The shape of the fifth surface S15 of the light guide member 10 is expressed by the following expression using the local coordinate (x,y,z) of the fifth surface S15.

$$z = \Sigma \{A5_{m,n} \cdot (x^m \cdot y^n)\} \quad (8)$$

Here, $A5_{m,n}$ is a coefficient of a (m·n)th term expanded as a polynomial.

In this embodiment, the curved surface shape of the fourth surface S14 expressed by Expressions (7) and (8) is an opposite-sign curvature surface which includes at least one opposite-sign curvature point different in sign of curvature depending on direction.

Hereinafter, the spreading width at the position of the image surface OI and the spreading width at each position in the optical path of the light flux within the whole range excluding the vicinity out of the optical path including the image surface II of the intermediate image are shown, and spreading width comparison is performed based on these spreading widths. Here, the spreading width is an index which represents the degree of spreading on the surface at an arbitrary position orthogonal to the optical axis, and for example, means an amount which represents the degree of spreading of a partial light beam flux (partial flux), which is emitted as one pixel in the video display element 82 and should be recognized as one video pixel, on the position of the image surface II of the intermediate image or on each position of the image surface OI or the like of the video display element 82. In eliminating blur in an image based on light emitted from the video display element 82, it is preferable that the spreading width of one partial light flux of the light beams on the position of the image surface OI of the video display element 82 is equal to or less than a value corresponding to the size of the pixel, that is, the width of the pixel pitch. If the degree of spreading within a range of a light flux cross-section is kept to be equal to or less than the size of the pixel, video light becomes an image substantially having no blur.

It is assumed that the spreading width of each position is specified based on a result of calculating the distribution of the light beam reversed with respect to the advancement of video light. That is, the light beam is entered from the position of the eye EY as the position of the pupil to be reversed with respect to the advancement of video light, the entered light beam is tracked, and comparison is performed based on the degree of spreading on each position, thereby specifying the spreading width of the video light. As a specific example of calculating a numerical value, for the entered light beam, as an index which represents the spreading width of the light flux at each position, the spreading width W is given by the following expressions at the positions $(x_1, y_1), (x_2, y_2), \ldots,$ and $(x_n, y_n)$ of n (where n: natural number) light beams reversely tracked from the position of the eye EY.

$$W = \sqrt{\frac{1}{n}\sum_{i=1}^{n}\{(x_i - \tilde{x})^2 + (y_i - \tilde{y})^2\}} \quad (9)$$

$$\tilde{x} = \frac{1}{n}\sum_{i=1}^{n} x_i, \ \tilde{y} = \frac{1}{n}\sum_{i=1}^{n} y_i$$

Here, it is assumed that the n light beams are extracted on average from a range of an incidence pupil surface to be not selected unevenly. Expression (9) is a kind of value corresponding to a standard deviation which represents the degree of deviation in the x direction and the y direction with respect to the average position of the light beams. Among the spreading widths W expressed by Expression (9), for example, the spreading width Wa which represents the degree of spreading within the whole range excluding the vicinity of the image surface OI of the video display element 82 separated from the light guide member 10, such as a range PP (around the video display element 82 or the lens arranged on the video display element 82 side in the projection lens 30 in the periphery of the video display element 82) indicated by a broken line in FIG. 5 has the following relationship with the spreading width Wb which represents the degree of spreading of the light flux on the position of the image surface OI of the video display element 82.

$$10Wb < Wa$$

That is, the spreading width Wa of the light flux within the whole range from the video element to the pupil of the observer is greater than 10 times the spreading width Wb on the position of the image surface OI of the video display element 82. The spreading width on the optical path is grater, whereby, even if a contaminant or a scratch of a certain size is generated at or near the position of the intermediate image in the light guide member 10, a virtual image produced from the contaminant or scratch is blurred. That is, each partial light flux is not concentrated, and a state having a certain degree of spreading is maintained. With this, even if there is a contaminant or a scratch at or near the position of the image surface II, the influence of the contaminant or scratch during image observation is suppressed.

In the above-described virtual image display apparatus 100, since the light guide member 10 is thin and has a plurality of non-axisymmetric curved surfaces for desired aberration correction, it may be considered that a condensing position of video light in a first direction (x direction) and a condensing position of video light in a second direction (y direction) are separated from the position of the image surface II of the intermediate image. For instance, a difference corresponding to an astigmatic difference is generated. As a result, the virtual image display apparatus 100 is configured such that the spreading width on the position of the image surface II of the intermediate image does not become small.

Figure 6:
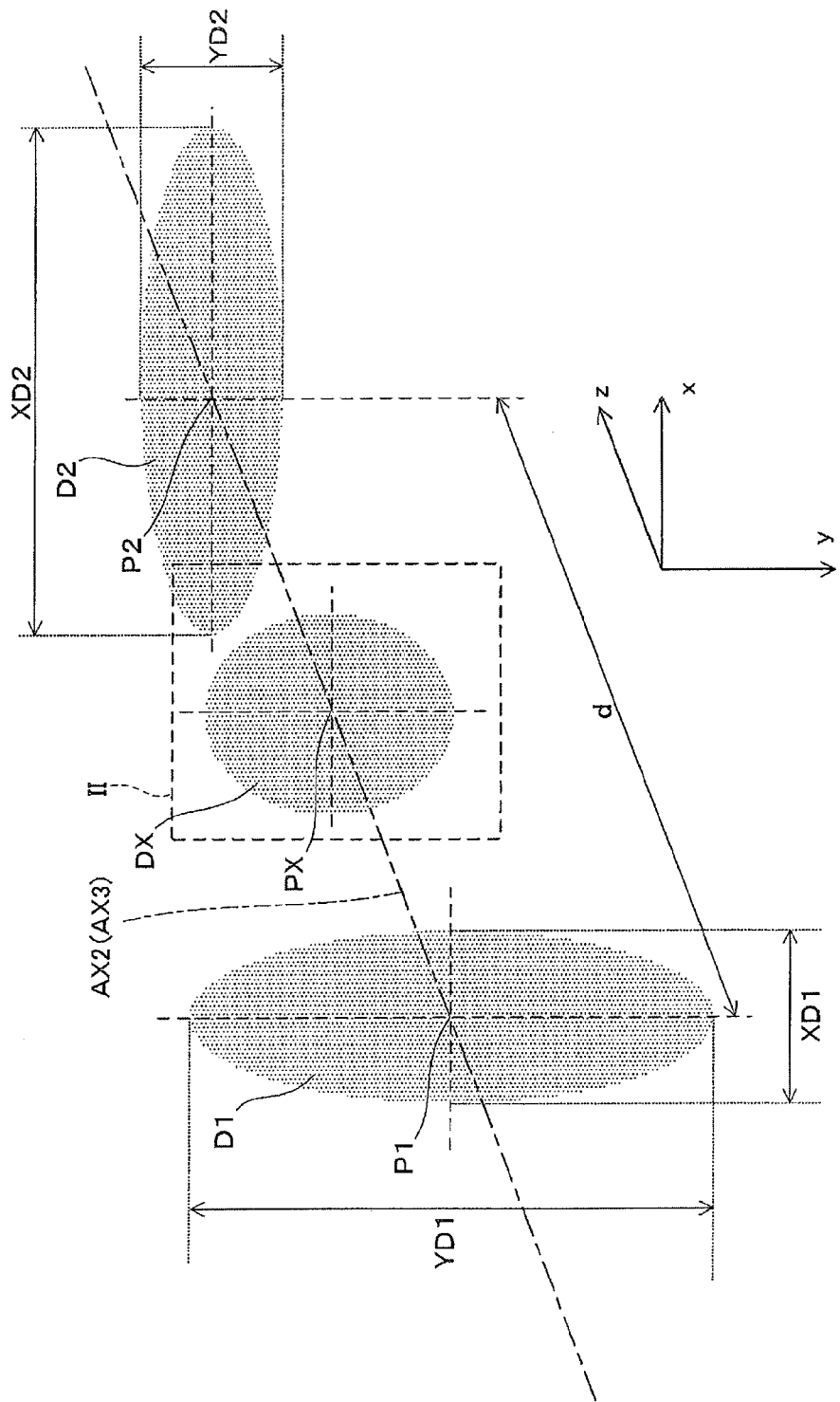
FIG. 6 is a perspective view conceptually showing a partial light flux near the position of an intermediate image according to one embodiment.

Hereinafter, from the viewpoint of the condensing position of video light GL, the feature of the optical system at and near the position of the image surface II of the intermediate image will be described. FIG. 6 is a diagram showing a state of a partial light flux at or near the position of the image surface II of the intermediate image, and is a perspective view conceptually showing the expansion of the optical axes AX2 and AX3 shown in FIG. 5 and the like. FIG. 6 shows the vicinity of the optical axis AX3 (or the optical axis AX2), and shows a case where the image surface II is a surface perpendicular to the optical axis. That is, the image surface II is a surface parallel to the xy plane. In FIG. 6, it is assumed that the position of each surface is represented by the axial position of the optical axis AX3 (AX2). For example, it is assumed that the position of the image surface II is represented by a position PX on the optical axis AX3.

Hereinafter, specific description will be provided referring to FIG. 6. For example, it is assumed that a partial light flux which is one of components passing near the optical axis AX3 out of video light GL at the position PX of the image surface II of the intermediate image is in a state shown in a cross-section DX. That is, each partial light flux of video light GL is focused in a state of having a certain degree of spreading, instead of completely forming an image at one point on the image surface II. This is because there is aberration corresponding to astigmatism inevitably generated in a non-axisymmetric optical system described above. Thus, it can be said that the image surface II of the intermediate image represents a position where each partial light flux constituting video light GL is most condensed in the optical path. In other words, the degree of spreading of the cross-section DX in the image surface II of the intermediate image has a minimum value (area) in the rest of the optical path excluding the vicinity of the video display element 82. This corresponds to a case where the value of Expression (9) has a local minimum value.

In this case, a position where the width of each partial light flux is most narrowed when cut in the first direction (x direction) as one of the directions along the optical axis direction, that is, each partial light flux is most condensed in the x direction does not match and is deviated from the position PX of the image surface II of the intermediate image. Similarly, a position where each partial light flux is most condensed in the y direction when cut in the second direction (y direction) orthogonal to the first direction (x direction) is deviated from the position PX of the image surface II. As shown in the drawing, it is assumed that the first condensing position P1 is closer to the position (see FIG. 5 or the like) of the eye EY than the position PX of the image surface II of the intermediate image, and the second condensing position P2 is closer to the position (see FIG. 5 or the like) of the image surface OI of the video display element 82 than the position PX of the image surface II of the intermediate image. As shown in the drawing, when the cross-section of the partial light flux of video light GL at the first condensing position P1 is referred to as a cross-section D1 and the cross-section of the partial light flux at the second condensing position P2 is referred to as a cross-section D2 corresponding to the cross-section DX of the partial light flux of video light GL near the optical axis AX3 representing the position PX of the image surface II, it is assumed that the cross-section D1 has a short longitudinal shape in the first direction (x direction) and the cross-section D2 has a short lateral shape in the second direction (y direction). As shown in the drawing, the width in the x direction of the cross-section D1 is referred to as a width XD1, and the width in the y direction is referred to as a width YD1. Similarly, the width in the x direction of the cross-section D2 is referred to as a width XD2, and the width in the y direction is referred to as a width YD2. In this case, on the entire optical path excluding the vicinity of the video display element 82, the width XD1 in the x direction of the cross-section D1 has a minimum value in the x direction over the cross-section of the partial light flux, and the width YD2 in the y direction of the cross-section D2 has a minimum value in the y direction over the cross-section of the partial light flux.

Here, the length d of the distance along the optical axis AX3 (AX2) from the first condensing position P1 to the second condensing position P2 is greater than the sum of the value of the width XD1 and the value of the width YD2. That is, it is assumed that the following relationship is established.

$$d > XD1 + YD2$$

In this way, when the length d which represents the value corresponding to an astigmatic difference is sufficiently greater than the value of the width XD1 which is the minimum value of the width of the light flux in the first direction (x direction) or the value of the width YD2 which is the minimum value of the width of the light flux in the second direction (y direction) at the second condensing position P2, this means that there is a certain degree of spreading width on the position of the intermediate image. That is, for example, even when there is a scratch, dust, or stain on the surface of the light guide member 10 near the intermediate image or there is a contaminant or air bubble inside the light guide member 10, it is possible to avoid a situation in which the scratch or the like is enlarged and noticeable to degrade video quality.

As described above, in this embodiment, a curved surface is formed such that the spreading width on the position of the image surface II of the intermediate image for video light is greater (for example, greater than 10 times the spreading width on the position of the image surface of the video element). With this, even when there is a scratch, dust, or stain on the surface of the light guide member near the intermediate image or there is a contaminant or air bubble inside the light guide member, it is possible to avoid a situation in which the scratch or the like is enlarged and noticeable to degrade video quality.

Figure 7A:
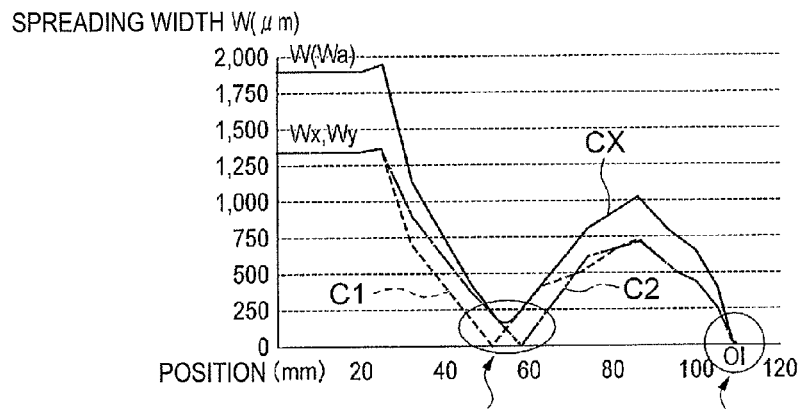
FIG. 7A is a graph showing an example of a spreading width of a light flux according to one embodiment.
Figure 7B:
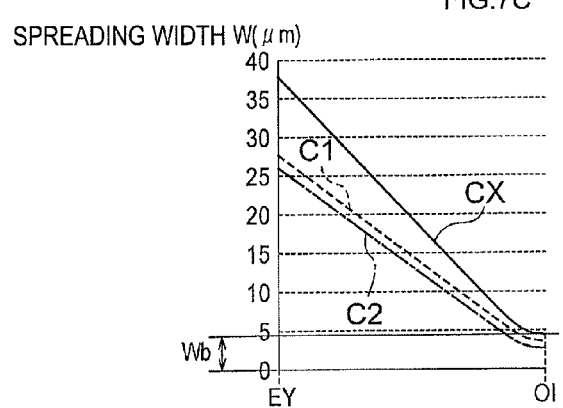
FIG. 7B is a partial enlarged view relating to FIG. 7A.
Figure 7C:
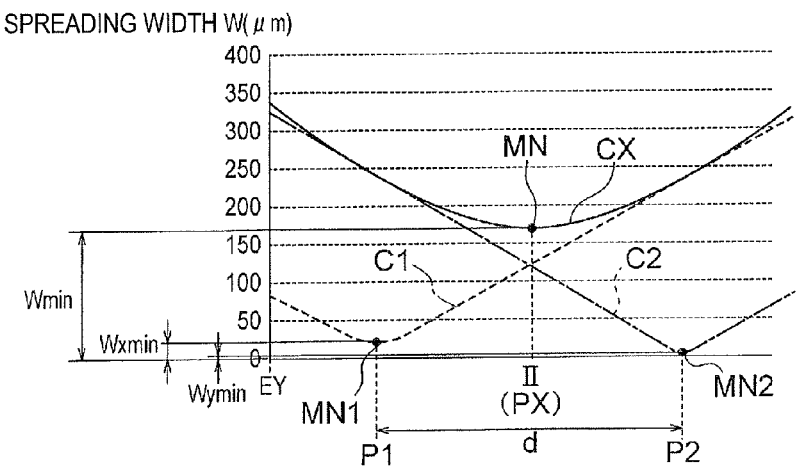
FIG. 7C is another partial enlarged view relating to FIG. 7A.

FIGS. 7A to 7C are graphs showing a specific example of the spreading width W or the like which represents the degree of spreading of the light flux at each position on the optical path. FIGS. 7A to 7C show the spreading width W or the like at a position of 0 in image height in an example of the above-described virtual image display apparatus. FIG. 7A shows the spreading width W in the entire optical path, the spreading width Wx in the X direction, and the spreading width Wy in the Y direction. FIG. 7B shows the image surface OI of the video display element 82 in FIG. 7A and the vicinity thereof on a partially enlarged scale, and FIG. 7C shows the image surface II of the intermediate image in the FIG. 7A and the vicinity thereof on a partially enlarged scale. In FIGS. 7A to 7C, the horizontal axis represents a position along the optical path on the optical axis of video light. Specifically, when the position of the eye EY is zero, the positions from the position of the eye EY to the image surface OI of the video display element 82 are shown. The vertical axis represents a blur amount of a light beam at each position, that is, the degree of spreading. Here, as described above, a case where a light beam is reversed from the position of the eye EY is shown. The unit of the position on the horizontal axis is mm, and the unit of the spreading width on the vertical axis is μm. In FIGS. 7B and 7C, the scale of the spreading width is appropriately changed from FIG. 7A conforming to an enlargement ratio. In the drawing, a curve CX indicated by a solid line represents the value of the spreading width W at each position, a curve C1 indicated by a broken line represents the value of a component (the spreading width Wx in the x direction) in the x direction out of the spreading width W, and a curve C2 indicated by a one-dot-chain line represents the value of a component (the spreading width Wy in the y direction) in the y direction out of the spreading width W. That is, the curve CX is a curve which represents the result of calculating a value calculated from Expression (9) for the spreading width W at each position, the curve C1 represents a curve which represents the result of calculating a value calculated from an expression, in which the y component is deleted, out of the spreading width W of Expression (9) at each position, and the curve C2 is a curve which represents the result of calculating a value calculated from an expression, in which the x component is deleted, out of the spreading width W of Expression (9) at each position. In this case, the curve CX represents the transition of the value of the spreading width Wa excluding a part on the left side corresponding to the vicinity of the video display element 82, and represents the value of the spreading width Wb in a portion representing the image surface OI of the video display element 82. In this case, local minimum points MN, MN1, and MN2 of the respective curves CX, C1, and C2 have local minimum values at the respective positions corresponding to the position PX of the intermediate image, the first condensing position P1, and the second condensing position P2 shown in FIG. 6. For example, the local minimum point MN of the curve CX represents the position where the spreading width Wa has a minimum value Wmin, and the local minimum points MN1 and MN2 of the curves C1 and C2 represent the positions where the spreading widths Wx and Wy have minimum values Wxmin and Wymin. By comparing these, it is understood that the spreading width Wa of the light flux at each position within the whole range excluding the vicinity of the image surface OI of the video display element 82 and the spreading width Wb of the light flux on the position of the image surface OI of the video display element 82 have the following relationship.

$$10Wb < Wa$$

Specifically, even in the image surface II of the intermediate image which is the position of the local minimum point MN having the minimum value Wmin out of the spreading width Wa, the value of the minimum value Wmin out of the spreading width Wa is about 170 μm (see FIG. 7C). Meanwhile, in the image surface OI of the video display element 82, the value of the spreading width Wb is about 4.3 μm (see FIG. 7B). That is, it can be said that there is a large difference equal to or greater than 10 times between the spreading width Wa and the spreading width Wb. In this way, for example, a sufficient spreading width is provided within the range excluding the vicinity of the image surface OI of the video display element 82 as the entire light guide member 10, that is, the value of the minimum value Wmin of the spreading width Wa is sufficiently greater than the value of the spreading width Wb. Accordingly, even when a contaminant or air bubble is generated inside the light guide member 10, it is possible to suppress image deterioration due to the contaminant or air bubble. The minimum value Wmin which is the value of the spreading width Wa at the position of the image surface II of the intermediate image is sufficiently greater than the value of the spreading width Wb. Accordingly, even if a contaminant or air bubble is generated at the position of the image surface II of the intermediate image where the video light is likely to be condensed in the light guide member 10, it is possible to suppress image deterioration due to the contaminant or air bubble.

In the virtual image display apparatus 100 of this embodiment, an intermediate image is formed inside the light guide member 10 by the projection lens 30 or the like, and video light GL totally reflected by two or more surfaces in order of the third surface S13, the first surface S11, and the second surface S12 is transmitted through the first surface S11 and reaches the eye EY of the observer. Thus, it is possible to realize bright high-performance display with a wide viewing angle while reducing the thickness of the light guide member 10 to reduce the size and weight of the entire optical system. External light HL can be observed through the first surface S11 and the third surface S13, and diopter at this time is substantially 0. For this reason, it is possible to reduce defocusing or distortion of external light HL when observing external light HL in a see-through manner. The shape of the light guide member 10 can have a shape along the face of the observer, the center of gravity can be brought close to the face, and excellent design can be achieved. In particular, the fourth surface S14 or the like which is a surface other than the first surface S11 and the third surface S13 is a curved surface having a point different in curvature depending on direction, whereby it is possible to reduce the size of the light guide member 10, consequently, the size and weight of the entire virtual image display apparatus 100.

In the above description, the light guide member 10 has two or more non-axisymmetric curved surfaces, and in the above-described example, the respective surfaces including the first surface or the third surface are non-axisymmetric curved surfaces. However, all surfaces do not need to be non-axisymmetric curved surfaces insofar as an optical function is sufficiently fulfilled. Though the details will be described below, for example, a case where the second surface S12 and a surface after the fourth surface S14, such as a light incidence surface, are non-axisymmetric curved surfaces, and the first surface S11 or the third surface S13 is a flat surface (or a substantially flat surface) (Example 4) may be assumed.

EXAMPLES

Hereinafter, examples of the projection see-through device assembled in the virtual image display apparatus according to the invention will be described. Symbols used in each example are summarized below.
SPH: pupil
FFSk: free-form surface (k in light guide member=surface number)
ASPk: axisymmetric aspheric surface (k in projection optical system=surface number)
SPH: spherical surface or flat surface (protection glass surface)
R: radius of curvature
T: axial surface interval
Nd: refractive index of optical material with respect to d line
Vd: Abbe number of optical material with respect to d line
TLY: inclination angle (°) of optical axis on a cross-section (XZ cross-section) of specific surface (TLY may vary before and after a specific surface)
DCX: deviation of optical axis in X-axis direction on cross-section (XZ cross-section) of specific surface Example 1

In a projection see-through device of Example 1, data on an optical surface constituting a light guide member and a projection lens is shown in Table 1. For example, FFS1 means the first surface S11, FFS2 means the second surface S12, and FFS3 means the third surface S13. Furthermore, ASP1 means an emission surface of a first lens of the projection lens, and ASP2 means an incidence surface of the first lens.

TABLE 1

| No | Type | R | T | Nd | Vd |
|----|------|---|---|-----|-----|
| 1 | SPH | ∞ | 20.00 | | |
| 2 | FFS1 | — | 5.50 | 1.525 | 55.95 |
| 3 | FFS2 | — | −5.50 | 1.525 | 55.95 |
| 4 | FFS1 | — | 10.00 | 1.525 | 55.95 |
| 5 | FFS3 | — | −20.00 | 1.525 | 55.95 |
| 6 | FFS4 | — | 10.00 | 1.525 | 55.95 |
| 7 | FFS5 | — | −10.00 | 1.525 | 55.95 |
| 8 | FFS4 | — | −0.50 | | |
| 9 | ASP1 | −6.137 | −6.00 | 1.525 | 55.95 |
| 10 | ASP2 | 6.711 | −0.50 | | |
| 11 | ASP3 | 6.613 | −1.20 | 1.585 | 29.90 |
| 12 | ASP4 | −17.825 | −6.00 | | |
| 13 | ASP5 | −7.024 | −6.00 | 1.525 | 55.95 |
| 14 | ASP6 | 32.129 | −3.91 | | |
| 15 | SPH | ∞ | −1.60 | 1.458 | 67.82 |
| 16 | image surface | | | | |

In regard to the optical surface in the light guide member constituting Example 1, the optical axis inclination angle (tilt) TLY on the cross section and the optical axis deviation (decenter) DCX are shown in Table 2. As for the fourth surface S14, the inclination of the angle in a second pass is considered.

TABLE 2

| No | Type | TLY (before surface) | DCX (after surface) | TLY (after surface) |
|----|------|----------------------|---------------------|---------------------|
| 2 | FFS1 | 0 | 0 | 0 |
| 3 | FFS2 | −28 | 0 | 28 |
| 4 | FFS1 | 0 | 0 | 0 |
| 5 | FFS3 | 0 | 23.17 | −44.19 |
| 6 | FFS4 | 53 | 0 | 53 |
| 7 | FFS5 | −35 | 0 | −35 |
| 8 | FFS4 | 0 | 10 | −17.78 |

In regard to each optical surface in the light guide member constituting Example 1, the coefficient $Ak_{m,n}$ expanded as a polynomial of a free-form surface is shown in Table 3. In Table 3, symbols m and n mean variables or degrees in the coefficient $Ak_{m,n}$. A symbol FFSk (where k=1 to 5) means a k-th surface among the first to fifth surfaces S11 to S15 which are free-form surfaces. The coefficient $Ak_{m,n}$ means a coefficient of each term $x^m \cdot y^n$ which constitutes a polynomial expression representing the k-th surface.

TABLE 3

| m | n | FFS1 | FFS2 | FFS3 | FFS4 | FFS5 |
|---|---|------|------|------|------|------|
| 2 | 0 | −6.070E−03 | −1.115E−02 | −5.518E−03 | 7.456E−03 | 7.176E−03 |
| 0 | 2 | −6.428E−03 | −1.033E−02 | −5.843E−03 | −1.928E−02 | −1.403E−02 |
| 3 | 0 | 0.000E+00 | 1.034E−04 | 0.000E+00 | 2.404E−04 | 1.204E−03 |
| 1 | 2 | −2.437E−04 | −8.469E−05 | −2.014E−04 | 7.842E−04 | 2.030E−04 |
| 4 | 0 | 8.234E−07 | −3.110E−06 | 6.185E−07 | 1.602E−05 | 1.512E−04 |
| 2 | 2 | −1.084E−05 | 7.972E−06 | −8.142E−06 | 9.630E−05 | 2.067E−05 |
| 0 | 4 | 3.564E−05 | 1.023E−05 | 2.678E−05 | −1.340E−05 | −2.956E−05 |
| 5 | 0 | 5.154E−08 | −3.707E−08 | 3.520E−08 | −5.360E−07 | 1.381E−05 |
| 3 | 2 | 1.671E−06 | −1.035E−07 | 1.141E−06 | −3.882E−06 | 2.044E−05 |
| 1 | 4 | 0.000E+00 | −5.741E−07 | 0.000E+00 | 4.412E−05 | 4.589E−06 |
| 6 | 0 | −7.659E−10 | 2.404E−08 | −4.755E−10 | −6.913E−06 | −1.274E−06 |
| 4 | 2 | −3.089E−08 | −3.373E−09 | −1.918E−08 | −6.764E−07 | −5.177E−07 |
| 2 | 4 | 4.831E−08 | 7.923E−08 | 3.000E−08 | −8.697E−06 | −1.726E−06 |
| 0 | 6 | −5.048E−07 | −1.852E−07 | −3.134E−07 | 5.804E−05 | 3.361E−06 |

In Table 3 and subsequent tables, digits after E in a numerical value mean a decimal exponent, and for example, "−6.070E−03" means $−6.070 \times 10^{−03}$.

Coefficients of an aspheric surface of the optical surface constituting the projection lens in the projection see-through device of Example 1 are shown in Table 4.

TABLE 4

|    | ASP1 | ASP2 | ASP3 | ASP4 | ASP5 | ASP6 |
|----|------|------|------|------|------|------|
| K  | 0 | 0 | 0 | 0 | 0 | 0 |
| B4 | 1.969E−04 | −2.830E−03 | −2.165E−03 | 4.007E−04 | 7.860E−04 | −7.467E−05 |
| B6 | 5.824E−06 | 1.443E−04 | 7.601E−05 | −1.350E−04 | −1.371E−05 | 9.941E−07 |
| B8 | 3.833E−07 | −4.093E−06 | −4.139E−06 | 7.564E−07 | 2.842E−07 | −2.326E−07 |

In Table 4, symbols K and Bi represent coefficients for specifying aspheric surfaces of aspheric surfaces APS1 to APS6 which are lens surfaces of three lenses 31, 32, 33 constituting the projection lens 30. An aspheric surface is specified by the following polynomial expression (aspheric surface expression).

$$z = \frac{(1/R) \times h^2}{1 + \sqrt{1 - (K+1) \times (1/R)^2 \times h^2}} + B_4 h^4 + B_6 h^6 + B_8 h^8$$

Here, R represents a radius of curvature of each surface, h represents the height from the optical axis, K represents a conical coefficient of a target lens surface, and Bi (where i=4, 6, 8, . . . ) represents a high-order aspheric surface coefficient of the target lens surface.

Figure 8:
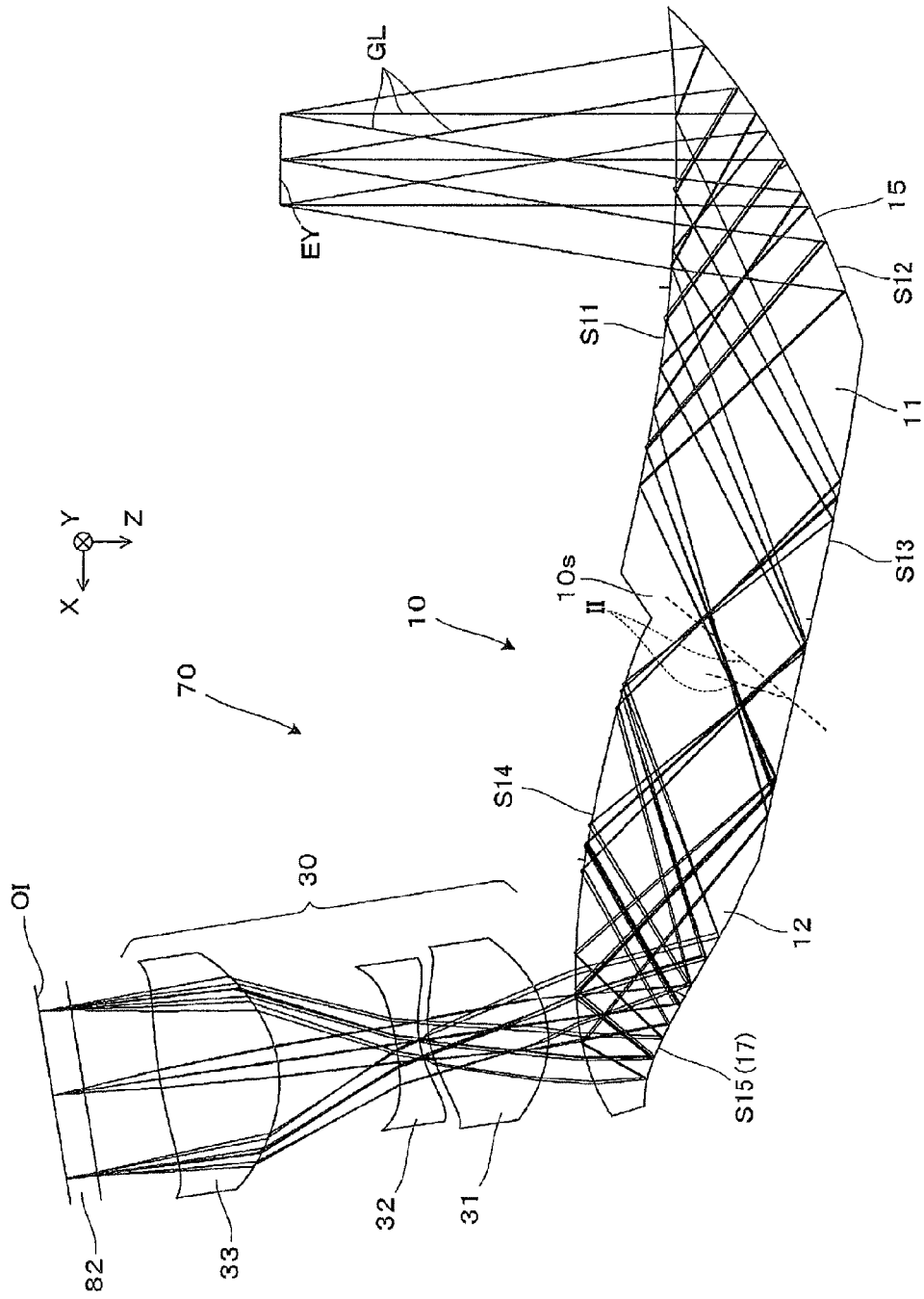
FIG. 8 is a diagram illustrating an optical system of Example 1.

FIG. 8 is a sectional view of the projection see-through device 70 of Example 1. However, a light flux is deviated not only on a reference surface SR but also in the Y direction from the reference surface SR. In the projection see-through device 70, the light guide member 10 includes the first surface S11 having weak negative refractive power, the second surface S12 having comparatively strong positive refractive power, the third surface S13 having comparatively weak positive refractive power, the fourth surface S14 having comparatively strong positive refractive power, and the fifth surface S15 having comparatively weak negative refractive power. Here, the fourth surface S14 functions as a reflection surface and a refraction surface. Specifically, the fourth surface S14 is a total reflection surface with respect to a light flux (actually, light from the fifth surface S15) reversed from the third surface S13, and is a transmission surface with respect to a light flux (actually, light from the projection lens 30) reversed from the fifth surface S15. That is, the fourth surface S14 has both a function of bending the optical path and a function relating to convergence of a light flux. The projection lens 30 includes a first lens 31 having positive refractive power, a second lens 32 having negative refractive power, and a third lens 33 having positive refractive power. A specific specification of the optical system of Example 1 is as follows. A horizontal viewing angle is 20.1°, a vertical viewing angle is 11.4°, the size of a display area of the video display element is 9.22×5.18 mm, a pupil diameter is 5 mm, and a focal distance is about 26 mm.

FIGS. 9A to 9I show aberration on the position of the image surface OI which is the reference position of the video display element 82 in the optical system of Example 1. That is, the amount of aberration shown in the respective drawings becomes the amount of aberration in the image surface of the video display element when a light beam is reversed for convenience. In each aberration diagram, the horizontal axis represents a position in a pupil, and the vertical axis represents the amount of aberration in units of micron. The size of one scale on the vertical axis is 10 microns. Specifically, FIG. 9A shows aberration in the Y and X directions at an azimuth of 10° in the X direction and 5.7° in the Y direction, FIG. 9B shows aberration in the Y and X directions at an azimuth of 0.0° in the X direction and 5.7° in the Y direction, and FIG. 9C shows aberration in the Y and X directions at an azimuth of −10° in the X direction and 5.7° in the Y direction. FIG. 9D shows aberration in the Y and X directions at an azimuth of 10° in the X direction and 0.0° in the Y direction, FIG. 9E shows aberration in the Y and X directions at an azimuth of 0.0° in the X direction and 0.0° in the Y direction, and FIG. 9F shows aberration in the Y and X directions at an azimuth of −10° in the X direction and 0.0° in the Y direction. FIG. 9G shows aberration in the Y and X directions at an azimuth of 10° in the X direction and −5.7° in the Y direction, FIG. 9H shows aberration in the Y and X directions at an azimuth of 0.0° in the X direction and −5.7° in the Y direction, and FIG. 9I shows aberration in the Y and X directions at an azimuth of −10° in the X direction and −5.7° in the Y direction.

FIGS. 10A to 10I show aberration on the position of the intermediate image in the optical system of Example 1. The azimuth in the X direction and the azimuth in the Y direction correspond to FIGS. 9A to 9I. Similarly to FIGS. 9A to 9I, in each aberration diagram, the horizontal axis represents a position in a pupil, and the vertical axis represents the amount of aberration in units of micron. The size of one scale on the vertical axis is 100 microns.

For example, when comparing the value calculated according to Expression (9) of spreading width W in terms of a spot diagram with aberration shown in FIGS. 9A to 9I, that is, the value of the spreading width Wb with the value calculated according to Expression (9) of the spreading width W in terms of a spot diagram with aberration shown in FIGS. 10A to 10I, that is, the value of the spreading width Wa, the spreading width Wa on the position of the image surface II of the intermediate image is greater than 10 times the spreading width Wb on the position of the image surface OI of the video display element 82.

Example 2

In a projection see-through device of Example 2, data on an optical surface constituting a light guide member and a projection lens is shown in Table 5.

TABLE 5

| No | Type | R | T | Nd | Vd |
|---|---|---|---|---|---|
| 1 | SPH | ∞ | 22.00 | | |
| 2 | FFS1 | — | 5.50 | 1.525 | 55.95 |
| 3 | FFS2 | — | −5.50 | 1.525 | 55.95 |
| 4 | FFS1 | — | 10.00 | 1.525 | 55.95 |
| 5 | FFS3 | — | −20.00 | 1.525 | 55.95 |
| 6 | FFS4 | — | 14.00 | 1.525 | 55.95 |
| 7 | FFS5 | — | −10.00 | 1.525 | 55.95 |
| 8 | FFS6 | — | −2.00 | | |
| 9 | ASP1 | −20.674 | −7.00 | 1.525 | 55.95 |
| 10 | ASP2 | 9.056 | −0.50 | | |
| 11 | ASP3 | 7.190 | −1.00 | 1.585 | 29.90 |
| 12 | ASP4 | 54.244 | −19.37 | | |
| 13 | ASP5 | −10.384 | −8.15 | 1.525 | 55.95 |
| 14 | ASP6 | −23.928 | −4.98 | | |
| 15 | SPH | ∞ | −1.60 | 1.458 | 67.82 |

TABLE 5-continued

| No | Type | R | T | Nd | Vd |
|---|---|---|---|---|---|
| 16 | image surface | | | | |

In regard to the optical surface in the light guide member constituting Example 2, the optical axis inclination angle (tilt) TLY on the cross section and the optical axis deviation (decenter) DCX are shown in Table 6.

TABLE 6

| No | Type | TLY (before surface) | DCX (after surface) | TLY (after surface) |
|---|---|---|---|---|
| 2 | FFS1 | 0 | 0 | 0 |
| 3 | FFS2 | −29 | 0 | 29 |
| 4 | FFS1 | 0 | 0 | 0 |
| 5 | FFS3 | 0 | 24.171 | −39.58 |
| 6 | FFS4 | 50 | 0 | 50 |
| 7 | FFS5 | −50 | 0 | −50 |
| 8 | FFS6 | 0 | 0 | 0 |

Figure 11:
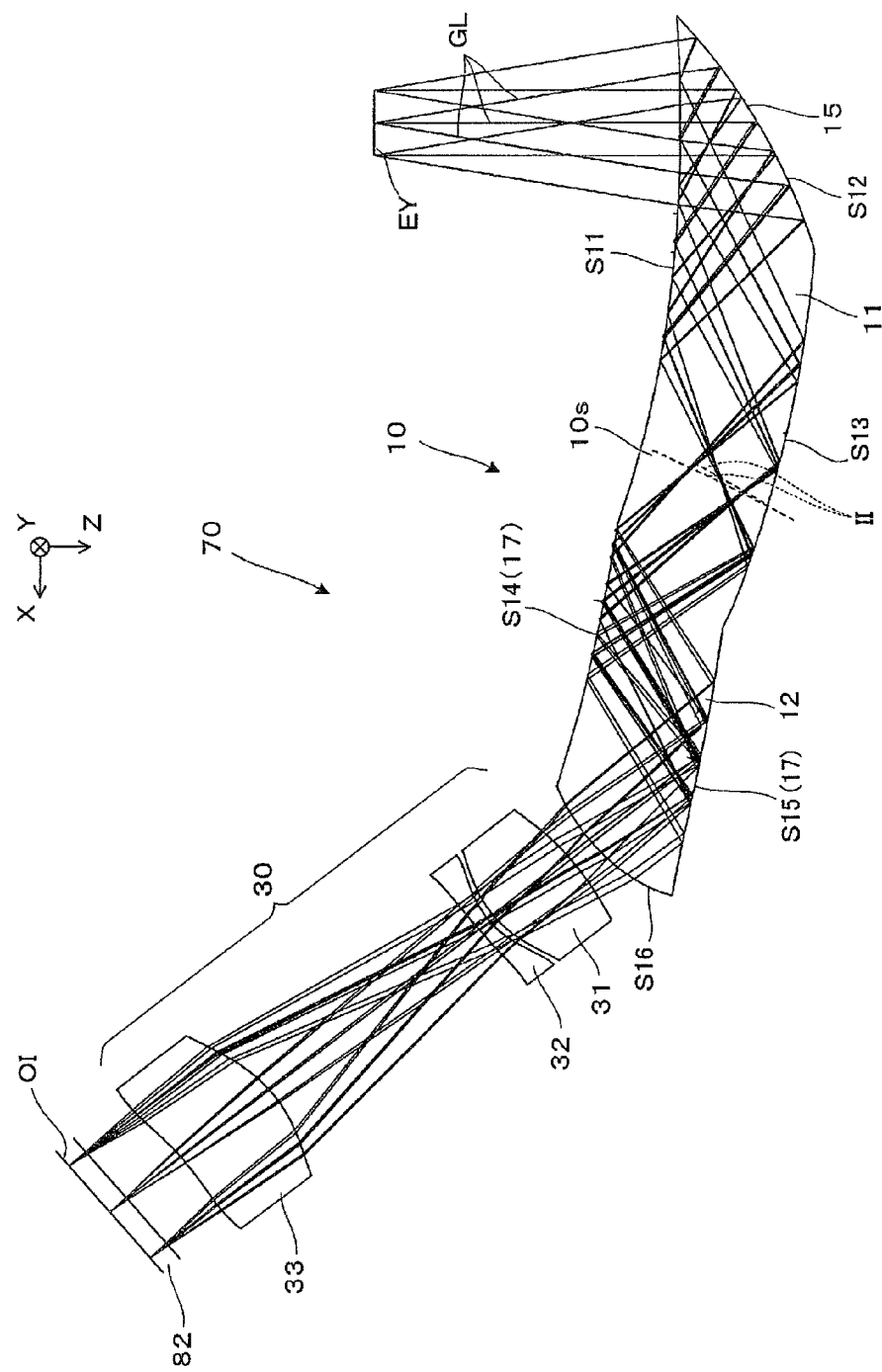
FIG. 11 is a diagram illustrating an optical system of Example 2.
Figure 13C:
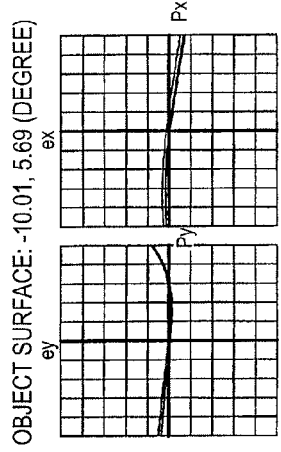
FIGS. 13A, 13B, 13C, 13D, 13E, 13F, 13G, 13H, and 13I are diagrams illustrating an aberration on a position of an intermediate image in the optical system of Example 2.
Figure 13B:
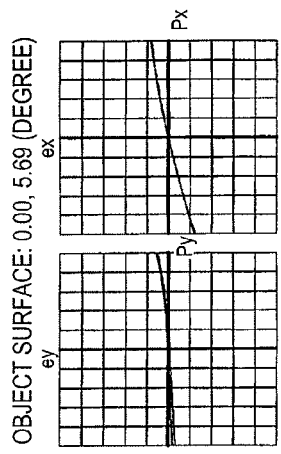
Figure 13A:
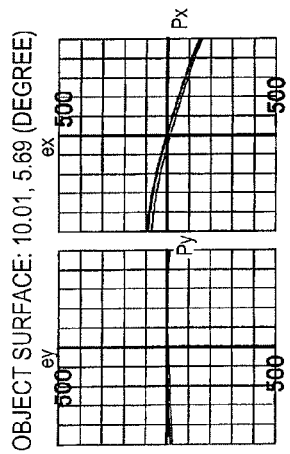
Figure 13F:
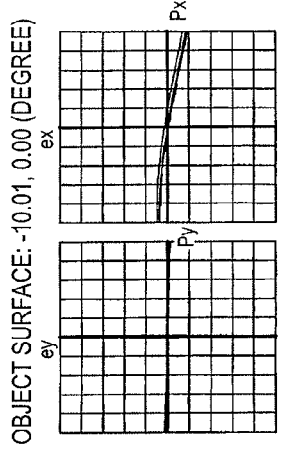
Figure 13E:
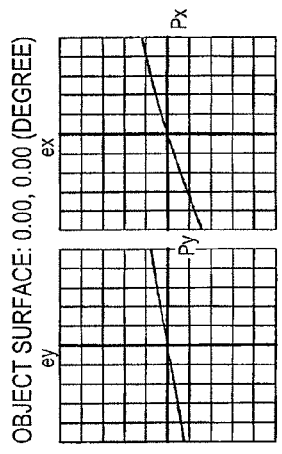
Figure 13D:
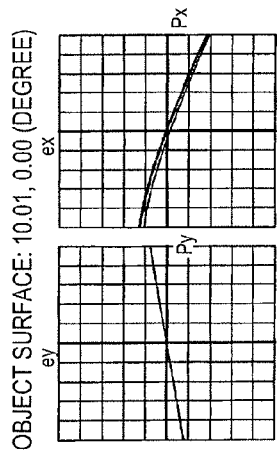
Figure 13I:
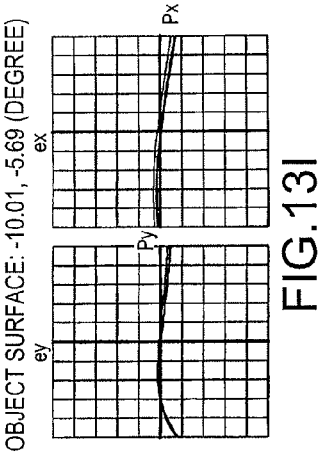
Figure 13H:
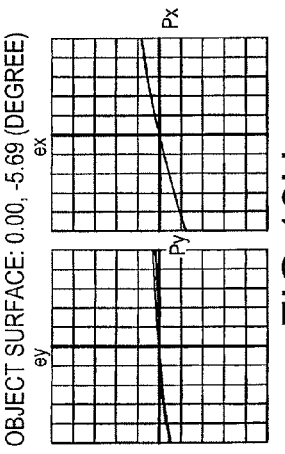
Figure 13G:
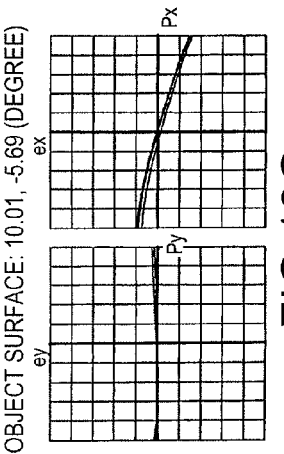

In regard to each optical surface in the light guide member constituting Example 2, the coefficient expanded as a polynomial of a free-form surface is shown in Table 7. In Table 7, symbols m and n mean variables or degrees in the coefficient $Ak_{m,n}$. A symbol FFSk (where k=1 to 6) means a k-th surface among the first to sixth surfaces S11 to S16 which are free-form surfaces. As shown in FIG. 11, in this example, it is assumed that the light guide member 10 has the sixth surface S16 which is continuously adjacent to the fourth surface S14. As shown in the drawing, the sixth surface S16 is a light incidence surface, and has a function relating to convergence of a light flux. The fourth surface S14 has a function of bending the optical path. That is, in Example 2, the functions in the fourth surface S14 of Example 1 are separated to the fourth surface S14 and the sixth surface S16.

TABLE 7

| m | n | FFS1 | FFS2 | FFS3 | FFS4 | FFS5 | FFS6 |
|---|---|---|---|---|---|---|---|
| 2 | 0 | −4.110E−03 | −1.005E−02 | −3.798E−03 | −3.374E−03 | −2.584E−03 | 3.105E−02 |
| 0 | 2 | −6.261E−03 | −1.022E−02 | −5.949E−03 | −2.723E−02 | 5.720E−03 | 3.039E−02 |
| 3 | 0 | 1.513E−05 | 8.269E−06 | 1.513E−05 | 4.878E−05 | 5.891E−06 | 5.084E−05 |
| 1 | 2 | −8.802E−06 | −4.719E−05 | −8.802E−06 | 1.315E−03 | 1.092E−04 | −4.205E−04 |
| 4 | 0 | −3.283E−07 | −2.484E−06 | −3.283E−07 | 1.997E−05 | 8.630E−06 | 3.586E−05 |
| 2 | 2 | 1.110E−05 | −2.325E−07 | 1.110E−05 | 5.553E−05 | 1.338E−05 | −7.045E−05 |
| 0 | 4 | −1.231E−05 | −3.745E−06 | −1.231E−05 | 1.172E−04 | 4.272E−06 | −6.522E−05 |
| 5 | 0 | −7.697E−08 | 7.994E−08 | −7.697E−08 | −7.495E−07 | 3.889E−07 | 1.241E−05 |
| 3 | 2 | −1.577E−06 | −5.251E−08 | −1.577E−06 | −1.319E−05 | −6.510E−07 | 5.310E−06 |
| 1 | 4 | −1.721E−07 | 6.772E−08 | −1.721E−07 | −2.496E−05 | −1.061E−06 | −1.205E−06 |
| 6 | 0 | 1.800E−09 | 2.414E−09 | 1.800E−09 | −1.502E−07 | 1.016E−09 | 1.206E−06 |
| 4 | 2 | 1.544E−08 | 3.116E−08 | 1.544E−08 | −1.443E−07 | 2.158E−09 | 3.052E−06 |
| 2 | 4 | 2.672E−08 | 7.908E−09 | 2.672E−08 | 1.848E−06 | 7.531E−08 | 2.561E−06 |
| 0 | 6 | 3.158E−07 | 9.774E−10 | 3.158E−07 | 3.779E−06 | 1.021E−07 | 9.437E−07 |

Coefficients of an aspheric surface of the optical surface constituting the projection lens in the projection see-through device of Example 2 are shown in Table 8.

TABLE 8

|    | ASP1 | ASP2 | ASP3 | ASP4 | ASP5 | ASP6 |
|----|------|------|------|------|------|------|
| K  | 0 | 0 | 0 | 0 | 0 | 0 |
| B4 | −2.343E−05 | −2.140E−03 | −6.380E−04 | −1.244E−04 | 2.638E−04 | 1.289E−04 |
| B6 | 1.019E−06 | −6.197E−06 | −1.496E−05 | −6.791E−06 | 7.578E−07 | 9.812E−06 |
| B8 | 5.340E−08 | −9.118E−08 | −1.696E−07 | −2.134E−08 | 1.763E−08 | −1.069E−07 |

In Table 8, symbols K and Bi represent coefficients which specify aspheric surfaces of aspheric surfaces APS1 to APS6 which are lens surfaces of three lenses 31, 32, 33 constituting the projection lens 30.

FIG. 11 is a sectional view of the projection see-through device 70 of Example 2. In the projection see-through device 70, the light guide member 10 includes the first surface S11 having weak negative refractive power, the second surface S12 having comparatively strong positive refractive power, the third surface S13 having comparatively weak positive refractive power, the fourth surface S14 having comparatively weak negative refractive power, the fifth surface S15 having comparatively weak positive refractive power, and the sixth surface S16 having comparatively strong positive refractive power. The projection lens 30 includes the first lens 31 having positive refractive power, the second lens 32 having negative refractive power, and the third lens 33 having positive refractive power. A specific specification of the optical system of Example 2 is as follows. A horizontal viewing angle is 20.1°, a vertical viewing angle is 11.4°, the size of a display area of the video display element is 9.22×5.18 mm, a pupil diameter is 5 mm, and a focal distance is about 26 mm. In this example, the sign of curvature in the x direction and the sign of curvature in the y direction are reversed at the origin of the fifth surface S15.

FIGS. 12A to 12I show aberration on the position of the image surface OI which is the reference position of the video display element 82 in the optical system of Example 2. That is, the amount of aberration shown in the respective drawings becomes the amount of aberration in the image surface of the video display element when a light beam is reversed for convenience. In each aberration diagram, the horizontal axis represents a position in a pupil, and the vertical axis represents the amount of aberration in units of micron. Specifically, FIG. 12A shows aberration in the Y and X directions at an azimuth of 10° in the X direction and 5.7° in the Y direction, FIG. 12B shows aberration in the Y and X directions at an azimuth of 0.0° in the X direction and 5.7° in the Y direction, and FIG. 12C shows aberration in the Y and X directions at an azimuth of −10° in the X direction and 5.7° in the Y direction. FIG. 12D shows aberration in the Y and X directions at an azimuth of 10° in the X direction and 0.0° in the Y direction, FIG. 12E shows aberration in the Y and X directions at an azimuth of 0.0° in the X direction and 0.0° in the Y direction, and FIG. 12F shows aberration in the Y and X directions at an azimuth of −10° in the X direction and 0.0° in the Y direction. FIG. 12G shows aberration in the Y and X directions at an azimuth of 10° in the X direction and −5.7° in the Y direction, FIG. 12H shows aberration in the Y and X directions at an azimuth of 0.0° in the X direction and −5.7° in the Y direction, and FIG. 12I shows aberration in the Y and X directions at an azimuth of −10° in the X direction and −5.7° in the Y direction.

FIGS. 13A to 13I show aberration on the position of the intermediate image in the optical system of Example 2. The azimuth in the X direction and the azimuth in the Y direction correspond to FIGS. 12A to 12I.

For example, when comparing the value calculated according to Expression (9) of spreading width W in terms of a spot diagram with aberration shown in FIGS. 12A to 12I, that is, the value of the spreading width Wb with the value calculated according to Expression (9) of the spreading width W in terms of a spot diagram with aberration shown in FIGS. 13A to 13I, that is, the value of the spreading width Wa the spreading width Wa on the position of the image surface II of the intermediate image is greater than 10 times the spreading width Wb on the position of the image surface OI of the video display element 82.

Example 3

In a projection see-through device of Example 3, data on an optical surface constituting a light guide member and a projection lens is shown in Table 9.

TABLE 9

| No | Type | R | T | Nd | Vd |
|----|------|---|---|-----|-----|
| 1 | SPH | ∞ | 20.00 | | |
| 2 | FFS1 | — | 5.50 | 1.525 | 55.95 |
| 3 | FFS2 | — | −5.50 | 1.525 | 55.95 |
| 4 | FFS1 | — | 9.00 | 1.525 | 55.95 |
| 5 | FFS3 | — | −17.00 | 1.525 | 55.95 |
| 6 | FFS4 | — | 7.00 | 1.525 | 55.95 |
| 7 | FFS5 | — | 2.00 | 1.525 | 55.95 |
| 8 | ASP1 | 7.697 | 4.00 | 1.525 | 55.95 |
| 9 | ASP2 | −4.907 | 0.50 | | |
| 10 | ASP3 | −5.158 | 1.50 | 1.585 | 29.90 |
| 11 | ASP4 | 5.276 | 2.84 | | |
| 12 | ASP5 | 6.501 | 6.00 | 1.525 | 55.95 |
| 13 | ASP6 | −10.192 | 9.51 | | |
| 14 | SPH | ∞ | 1.60 | 1.458 | 67.82 |
| 15 | image surface | | | | |

In regard to the optical surface in the light guide member constituting Example 3, the optical axis inclination angle (tilt) TLY on the cross section and the optical axis deviation (decenter) DCX are shown in Table 10.

TABLE 10

| No | Type | TLY (before surface) | DCX (after surface) | TLY (after surface) |
|----|------|------|------|------|
| 2 | FFS1 | 0 | 0 | 0 |
| 3 | FFS2 | −26 | 0 | 26 |
| 4 | FFS1 | 0 | 0 | 0 |
| 5 | FFS3 | 0 | 19.893504 | −29.394622 |
| 6 | FFS4 | 60 | 0 | 60 |
| 7 | FFS5 | 0 | 0 | 0 |

In regard to each optical surface in the light guide member constituting Example 3, the coefficient expanded as a polynomial of a free-form surface is shown in Table 11. In Table 11, symbols m and n means variables or degrees in the coefficient $Ak_{m,n}$. A symbol FFSk (where k=1 to 5) means a k-th surface among the first to fifth surfaces S11 to S15 which are free-form surfaces.

TABLE 11

| m | n | FFS1 | FFS2 | FFS3 | FFS4 | FFS5 |
|---|---|------|------|------|------|------|
| 2 | 0 | −1.254E−02 | −1.211E−02 | −1.191E−02 | −2.323E−03 | −7.675E−02 |
| 0 | 2 | −1.031E−02 | −1.364E−02 | −9.899E−03 | 4.233E−04 | −6.169E−02 |
| 3 | 0 | 5.751E−04 | 1.604E−04 | 5.751E−04 | −3.570E−04 | −1.002E−03 |
| 1 | 2 | 2.984E−05 | 7.274E−05 | 2.984E−05 | 5.402E−04 | 1.477E−03 |
| 4 | 0 | −1.456E−05 | −1.762E−05 | −1.456E−05 | 1.163E−04 | −1.143E−03 |
| 2 | 2 | 3.029E−05 | 1.938E−06 | 3.029E−05 | −1.986E−04 | −3.046E−03 |
| 0 | 4 | 5.757E−06 | 3.553E−06 | 5.757E−06 | 2.752E−04 | −1.033E−03 |
| 5 | 0 | −2.015E−07 | 1.015E−06 | −2.015E−07 | 4.365E−08 | 8.729E−05 |
| 3 | 2 | −2.008E−06 | −5.253E−07 | −2.008E−06 | 6.700E−06 | −1.739E−05 |
| 1 | 4 | 2.748E−06 | 6.960E−07 | 2.748E−06 | −6.458E−05 | −2.971E−05 |
| 6 | 0 | 6.781E−09 | −3.238E−08 | 6.781E−09 | −1.541E−06 | 7.581E−05 |
| 4 | 2 | 7.881E−08 | 4.590E−08 | 7.881E−08 | 8.640E−07 | 2.208E−04 |
| 2 | 4 | −1.309E−07 | −6.944E−08 | −1.309E−07 | 2.069E−05 | 2.278E−04 |
| 0 | 6 | −4.681E−07 | −1.134E−07 | −4.681E−07 | −2.282E−06 | 6.185E−05 |

Coefficients of an aspheric surface of the optical surface constituting the projection lens in the projection see-through device of Example 3 are shown in Table 12.

TABLE 12

|    | ASP1 | ASP2 | ASP3 | ASP4 | ASP5 | ASP6 |
|----|------|------|------|------|------|------|
| K  | 0 | 0 | 0 | 0 | 0 | 0 |
| B4 | −2.434E−03 | 2.595E−03 | 2.499E−03 | −5.821E−03 | −1.978E−03 | 2.139E−04 |
| B6 | 3.219E−05 | −4.997E−05 | 7.246E−05 | 2.617E−04 | 1.853E−05 | −5.137E−06 |
| B8 | 2.641E−06 | 5.850E−06 | −1.484E−06 | −8.002E−06 | −6.175E−07 | −1.059E−07 |

In Table 12, symbols K and Bi represent coefficients for specifying aspheric surfaces of aspheric surfaces APS1 to APS6 which are lens surfaces of three lenses 31, 32, 33 constituting the projection lens 30.

Figure 14:
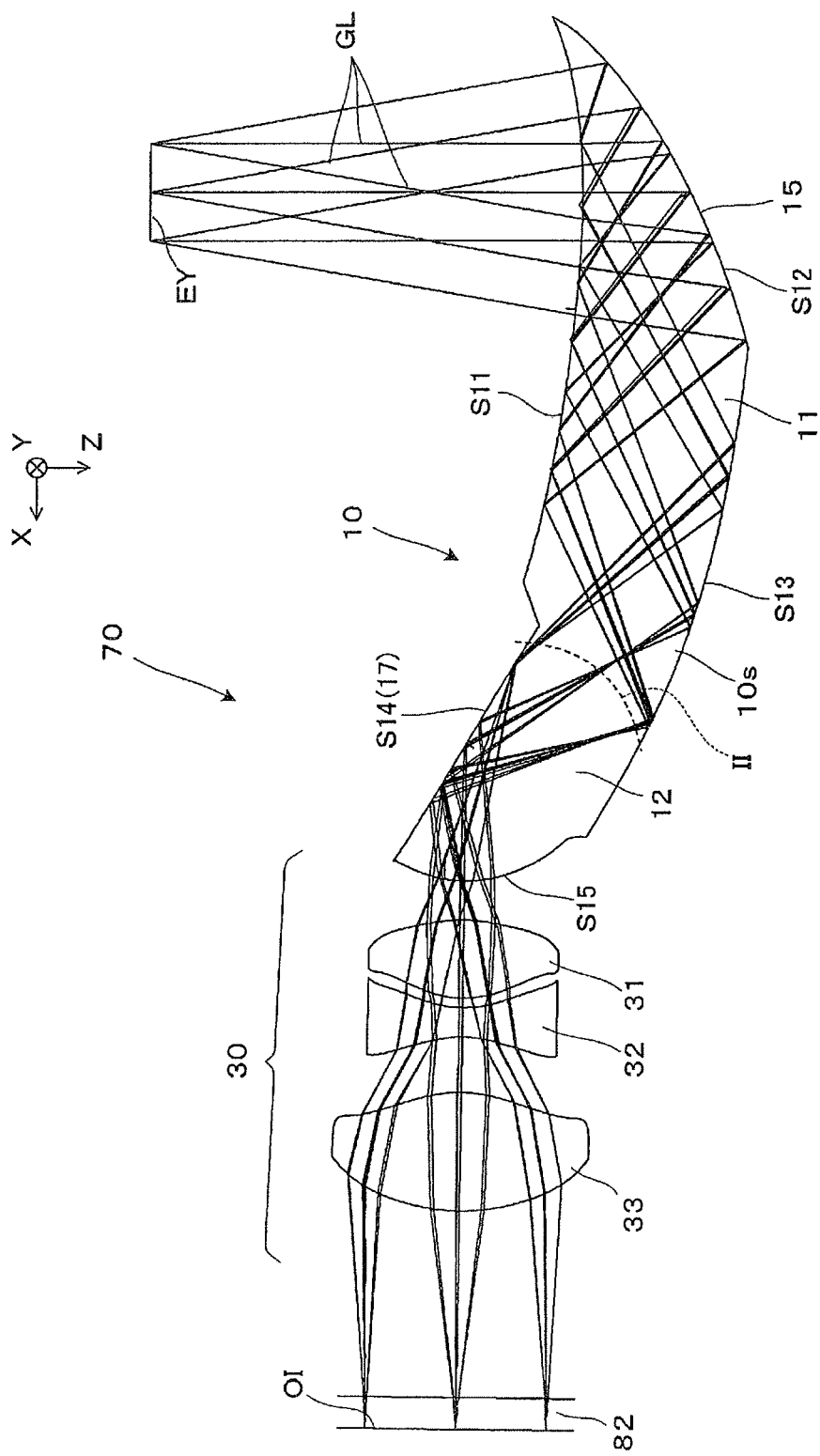
FIG. 14 is a diagram illustrating an optical system of Example 3.

FIG. 14 is a sectional view of the projection see-through device 70 of Example 3. In the projection see-through device 70, the light guide member 10 includes the first surface S11 having weak negative refractive power, the second surface S12 having comparatively strong positive refractive power, the third surface S13 having comparatively weak positive refractive power, the fourth surface S14 having comparatively weak negative refractive power, and the fifth surface S15 having comparatively strong positive refractive power. Here, the fifth surface S15 has the function (the function of the sixth surface S16 of Example 2) of a part of the fourth surface S14 of Example 1 relating to convergence of a light flux. That is, Example 3 of FIG. 14 may be considered as a case where the fifth surface S15 among the first to fifth surfaces S11 to S15 of Example 1 shown in FIG. 8 is omitted. The projection lens 30 has the first lens 31 having positive refractive power, the second lens 32 having negative refractive power, and the third lens 33 having positive refractive power. A specific specification of the optical system of Example 3 is as follows. A horizontal viewing angle is 20.1°, a vertical viewing angle is 11.4°, the size of a display area of the video display element is 9.22×5.18 mm, a pupil diameter is 5 mm, and a focal distance is about 26 mm. In this example, the sign of curvature in the x direction and the sign of curvature in the y direction are reversed at the origin of the fourth surface S14.

Figure 15A:
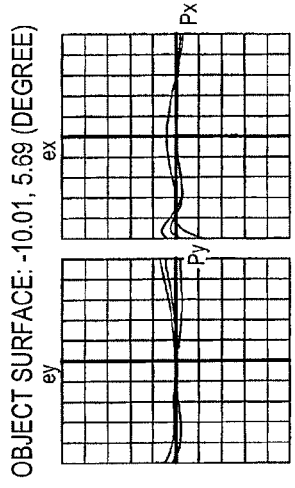
FIGS. 15A, 15B, 15C, 15D, 15E, 15F, 15G, 15H, and 15I are diagrams illustrating an aberration on a reference position of a video element in the optical system of Example 3.
Figure 15B:
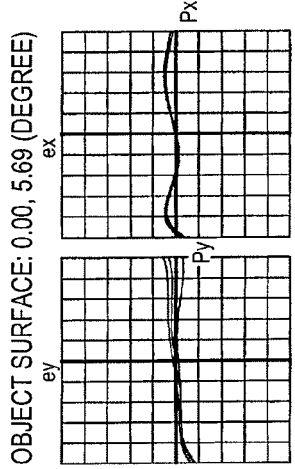
Figure 15C:
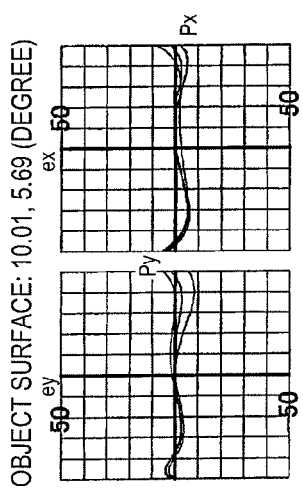
Figure 15D:
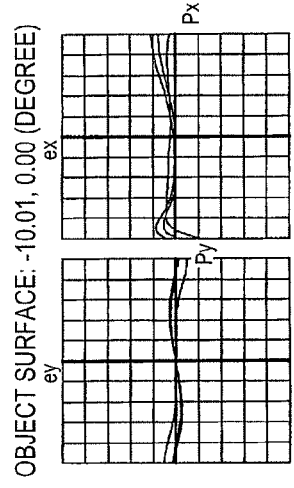
Figure 15E:
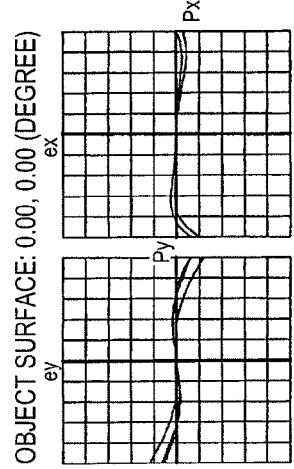
Figure 15F:
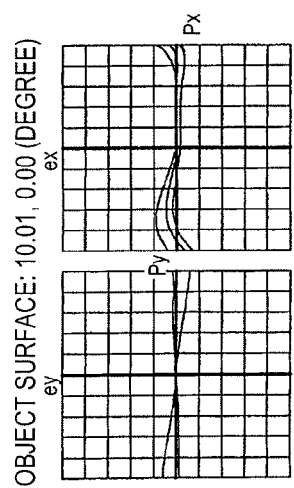
Figure 15G:
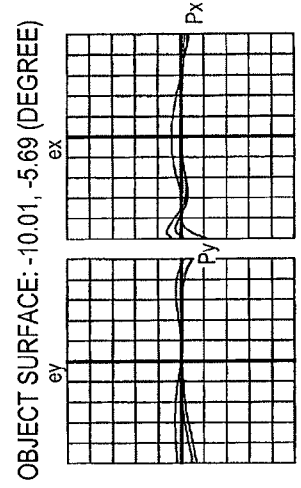
Figure 15H:
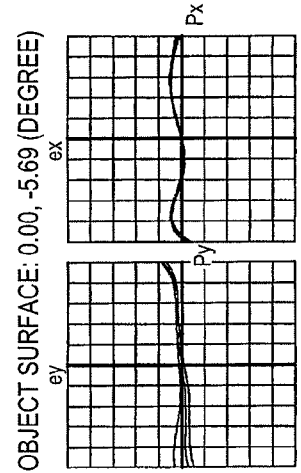
Figure 15I:
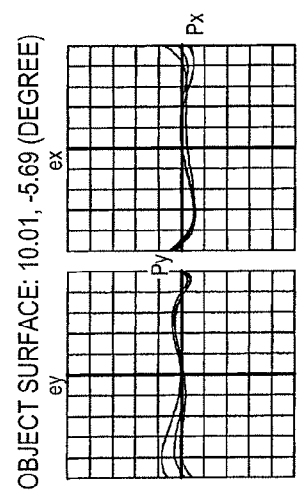

FIGS. 15A to 15I show aberration on the position of the image surface OI which is the reference position of the video display element 82 in the optical system of Example 3. That is, the amount of aberration shown in the respective drawings becomes the amount of aberration in the image surface of the video display element when a light beam is reversed for convenience. In each aberration diagram, the horizontal axis represents a position in a pupil, and the vertical axis represents the amount of aberration in units of micron. Specifically, FIG. 15A shows aberration in the Y and X directions at an azimuth of 10° in the X direction and 5.7° in the Y direction, FIG. 15B shows aberration in the Y and X directions at an azimuth of 0.0° in the X direction and 5.7° in the Y direction, and FIG. 15C shows aberration in the Y and X directions at an azimuth of −10° in the X direction and 5.7° in the Y direction. FIG. 15D shows aberration in the Y and X directions at an azimuth of 10° in the X direction and 0.0° in the Y direction, FIG. 15E shows aberration in the Y and X directions at an azimuth of 0.0° in the X direction and 0.0° in the Y direction, and FIG. 15F shows aberration in the Y and X directions at an azimuth of −10° in the X direction and 0.0° in the Y direction. FIG. 15G shows aberration in the Y and X directions at an azimuth of 10° in the X direction and −5.7° in the Y direction, FIG. 15H shows aberration in the Y and X directions at an azimuth of 0.0° in the X direction and −5.7° in the Y direction, and FIG. 15I shows aberration in the Y and X directions at an azimuth of −10° in the X direction and −5.7° in the Y direction.

FIGS. 16A to 16I show aberration on the position of the intermediate image in the optical system of Example 3. The azimuth in the X direction and the azimuth in the Y direction correspond to FIGS. 15A to 15I.

For example, when comparing the value calculated according to Expression (9) of spreading width W in terms of a spot diagram with aberration shown in FIGS. 15A to 15I, that is, the value of the spreading width Wb with the value calculated according to Expression (9) of the spreading width W in terms of a spot diagram with aberration shown in FIGS. 16A to 16I, that is, the value of the spreading width Wa the spreading width Wa on the position of the image surface II of the intermediate image is greater than 10 times the spreading width Wb on the position of the image surface OI of the video display element 82.

Example 4

In a projection see-through device of Example 4, data on an optical surface constituting a light guide member and a projection lens is shown in Table 13.

TABLE 13

| No | Type | R | T | Nd | Vd |
|---|---|---|---|---|---|
| 1 | SPH | ∞ | 20.00 | | |
| 2 | flat surface | ∞ | 5.80 | 1.525 | 55.95 |
| 3 | FFS1 | — | −5.80 | 1.525 | 55.95 |
| 4 | flat surface | ∞ | 10.00 | 1.525 | 55.95 |
| 5 | flat surface | ∞ | −22.70 | 1.525 | 55.95 |
| 6 | FFS2 | — | 11.90 | 1.525 | 55.95 |
| 7 | FFS3 | — | −11.90 | 1.525 | 55.95 |
| 8 | FFS2 | — | −3.20 | | |
| 9 | FFS4 | — | −6.00 | 1.525 | 55.95 |
| 10 | ASP1 | 11.067 | −1.29 | | |
| 11 | ASP2 | 9.431 | −1.50 | 1.585 | 29.90 |
| 12 | ASP3 | −61.649 | −6.75 | | |
| 13 | ASP4 | −16.964 | −5.50 | 1.525 | 55.95 |
| 14 | ASP5 | 12.848 | −3.00 | | |
| 15 | SPH | ∞ | −1.60 | 1.458 | 67.82 |
| 16 | image surface | | | | |

In regard to the optical surface in the light guide member constituting Example 4, the optical axis inclination angle (tilt) TLY on the cross section and the optical axis deviation (decenter) DCX are shown in Table 14.

TABLE 14

| No | Type | TLY (before surface) | DCX (after surface) | TLY (after surface) |
|---|---|---|---|---|
| 2 | flat surface | 6 | 0 | −6 |
| 3 | FFS1 | −23.8 | 0 | 23.8 |
| 4 | flat surface | 6 | 0 | −6 |
| 5 | flat surface | 6 | 21.1 | −55.25 |
| 6 | FFS2 | 57 | 0 | 57 |
| 7 | FFS3 | −33.06 | 0 | 33.06 |
| 8 | FFS2 | −57 | 11.04 | −11.75 |

In regard to each optical surface in the light guide member constituting Example 4, the coefficient expanded as a polynomial of a free-form surface is shown in Table 15. Among the first to fifth surfaces S11 to S15, the first surface S11 and the third surface S13 are flat surfaces and are in parallel with each other. A lens surface 31a (see FIG. 17) of the first lens 31 among the lenses constituting the projection lens 30 is an aspheric surface asymmetrical to the optical axis. In Table 15, symbols m and n mean variables or degrees in the coefficient $Ak_{m,n}$. A symbol FFSk (where k=1 to 4) means the second surface S12, the fourth surface S14, and the fifth surface S15 which are free-form surfaces, not flat surfaces, among the first to fifth surfaces S11 to S15, and the lens surface 31a of the first lens 31. That is, a symbol FFS1 corresponds to the second surface S12, a symbol FFS2 corresponds to the fourth surface S14, a symbol FFS3 corresponds to the fifth surface S15, and a symbol FFS4 corresponds to the lens surface 31a.

TABLE 15

| m | n | FFS1 | FFS2 | FFS3 | FFS4 |
|---|---|---|---|---|---|
| 2 | 0 | −8.000E−03 | 1.281E−03 | −1.232E−02 | 3.377E−02 |
| 0 | 2 | −7.104E−03 | −2.261E−02 | −1.810E−02 | −5.713E−02 |
| 3 | 0 | −7.472E−06 | 1.253E−04 | 5.624E−06 | 4.621E−03 |
| 1 | 2 | −3.912E−05 | 4.613E−04 | −9.222E−06 | 1.954E−03 |
| 4 | 0 | 7.734E−07 | −1.083E−06 | 5.367E−06 | −1.747E−04 |
| 2 | 2 | 1.827E−07 | −2.670E−06 | 1.341E−05 | 5.794E−05 |
| 0 | 4 | −3.075E−07 | 1.216E−04 | 9.966E−07 | 5.078E−05 |
| 5 | 0 | −2.648E−08 | 5.502E−08 | 5.965E−07 | −4.209E−05 |
| 3 | 2 | −4.661E−08 | −1.212E−06 | 7.145E−07 | −1.351E−05 |
| 1 | 4 | −7.936E−09 | −7.680E−06 | 5.860E−07 | −5.436E−06 |
| 6 | 0 | −5.229E−09 | 2.269E−09 | 2.790E−08 | 2.173E−06 |
| 4 | 2 | −1.021E−08 | 3.050E−08 | 3.560E−08 | 3.457E−06 |
| 2 | 4 | −4.325E−09 | 3.383E−07 | 3.763E−08 | 3.162E−06 |
| 0 | 6 | 1.946E−09 | 1.015E−07 | 9.005E−08 | 2.207E−06 |

Coefficients of an aspheric surface of the optical surface constituting the projection lens in the projection see-through device of Example 4 are shown in Table 16.

TABLE 16

| | ASP1 | ASP2 | ASP3 | ASP4 | ASP5 |
|---|---|---|---|---|---|
| K | −1 | −1 | −1 | −1 | −1 |
| B4 | −2.302E−04 | −1.562E−03 | −1.273E−03 | 1.885E−04 | 3.482E−04 |
| B6 | −4.106E−06 | 6.061E−06 | −4.546E−06 | 3.211E−06 | 4.031E−07 |
| B8 | 1.065E−07 | 1.246E−07 | −1.173E−07 | 3.480E−08 | 2.487E−08 |

In Table 16, symbols K and Bi represent coefficients for specifying aspheric surfaces of aspheric surfaces APS1 to APS5 which are lens surfaces excluding the first lens surface 31a, which is the first lens surface of the lens 31, that is, the surface of the symbol FFS4 among the lens surfaces of the three lenses 31, 32, and 33 constituting the projection lens 30.

Figure 17:
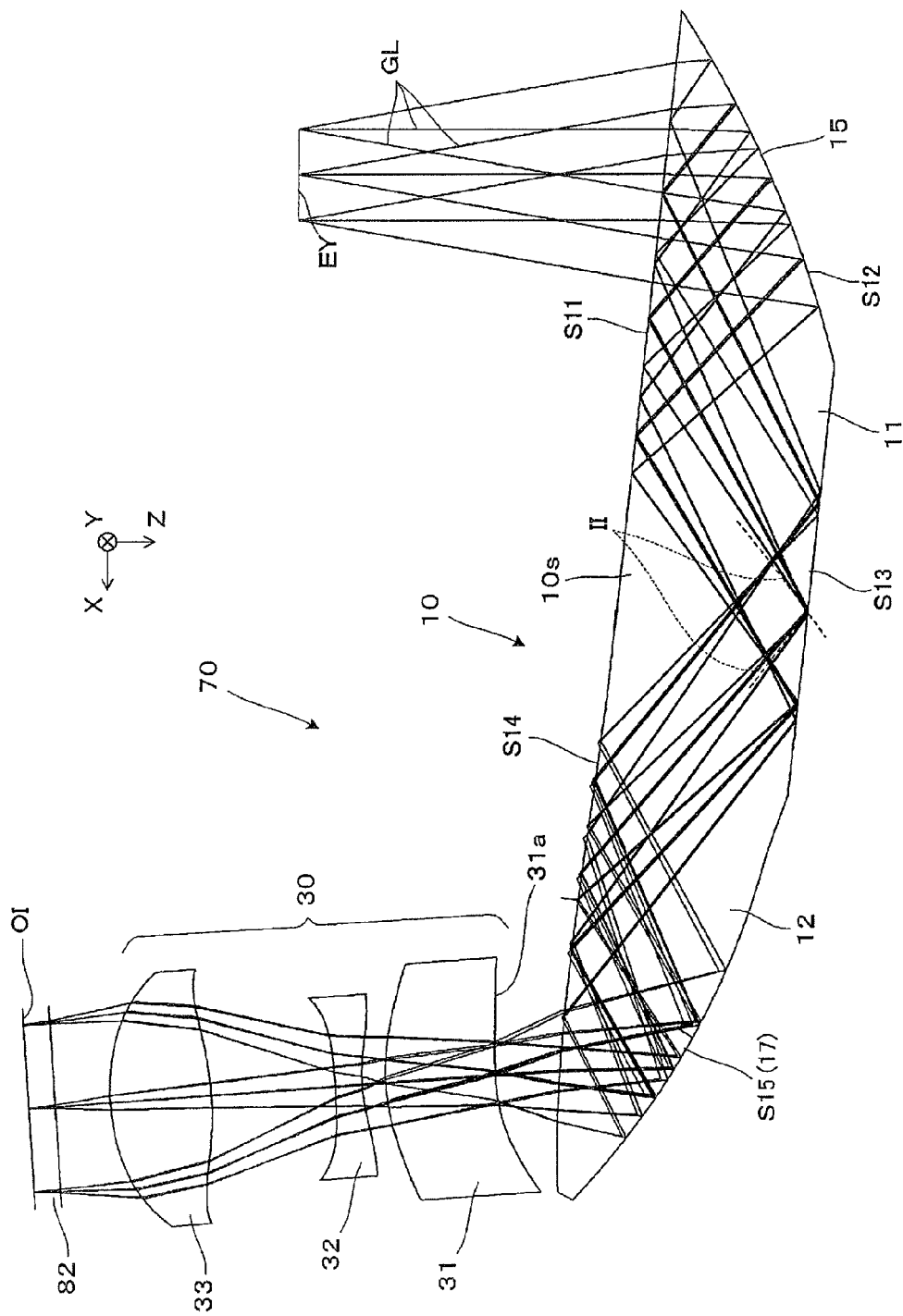
FIG. 17 is a diagram illustrating an optical system of Example 4.

FIG. 17 is a sectional view of the projection see-through device 70 of Example 4. In the projection see-through device 70, the light guide member 10 includes the first surface S11 having no refractive power, the second surface S12 having comparatively strong positive refractive power, the third surface S13 having no refractive power, the fourth surface S14 having comparatively weak positive refractive power, and the fifth surface S15 having comparatively strong positive refractive power. The projection lens 30 includes the first lens 31 having positive refractive power, the second lens 32 having negative refractive power, and the third lens 33 having positive refractive power. As described above, the lens surface 31a of the first lens 31 is an aspheric surface asymmetrical to the optical axis. A specific specification of the optical system of Example 4 is as follows. A horizontal viewing angle is 20.1°, a vertical viewing angle is 11.4°, the size of a display area of the video display element is 9.22×5.18 mm, a pupil diameter is 5 mm, and a focal distance is about 26 mm. In this case, the first surface S11 and the third surface S13 arranged to face each other have parallel flat shapes, and thus, when the observer views an external scene through the first surface S11 and the third surface S13, diopter can be completely 0.

Figures 18A, 18B, 18C, 18D, 18E, 18F, 18G, 18H, 18I:
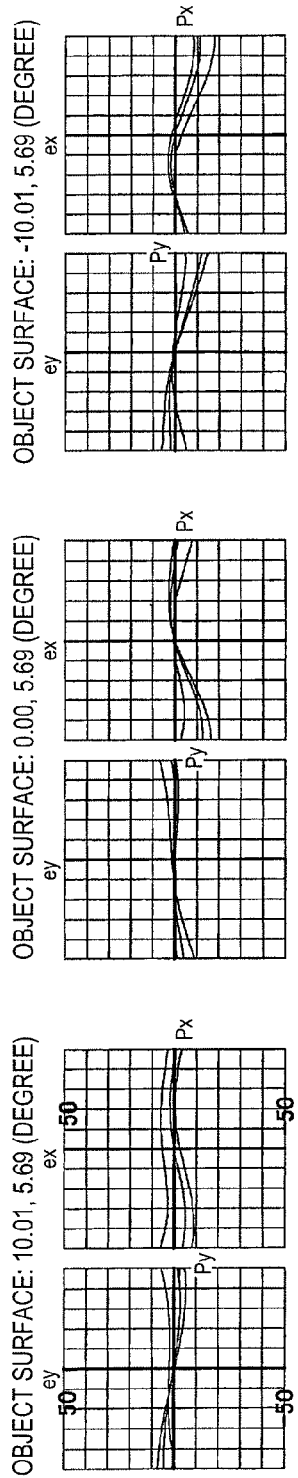
FIGS. 18A, 18B, 18C, 18D, 18E, 18F, 18G, 18H, and 18I are diagrams illustrating an aberration on a reference position of a video element in the optical system of Example 4.
Figure 19A:
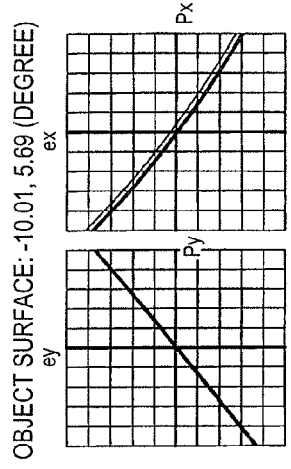
FIGS. 19A, 19B, 19C, 19D, 19E, 19F, 19G, 19H, and 19I are diagrams illustrating an aberration on a position of an intermediate image in the optical system of Example 4.
Figure 19B:
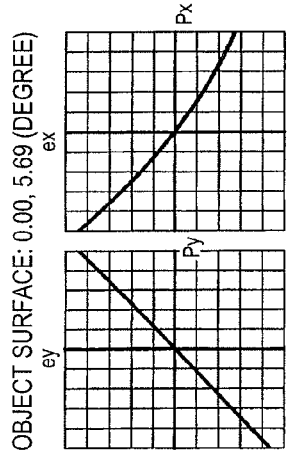
Figure 19C:
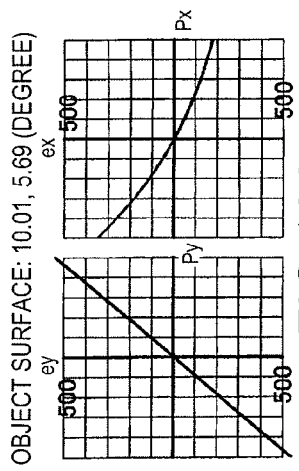
Figure 19D:
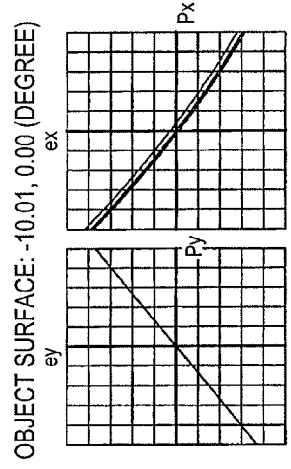
Figure 19E:
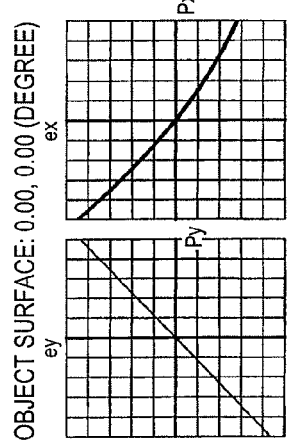
Figure 19F:
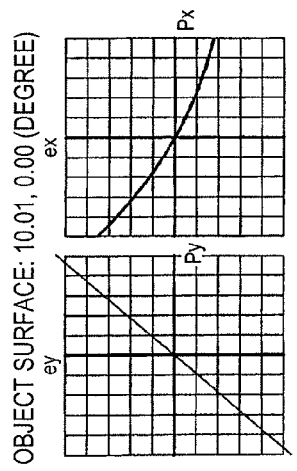
Figure 19G:
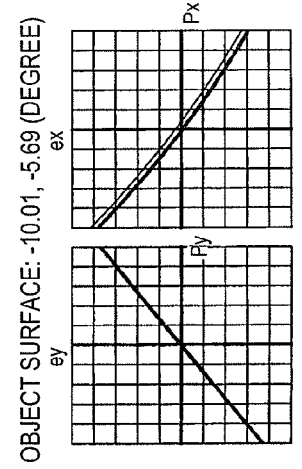
Figure 19H:
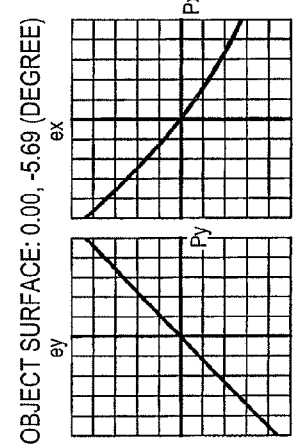
Figure 19I:
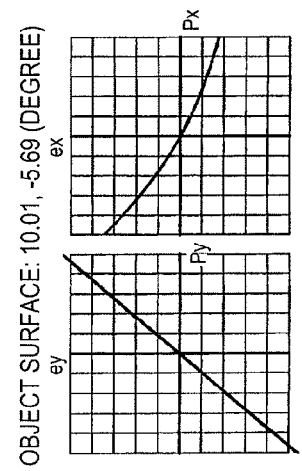

FIGS. 18A to 18I show aberration on the position of the image surface OI which is the reference position of the video display element 82 in the optical system of Example 4. That is, the amount of aberration shown in the respective drawings becomes the amount of aberration in the image surface of the video display element when a light beam is reversed for convenience. In each aberration diagram, the horizontal axis represents a position in a pupil, and the vertical axis represents the amount of aberration in units of micron. Specifically, FIG. 18A shows aberration in the Y and X directions at an azimuth of 10° in the X direction and 5.7° in the Y direction, FIG. 18B shows aberration in the Y and X directions at an azimuth of 0.0° in the X direction and 5.7° in the Y direction, and FIG. 18C shows aberration in the Y and X directions at an azimuth of −10° in the X direction and 5.7° in the Y direction. FIG. 18D shows aberration in the Y and X directions at an azimuth of 10° in the X direction and 0.0° in the Y direction, FIG. 18E shows aberration in the Y and X directions at an azimuth of 0.0° in the X direction and 0.0° in the Y direction, and FIG. 18F shows aberration in the Y and X directions at an azimuth of −10° in the X direction and 0.0° in the Y direction. FIG. 18G shows aberration in the Y and X directions at an azimuth of 10° in the X direction and −5.7° in the Y direction, FIG. 18H shows aberration in the Y and X directions at an azimuth of 0.0° in the X direction and −5.7° in the Y direction, and FIG. 18I shows aberration in the Y and X directions at an azimuth of −10° in the X direction and −5.7° in the Y direction.

FIGS. 19A to 19I show aberration on the position of the intermediate image in the optical system of Example 4. The azimuth in the X direction and the azimuth in the Y direction correspond to FIGS. 18A to 18I.

For example, when comparing the value calculated according to Expression (9) of spreading width W in terms of a spot diagram with aberration shown in FIGS. 18A to 18I, that is, the value of the spreading width Wb with the value calculated according to Expression (9) of the spreading width W in terms of a spot diagram with aberration shown in FIGS. 19A to 19I, that is, the value of the spreading width Wa the spreading width Wa on the position of the image surface II of the intermediate image is greater than 10 times the spreading width Wb on the position of the image surface OI of the video display element 82.

In Example 4, the first surface S11 and the third surface S13 are flat surfaces in parallel with each other, whereby it is possible to set diopter 0 to external light when viewed from the viewpoint of see-through, and in particular, to maintain the magnification in the same state as a naked eye state for visual recognition. At this time, the projection lens 30 includes at least one non-axisymmetric aspheric surface (lens surface 31a). With this, in addition to the light guide member 10, an aberration correction function is also provided in the projection lens 30, whereby it is possible to perform necessary aberration correction even if the first surface S11 and the third surface S13 are parallel flat surfaces.

Example 5

In a projection see-through device of Example 5, data on an optical surface constituting a light guide member and a projection lens is shown in Table 17.

TABLE 17

| No | Type | R | T | Nd | Vd |
|----|------|---|---|----|----|
| 1 | SPH | ∞ | 20.00 | | |
| 2 | FFS1 | — | 5.00 | 1.525 | 55.95 |
| 3 | FFS2 | — | −5.00 | 1.525 | 55.95 |
| 4 | FFS1 | — | 8.50 | 1.525 | 55.95 |
| 5 | FFS3 | — | −12.00 | 1.525 | 55.95 |
| 6 | FFS4 | — | 9.00 | 1.525 | 55.95 |
| 7 | FFS5 | — | −6.20 | 1.525 | 55.95 |
| 8 | FFS6 | — | −2.00 | | |
| 9 | ASP1 | −46.932 | −1.50 | 1.585 | 29.90 |
| 10 | FFS7 | — | −3.23 | | |
| 11 | ASP2 | −6.165 | −4.00 | 1.525 | 55.95 |
| 12 | ASP3 | −19.763 | −3.00 | | |
| 13 | SPH | ∞ | −1.44 | 1.458 | 67.82 |
| 14 | image surface | ∞ | | | |

In regard to the optical surface in the light guide member constituting Example 5, the optical axis inclination angle (tilt) TLY on the cross section and the optical axis deviation (decenter) DCX are shown in Table 18.

TABLE 18

| No | Type | TLY (before surface) | DCX (after surface) | TLY (after surface) |
|----|------|---|---|---|
| 2 | FFS1 | 0.00 | 0.0 | 0.00 |
| 3 | FFS2 | −24.00 | 0.0 | 24.00 |
| 4 | FFS1 | 0.00 | 0.0 | 0.00 |
| 5 | FFS3 | 0.00 | 15.361 | −5.87 |
| 6 | FFS4 | 35.00 | 0.0 | 35.00 |
| 7 | FFS5 | −37.00 | 0.0 | −37.00 |
| 8 | FFS6 | 0.00 | 0.0 | 0.00 |

In regard to each optical surface in the light guide member constituting Example 5, the coefficient expanded as a polynomial of a free-form surface is shown in Table 19. In Table 19, symbols m and n means variables or degrees in the coefficient $Ak_{m,n}$. A symbol FFSk (where k=1 to 6) means a k-th surface among the first to sixth surfaces S11 to S16 which are free-form surfaces. A symbol FFS7 corresponds to a second lens surface 31b (see FIG. 20) which is another lens surface of the first lens 31 among two lenses 31 and 32 constituting the projection lens 30. The lens surface 31b is an aspheric surface asymmetrical to the optical axis.

TABLE 19

| m | n | FFS1 | FFS2 | FFS3 | FFS4 |
|---|---|------|------|------|------|
| 2 | 0 | −9.590E−03 | −1.493E−02 | −9.015E−03 | 1.106E−02 |
| 0 | 2 | −3.895E−02 | −1.718E−02 | −3.174E−02 | −4.225E−02 |
| 3 | 0 | −3.944E−05 | 1.514E−04 | −3.155E−05 | −1.006E−03 |
| 1 | 2 | 7.919E−05 | −5.479E−04 | 6.335E−05 | −1.529E−03 |
| 4 | 0 | 1.802E−05 | −9.117E−06 | −1.873E−05 | 6.325E−05 |
| 2 | 2 | −1.154E−04 | −1.375E−06 | 2.347E−05 | −1.241E−04 |
| 0 | 4 | 2.027E−06 | −8.306E−06 | −3.121E−05 | 3.387E−04 |
| 5 | 0 | −1.163E−06 | 6.691E−07 | 1.423E−07 | 1.841E−05 |
| 3 | 2 | 3.615E−07 | −9.426E−07 | −3.074E−06 | 7.113E−06 |
| 1 | 4 | −8.107E−06 | −3.125E−07 | 2.872E−06 | 8.646E−05 |
| 6 | 0 | 5.687E−08 | −1.366E−08 | 6.812E−09 | −5.296E−06 |
| 4 | 2 | −8.370E−08 | 2.463E−08 | 1.030E−08 | −1.413E−07 |
| 2 | 4 | −5.216E−07 | −2.612E−08 | −2.164E−07 | 1.999E−05 |
| 0 | 6 | 4.183E−08 | −6.074E−08 | −4.753E−08 | −3.325E−06 |

| m | n | FFS5 | FFS6 | FFS7 |
|---|---|------|------|------|
| 2 | 0 | −2.012E−02 | 4.113E−03 | −4.696E−02 |
| 0 | 2 | −2.602E−02 | 1.450E−01 | 8.928E−02 |
| 3 | 0 | 1.762E−04 | −6.809E−03 | 1.596E−03 |
| 1 | 2 | 3.957E−04 | 4.988E−03 | 5.628E−03 |

TABLE 19-continued

| | | | | |
|---|---|---|---|---|
| 4 | 0 | 4.907E−07 | −2.072E−04 | −1.046E−04 |
| 2 | 2 | 1.606E−05 | 7.518E−04 | −2.569E−04 |
| 0 | 4 | 1.968E−04 | −4.126E−03 | 4.836E−03 |
| 5 | 0 | 6.181E−07 | 2.409E−05 | 5.063E−05 |
| 3 | 2 | −2.044E−06 | −2.596E−05 | −2.063E−05 |
| 1 | 4 | 5.215E−06 | 2.987E−04 | −3.074E−04 |
| 6 | 0 | 8.272E−08 | −1.343E−05 | −2.780E−05 |
| 4 | 2 | −2.522E−06 | −3.140E−05 | −1.312E−04 |
| 2 | 4 | 2.747E−05 | 5.979E−05 | −4.072E−04 |
| 0 | 6 | −9.104E−05 | 4.539E−04 | −1.536E−03 |

Coefficients of an aspheric surface of the optical surface constituting the projection lens in the projection see-through device of Example 5 are shown in Table 20.

TABLE 20

| | ASP1 | ASP2 | ASP3 |
|---|---|---|---|
| K | −1 | −1 | −1 |
| B4 | 1.730E−05 | 3.985E−04 | 3.628E−04 |
| B6 | −4.292E−05 | −1.324E−05 | −2.023E−05 |
| B8 | 4.667E−07 | 1.089E−07 | 3.764E−07 |

In Table 20, symbols K and Bi represent coefficients for specifying aspheric surfaces of aspheric surfaces APS1 to APS3 which are lens surfaces excluding the second lens surface 31$b$ of the lens 31, that is, the surface of the symbol FFS7 among the two lenses 31 and 32 constituting the projection lens 30.

Figure 20:
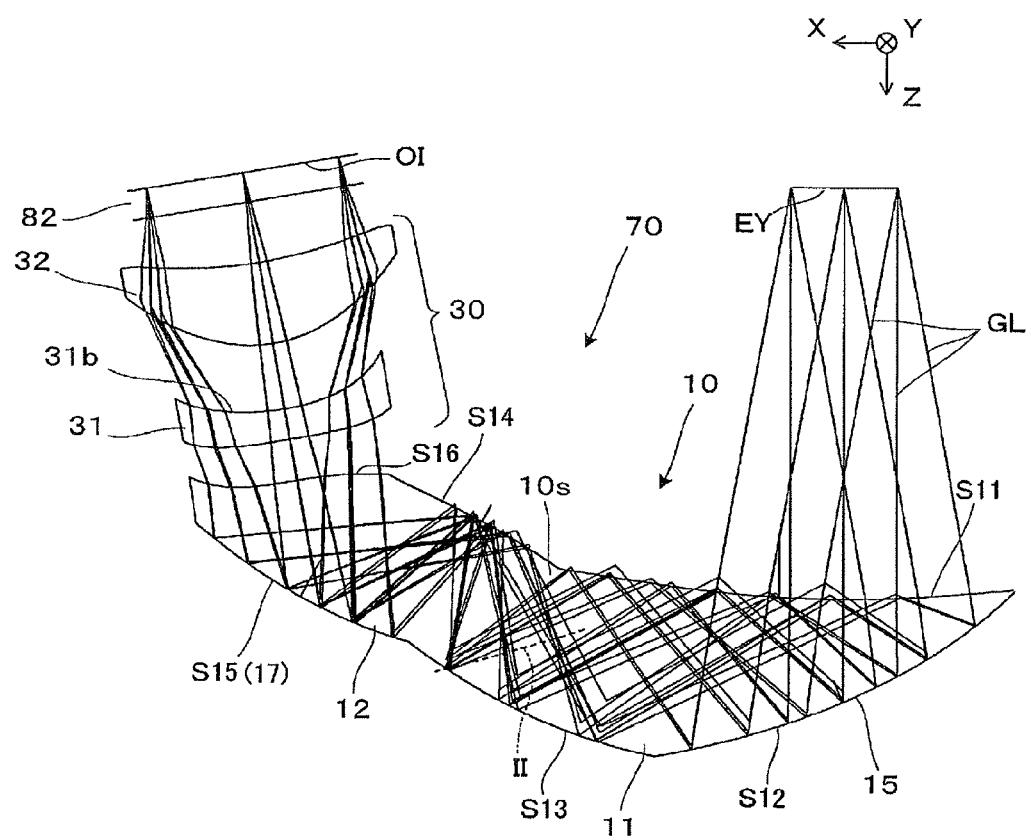
FIG. 20 is a diagram illustrating an optical system of Example 5.

FIG. 20 is a sectional view of the projection see-through device 70 of Example 5. In the projection see-through device 70, the light guide member 10 includes the first surface S11 having weak negative refractive power, the second surface S12 having comparatively strong positive refractive power, the third surface S13 having comparatively weak positive refractive power, the fourth surface S14 having comparatively weak positive refractive power, the fifth surface S15 having comparatively strong positive refractive power, and the sixth surface S16 having comparatively strong positive refractive power. The projection lens 30 includes the first lens 31 having negative refractive power, and the second lens 31 having positive refractive power. A specific specification of the optical system of Example 5 is as follows. A horizontal viewing angle is 20.1°, a vertical viewing angle is 11.4°, the size of a display area of the video display element is 9.22×5.18 mm, a pupil diameter is 5 mm, and a focal distance is about 26 mm.

Figure 21A:
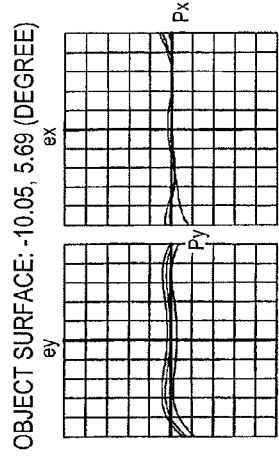
FIGS. 21A, 21B, 21C, 21D, 21E, 21F, 21G, 21H, and 21I are diagrams illustrating an aberration on a reference position of a video element in the optical system of Example 5.
Figure 21B:
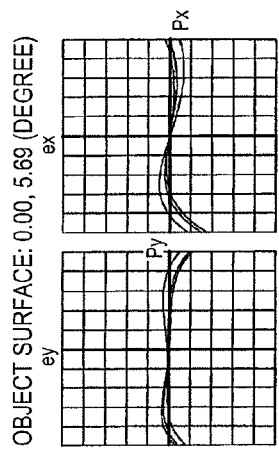
Figure 21C:
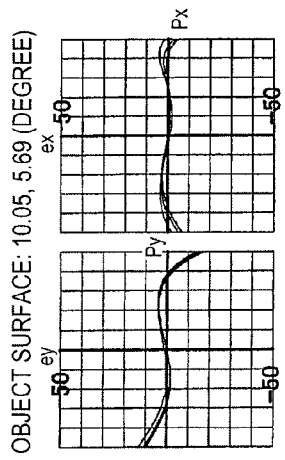
Figure 21D:
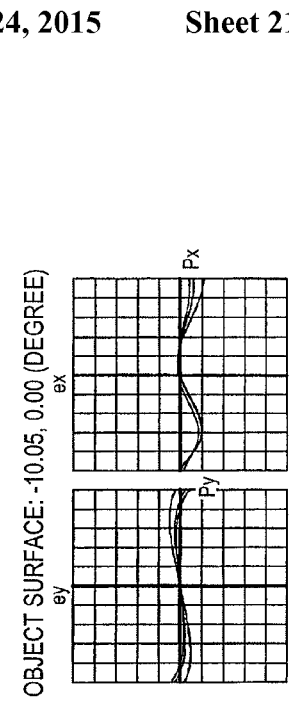
Figure 21E:
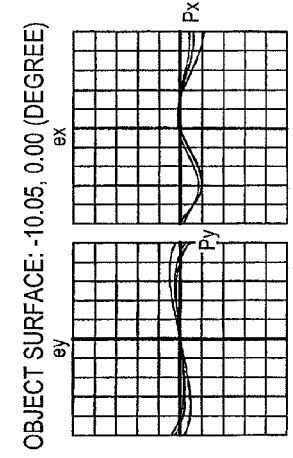
Figure 21F:
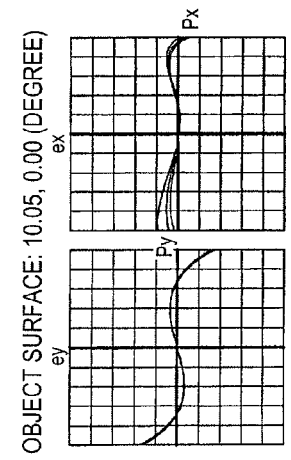
Figure 21G:
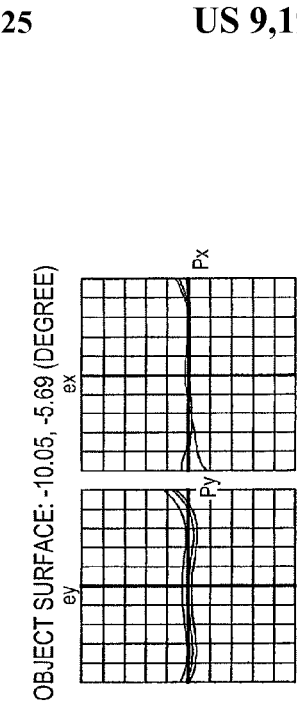
Figure 21H:
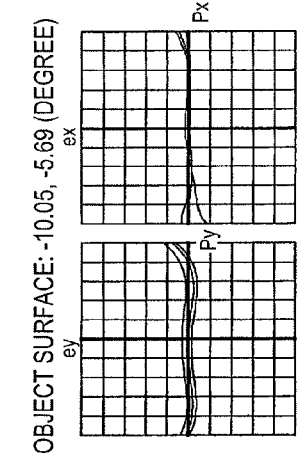
Figure 21I:
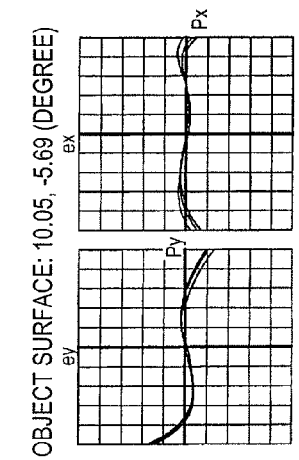
Figure 22C:
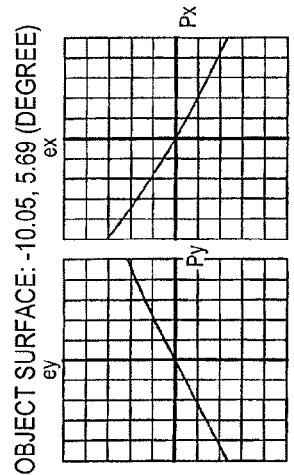
FIGS. 22A, 22B, 22C, 22D, 22E, 22F, 22G, 22H, and 22I are diagrams illustrating an aberration on a position of an intermediate image in the optical system of Example 5.
Figure 22F:
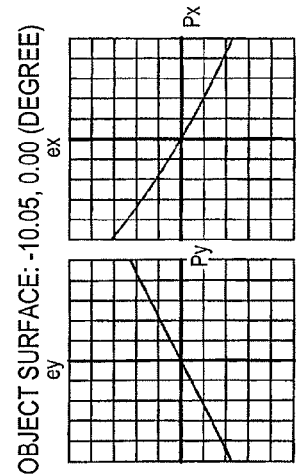
Figure 22I:
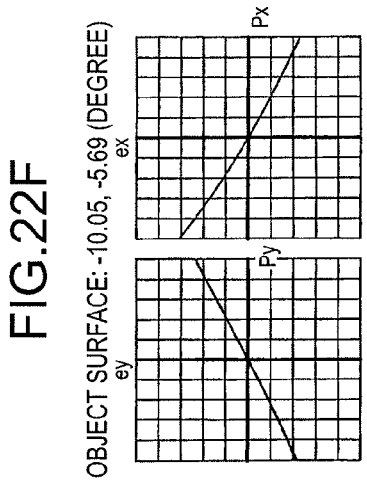
Figure 22B:
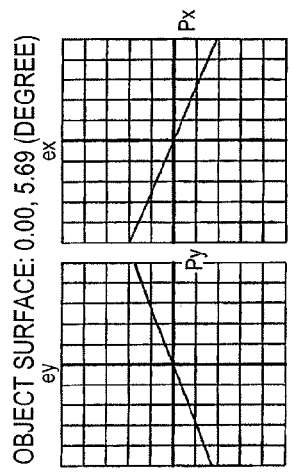
Figure 22E:
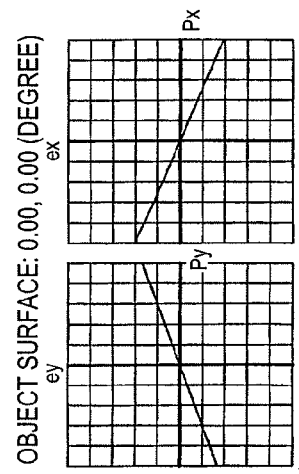
Figure 22H:
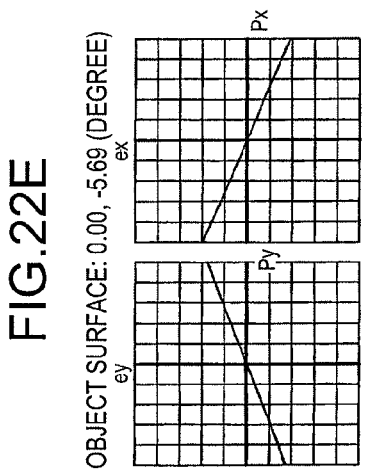
Figure 22A:
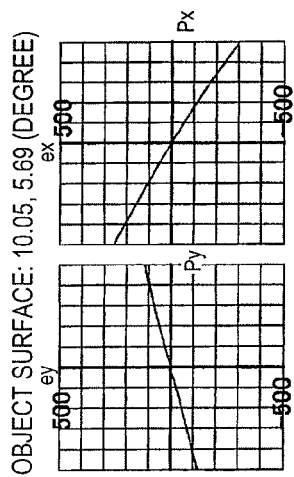
Figure 22D:
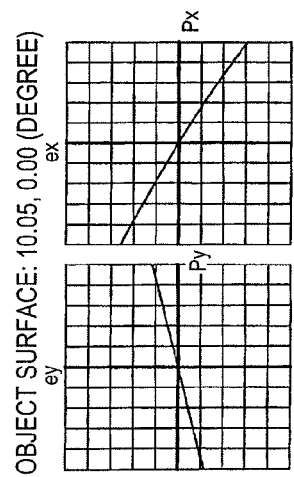
Figure 22G:
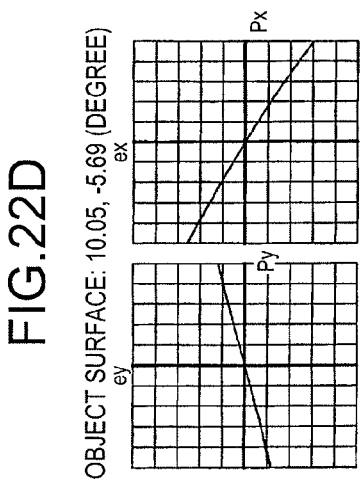

FIGS. 21A to 21I show aberration on the position of the image surface OI which is the reference position of the video display element 82 in the optical system of Example 5. That is, the amount of aberration shown in the respective drawings becomes the amount of aberration in the image surface of the video display element when a light beam is reversed for convenience. In each aberration diagram, the horizontal axis represents a position in a pupil, and the vertical axis represents the amount of aberration in units of micron. Specifically, FIG. 21A shows aberration in the Y and X directions at an azimuth of 10° in the X direction and 5.7° in the Y direction, FIG. 21B shows aberration in the Y and X directions at an azimuth of 0.0° in the X direction and 5.7° in the Y direction, and FIG. 21C shows aberration in the Y and X directions at an azimuth of −10° in the X direction and 5.7° in the Y direction. FIG. 21D shows aberration in the Y and X directions at an azimuth of 10° in the X direction and 0.0° in the Y direction, FIG. 21E shows aberration in the Y and X directions at an azimuth of 0.0° in the X direction and 0.0° in the Y direction, and FIG. 21F shows aberration in the Y and X directions at an azimuth of −10° in the X direction and 0.0° in the Y direction. FIG. 21G shows aberration in the Y and X directions at an azimuth of 10° in the X direction and −5.7° in the Y direction, FIG. 21H shows aberration in the Y and X directions at an azimuth of 0.0° in the X direction and −5.7° in the Y direction, and FIG. 21I shows aberration in the Y and X directions at an azimuth of −10° in the X direction and −5.7° in the Y direction.

FIGS. 22A to 22I show aberration on the position of the intermediate image in the optical system of Example 5. The azimuth in the X direction and the azimuth in the Y direction correspond to FIGS. 21A to 21I.

For example, when comparing the value calculated according to Expression (9) of spreading width W in terms of a spot diagram with aberration shown in FIGS. 21A to 21I, that is, the value of the spreading width Wb with the value calculated according to Expression (9) of the spreading width W in terms of a spot diagram with aberration shown in FIGS. 22A to 22I, that is, the value of the spreading width Wa the spreading width Wa on the position of the image surface II of the intermediate image is greater than 10 times the spreading width Wb on the position of the image surface OI of the video display element 82.

In regard to Examples 1 to 5, numerical data relating to the conditional expressions (1) to (3) is summarized in Table 21.

TABLE 21

| | coefficient value or condition value | Example 1 | Example 2 | Example 3 | Example 4 | Example 5 |
|---|---|---|---|---|---|---|
| | $A1_{2,0}$ | −6.070E−03 | −4.110E−03 | −1.254E−02 | 0.000E+00 | −9.590E−03 |
| | $A1_{0,2}$ | −6.428E−03 | −6.261E−03 | −1.031E−02 | 0.000E+00 | −3.895E−02 |
| | $A3_{2,0}$ | −5.518E−03 | −3.798E−03 | −1.191E−02 | 0.000E+00 | −9.015E−03 |
| | $A3_{0,2}$ | −5.843E−03 | −5.949E−03 | −9.899E−03 | 0.000E+00 | −3.174E−02 |
| conditional expression (1) | $A1_{2,0} + A1_{0,2}$ | −1.2E−02 | −1.0E−02 | −2.3E−02 | 0.0E+00 | −4.9E−02 |
| conditional expression (1) | $A3_{2,0} + A3_{0,2}$ | −1.1E−02 | −9.7E−03 | −2.2E−03 | 0.0E+00 | −4.1E−02 |
| conditional expression (2) | $\|A1_{2,0} - A1_{0,2}\|$ | 3.6E−04 | 2.2E−03 | 2.2E−03 | 0.0E−00 | 2.9E−02 |
| conditional expression (2) | $\|A3_{2,0} - A3_{0,2}\|$ | 3.3E−04 | 2.2E−03 | 2.0E−03 | 0.0E−00 | 2.3E−02 |
| conditional expression (3) | $\|A1_{2,0} - A3_{2,0}\|$ | 5.5E−04 | 3.1E−04 | 6.3E−04 | 0.0E−00 | 5.8E−04 |
| conditional expression (3) | $\|A1_{0,2} - A3_{0,2}\|$ | 5.8E−04 | 3.1E−04 | 4.1E−04 | 0.0E−00 | 7.2E−03 |

In regard to Examples 1 to 5, numerical data relating to the interval between the first surface S11 and the third surface S13 and the inclination angle of the second surface S12 with respect to the first surface S11 is summarized in Table 22.

TABLE 22

|  | Example 1 | Example 2 | Example 3 | Example 4 | Example 5 |
|---|---|---|---|---|---|
| interval (mm) between S11 and S13 | 10.00 | 10.00 | 9.00 | 10.00 | 8.50 |
| inclination angle (°) of S12 with respect to S11 | 28 | 29 | 26 | 23.8 | 24 |

The conditional expression (3) affects diopter of the light guide member with respect to external light, and if the thickness of the light guide member is T and the refractive index is N, diopter Dx in the x-axis direction and diopter Dy in the y-axis direction on the optical axis of the light guide member are given by the following expressions.

$$Dx = 2000(N-1)(A1_{2,0} - A3_{2,0}) + (2T(N-1)/N) \times A1_{2,0} \times A3_{2,0})$$

$$Dy = 2000(N-1)(A1_{0,2} - A3_{0,2}) + (2T(N-1)/N) \times A1_{0,2} \times A3_{0,2})$$

In regard to Examples 1 to 5, numerical data relating to diopter is summarized in Table 23 based on the above-described expressions.

TABLE 23

|  | Example 1 | Example 2 | Example 3 | Example 4 | Example 5 |
|---|---|---|---|---|---|
| diopter Dx (D: diopter) | −0.34 | −0.21 | 0.31 | 0.00 | −0.07 |
| diopter Dy (D: diopter) | −0.34 | −0.06 | 0.23 | 0.00 | 0.03 |
| prism thickness T (mm) | 10 | 10 | 9 | 10 | 8.5 |
| refractive index N | 1.525 | 1.525 | 1.525 | 1.525 | 1.525 |

In regard to Examples 1 to 5, as the numerals values related to the spreading width W, the values of the spreading width Wb on each position of the image surface OI of the video display element 82 (for example, in Example 1, the positions corresponding to FIGS. 9A to 9F) and the spreading width Wa on each position of the image surface II of the intermediate image (for example, in Example 1, the positions corresponding to FIGS. 10A to 10F). In all examples, it is understood that the spreading width Wa is greater than 10 times the spreading width Wb. That is, the value of the ratio Wa/Wb is greater than 10. In the respective examples, the value of the spreading width Wb is sufficiently small and the degree of spreading within a range of a light flux cross-section accompanied by blur is kept to be equal to or less than the size of the pixel, whereby an image substantially having no blur is formed.

TABLE 24

| azimuth (visual field) | | Example 1 | | | Example 2 | | |
|---|---|---|---|---|---|---|---|
| | | | | ratio | | | ratio |
| x | y | Wb | Wa | (Wa/Wb) | Wb | Wa | (Wa/Wb) |
| 10.0 | 5.7 | 5.97 | 253.17 | 42.4 | 2.12 | 100.39 | 47.4 |
| 0.0 | 5.7 | 5.98 | 174.82 | 29.2 | 2.28 | 93.44 | 41.0 |
| −10.0 | 5.7 | 3.58 | 120.33 | 33.6 | 2.32 | 41.01 | 17.7 |
| 10.0 | 0.0 | 3.80 | 249.15 | 65.6 | 1.89 | 95.97 | 50.8 |
| 0.0 | 0.0 | 4.31 | 179.44 | 41.6 | 1.21 | 85.55 | 70.7 |
| −10.0 | 0.0 | 3.97 | 129.91 | 32.7 | 2.10 | 37.91 | 18.1 |

| azimuth (visual field) | | Example 3 | | | Example 4 | | |
|---|---|---|---|---|---|---|---|
| | | | | ratio | | | ratio |
| x | y | Wb | Wa | (Wa/Wb) | Wb | Wa | (Wa/Wb) |
| 10.0 | 5.7 | 5.83 | 94.36 | 16.2 | 6.01 | 326.11 | 54.3 |
| 0.0 | 5.7 | 4.99 | 94.10 | 18.9 | 6.90 | 309.87 | 44.9 |
| −10.0 | 5.7 | 4.52 | 148.61 | 32.9 | 7.78 | 277.40 | 35.7 |
| 10.0 | 0.0 | 4.25 | 88.16 | 20.7 | 5.98 | 323.13 | 54.0 |
| 0.0 | 0.0 | 4.01 | 99.85 | 24.9 | 6.06 | 307.52 | 50.7 |
| −10.0 | 0.0 | 6.11 | 139.54 | 22.8 | 7.34 | 273.83 | 37.3 |

| azimuth (visual field) | | Example 5 | | |
|---|---|---|---|---|
| | | | | ratio |
| x | y | Wb | Wa | (Wa/Wb) |
| 10.0 | 5.7 | 5.55 | 658.94 | 118.7 |
| 0.0 | 5.7 | 5.15 | 566.88 | 110.1 |
| −10.0 | 5.7 | 4.26 | 759.07 | 178.2 |
| 10.0 | 0.0 | 6.98 | 654.16 | 93.7 |
| 0.0 | 0.0 | 4.59 | 557.06 | 121.4 |
| −10.0 | 0.0 | 6.00 | 761.76 | 127.0 |

Figure 23:
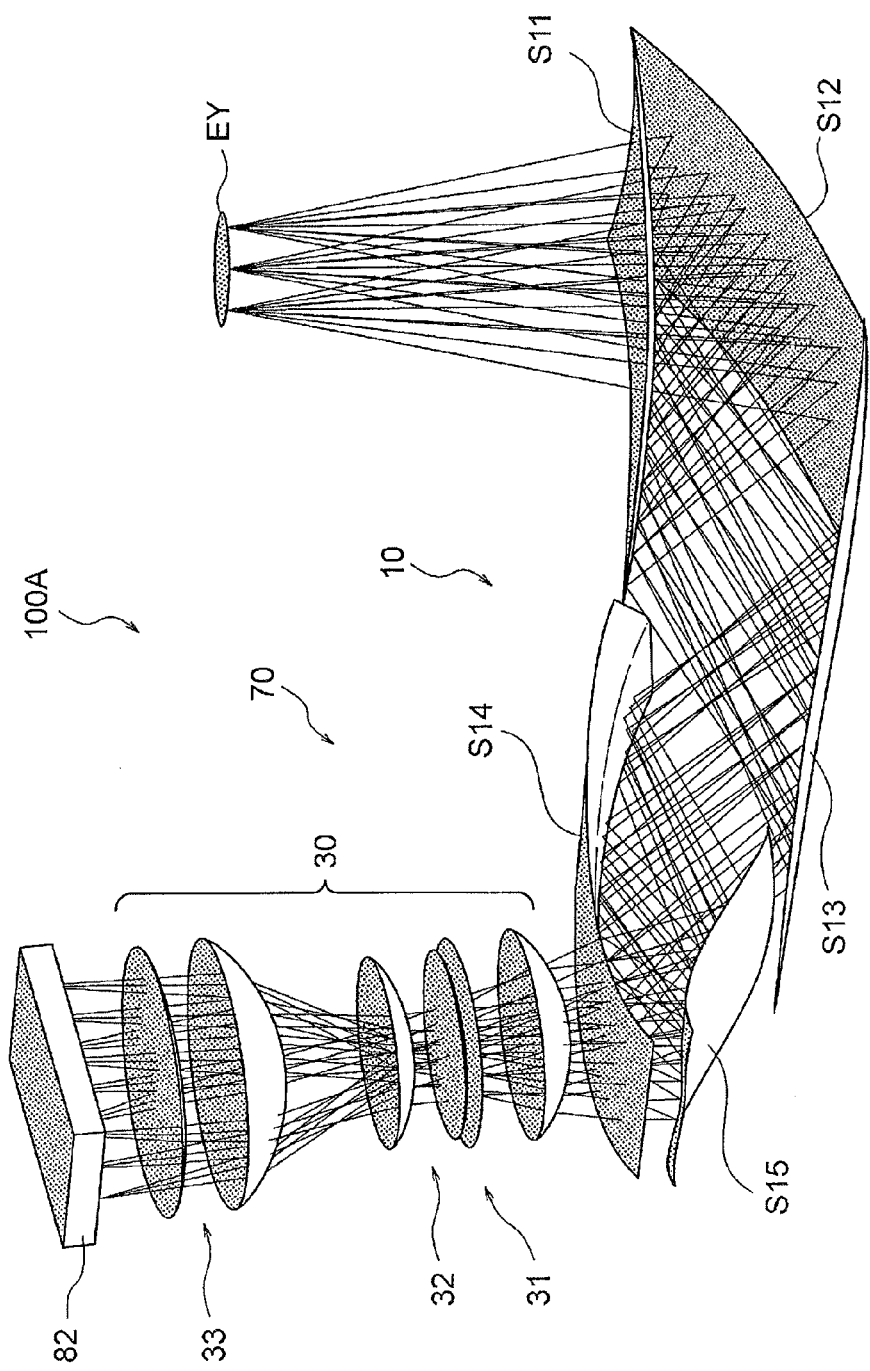
FIG. 23 is a perspective view showing each surface of an optical system for an example of a virtual image display apparatus according to one embodiment.

FIG. 23 is a perspective view showing respective surfaces of an optical system in regard to an example (corresponding to Example 1) of a virtual image display apparatus. As shown in the drawing, in the light guide member 10 of the virtual image display apparatus 100, it is understood that respective surfaces S11 to S15 having an optical function or lens surfaces constituting the projection lens 30 are curved surfaces which have curvature in the X and Y directions, and in particular, many of the surfaces constituting the light guide member 10 are free-form surfaces different in curvature between the X direction and the Y direction. This shape is provided, making it possible to perform optical path adjustment of desired video light or aberration correction. Though not shown in perspective view, in the respective examples other than Example 1, similarly, many of the surfaces constituting the light guide member 10 are free-form surfaces which have curvature in the X and Y directions. However, as described above, some of these surfaces may be flat surfaces.

Others

Although the invention has been described on the basis of the foregoing embodiment, the invention is not limited to the foregoing embodiment, and may be realized in various forms without departing from the spirit of the invention. For example, the following modifications may be made.

In the above description, although the origin of a local coordinate on an opposite-sign curvature curved surface is an opposite-sign curvature point, an opposite-sign curvature curved surface on which a different point is an opposite-sign curvature point may be used.

In the above description, although the half mirror layer (transflective film) 15 is formed in a horizontal rectangular area, the contour of the half mirror layer 15 may be appropriately changed according to usages and other specifications. The transmittance or reflectance of the half mirror layer 15 may be changed according to usages and others.

In the above description, although the distribution of display luminance in the video display element 82 is not particularly adjusted, when a luminance difference occurs depending on position, or the like, the distribution of display luminance may be adjusted unevenly or the like.

In the above description, although the video display element 82 which includes a transmissive liquid crystal display or the like is used as the image display device 80, the image display device 80 is not limited to the video display element 82 which includes a transmissive liquid crystal device or the like, and various devices may be used. For example, a configuration using a reflective liquid crystal display may be made, or a digital micro-mirror device or the like may be used, instead of the video display element 82 which includes the liquid crystal display or the like. A self-luminous element represented by an LED array or an OLED (organic EL) may be used as the image display device 80.

In the foregoing embodiment, although the image display device 80 which includes a transmissive liquid crystal display or the like is used, alternatively, a scanning image display device may be used.

Figure 24:
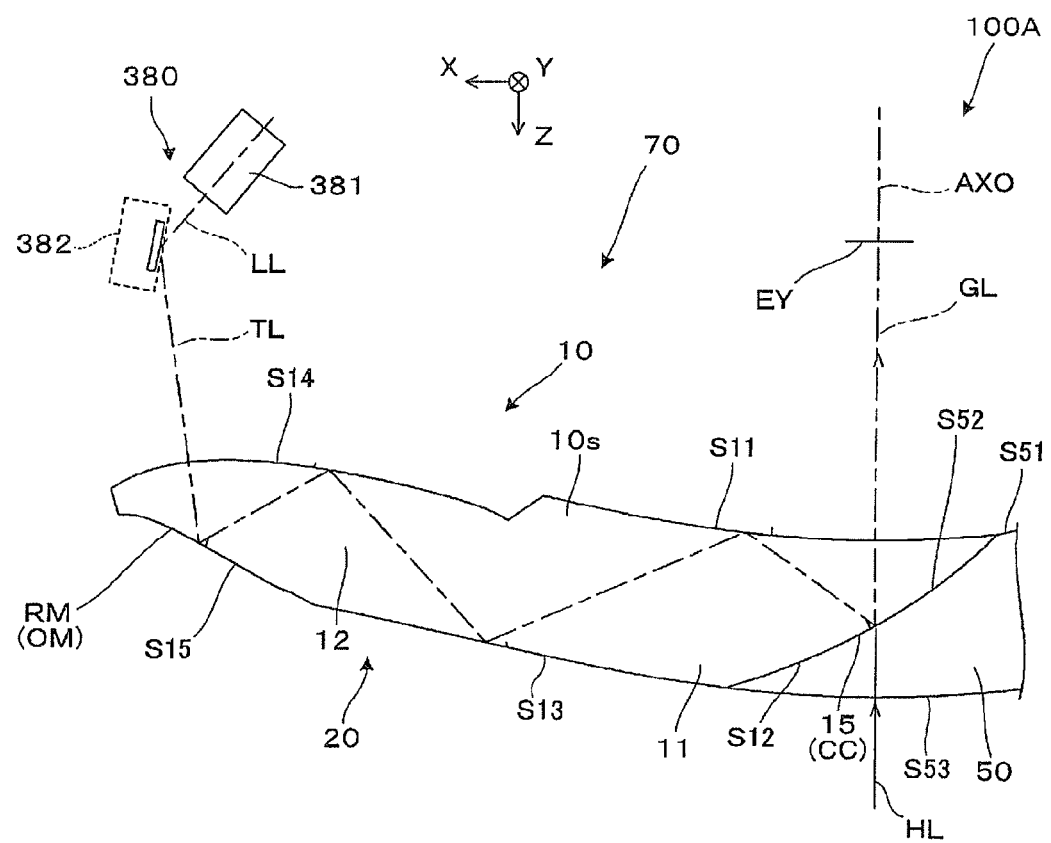
FIG. 24 is a diagram illustrating a virtual image display apparatus of a modification example according to one embodiment.

Specifically, as shown in FIG. 24, a first display device 100A which is a virtual image display apparatus includes a light guide device 20 and an image display device 380. The light guide device 20 corresponds to a first optical portion 103a in FIG. 1 of the foregoing embodiment, that is, corresponds to a portion where the light guide member 10 and the light transmission member 50 are bonded, thus, description thereof will be omitted. The image display device 380 is a device which forms signal light subjected to intensity modulation and emits signal light as scanning light TL, and has a signal light forming unit 381 and a scanning optical system 382.

The signal light forming unit 381 includes a light source, and emits signal light LL which is modulated and formed based on a control signal from a control circuit (not shown). The scanning optical system 382 scans and emits signal light LL passing through the signal light forming unit 381. Here, the scanning optical system 382 includes an MEMS mirror or the like, and performs two-dimensional scanning longitudinally and transversely changing the emission angle of a light beam (scanning light TL) by changing a posture in synchronization with modulation of signal light LL by the signal light forming unit 381 to adjust the optical path of signal light LL. With the above, the image display device 380 makes scanning light TL to be video light GL enter the light guide device 20, and makes scanning light TL scan the entire partial area of the second surface S12 in which the half mirror layer 15 is formed.

An operation of the first display device 100A shown in the drawing will be described. The image display device 380 emits signal light LL toward the fourth surface S14 as the light incidence surface of the light guide device 20 as scanning light TL as described above. The light guide device 20 guides scanning light TL passing through the fourth surface S14 due to total reflection or the like therein and makes scanning light TL reach the half mirror layer 15. At this time, scanning light TL is scanned on the surface of the half mirror layer 15, whereby a virtual image is formed by video light GL as a trace of scanning light TL. A person who mounts the apparatus captures the virtual image by the eye EY to visually recognize an image.

Figure 25A:
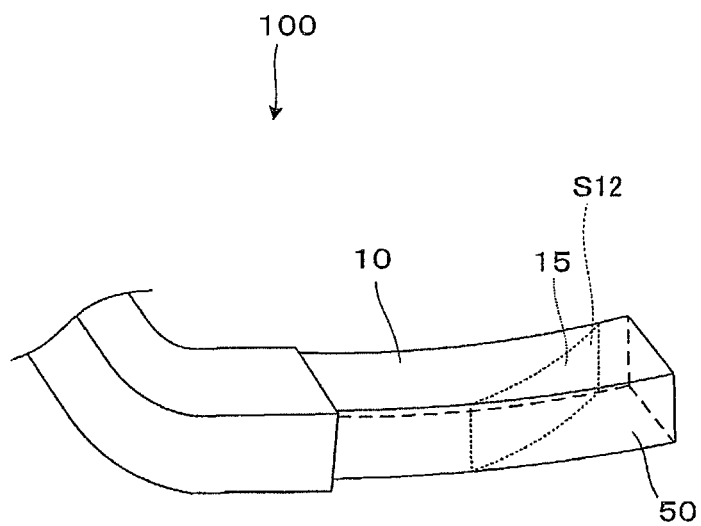
FIG. 25A is a perspective view illustrating another example of a light guide device and a virtual image display apparatus using the light guide device.
Figure 25B:
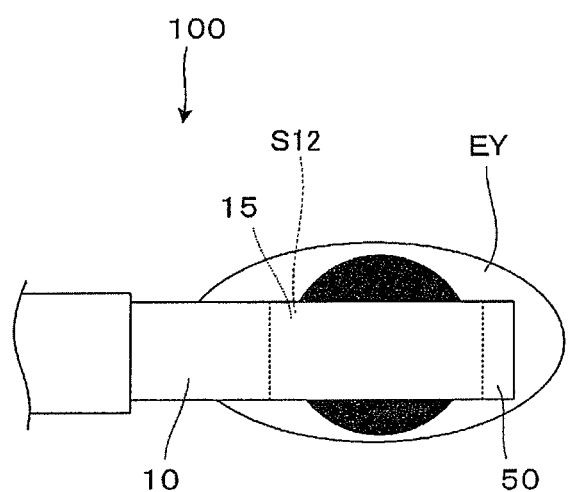
FIG. 25B is a front view thereof.

In the foregoing embodiment, although the light guide member 10 and the light transmission member 50 which is the auxiliary optical block are configured to cover the entire front of the eye EY of the observer, the invention is not limited thereto, and for example, as shown in FIGS. 25A and 25B, a small configuration may be made in which a portion including the second surface S12, which is a curved surface shape having the half mirror layer 15, covers only a part of the eye EY, that is, covers a part of the front of the eye, and an uncovered portion is provided. In this case, even with a configuration in which the light guide member 10 and the light transmission member 50 are sufficiently small and a mirror for total reflection is arranged instead of the half mirror layer 15 without using the see-through manner, a person who mounts the apparatus can observe an external scene in the vicinity of the light guide member 10 and the light transmission member 50. In the case shown in the drawing, although the half mirror layer 15 is formed on the entire second surface S12 or the substantially entire second surface S12, the half mirror layer 15 may be formed only on a part of the second surface S12. In the example of FIG. 25B, although the half mirror layer 15 is arranged substantially in front of the eye EY, the half mirror layer 15 may be arranged to be shifted from the front, and the observer may move the eyes to visually recognize an image. For example, the position of the eye EY may be slightly lowered (the position of the light guide member 10 and the light transmission member 50 is slightly raised). In this case, the lower half of the eye EY is in a state of being viewed from the bottom of the light guide member 10 and the light transmission member 50.

In the above description, although the virtual image display apparatus 100 including a pair of display devices 100A and 100B has been described, a single display device may be provided. That is, a configuration may be made in which the projection see-through device 70 and the image display device 80 are provided only for either the right eye or the left eye to view an image with a single eye, instead of providing the set of the projection see-through device 70 and the image display device 80 for each of both the right eye and the left eye.

In the above description, although the interval between a pair of display devices 100A and 100B in the X direction has not been described, the interval between both display devices 100A and 100B is not limited to a fixed interval, and the interval may be adjusted by a mechanical mechanism or the like. That is, the interval between both display devices 100A and 100B in the X direction may be adjusted according to the eye width of the observer or the like.

In the foregoing description, although the half mirror layer 15 is a simple semitransmissive film (for example, a metal reflection film or a dielectric multilayer film), the half mirror layer 15 may be replaced with a flat or curved hologram element.

In the above description, although video light is totally reflected by an interface with air and guided without providing a mirror, a half mirror, or the like on the first surface S11 and the third surface S13 of the light guide member 10, it is assumed that total reflection in the virtual image display apparatus 100 according to the invention includes reflection by a mirror coating or a half mirror film which is formed on the entire or a part of the first surface S11 or the third surface S13. For example, total reflection may include a case where, after the incidence angle of image light satisfies the total reflection condition, the mirror coating or the like is formed on the entire or a part of the first surface S11 or the third surface S13 to reflect substantially entire image light. Furthermore, the entire or a part of the first surface S11 or the third surface S13 may be coated with a mirror having a slight transmission property insofar as sufficiently bright image light can be obtained.

In the above description, although the light guide member 10 or the like extends in the horizontal direction in which the eyes EY are arranged, the light guide member 10 may be arranged to extend in the vertical direction. In this case, the light guide member 10 has a structure of being arranged in parallel, not in series. The configurations relating to the vertical direction and the horizontal direction may be appropriately replaced according to the direction in which video light (image light) is guided compared to the case in the above description.

What is claimed is:

1. A virtual image display apparatus comprising:
   a light guide member which includes two or more non-axisymmetric curved surfaces and is a part of an optical system, an intermediate image being formed inside the light guide member, wherein the light guide member comprises;
   a first surface; and
   a third surface arranged to face the first surface; and
   a video element which generates video light that is totally reflected by the third surface, is totally reflected by the first surface, is reflected by a second surface, is transmitted through the first surface, and reaches an eye of an observer to provide video to the observer,
   wherein in regard to a light flux reversed with respect to an advancing direction of video light from a position of an incidence pupil to be assumed as a position where the eyes of the observer are arranged toward an arbitrary point of video, a spreading width of the light flux at each position within a whole range excluding the vicinity of the video element is greater than a spreading width of the light flux on the video element.

2. The virtual image display apparatus according to claim 1,
   wherein the light guide member is configured to have a surface shape such that diopter to external light is substantially zero when the observer visually recognizes an external scene through the first surface and the third surface.

3. The virtual image display apparatus according to claim 1,
   wherein, when making a light beam reversed from the advancement of video light entering from the position of the incidence pupil and evaluating the spreading of a light flux imaged on the video element, if the spreading width W of the light flux on a surface at an arbitrary position orthogonal to an optical axis is given by the following expressions at positions $(x_1,y_1), (x_2,y_2), \ldots,$ and $(x_n,y_n)$ on each image surface of n light beams reversely tracked from the position of the incidence pupil, $$W = \sqrt{\frac{1}{n}\sum_{i=1}^{n}\{(x_i - \tilde{x})^2 + (y_i - \tilde{y})^2\}}$$

$$\tilde{x} = \frac{1}{n}\sum_{i=1}^{n}x_i, \tilde{y} = \frac{1}{n}\sum_{i=1}^{n}y_i$$

the spreading width Wa of the light flux at each position within the whole range excluding the vicinity of the video element and the spreading width Wb of the light flux on the position of the image surface of the video element satisfy 10Wb<Wa within a whole viewing angle range.

4. The virtual image display apparatus according to claim 1,
   wherein the video element is a video display element which has a plurality of pixels, and
   the spreading width on the position of the image surface of the video element has a value corresponding to the size of the pixel.

5. The virtual image display apparatus according to claim 1,
   wherein, when an expression of a surface shape is expanded as a polynomial in terms of orthogonal coordinates x and y extending in a tangential direction from the origin with the origin of each surface constituting the optical system as a reference, and the coefficient of a term $x^m \cdot y^n$ of a polynomial expression representing a k-th surface is $Ak_{m,n}$, the following conditions of (1) to (3):

$$-10^{-1}<A1_{0,2}+A1_{2,0}<10^{-2} \text{ and } -10^{-1}<A3_{0,2}+A3_{2,0}<10^{-2} \quad (1)$$

$$|A1_{2,0}-A1_{0,2}|<10^{-1} \text{ and } |A3_{2,0}-A3_{0,2}|<10^{-1} \quad (2)$$

$$|A1_{2,0}-A3_{2,0}|<10^{-2} \text{ and } |A1_{0,2}-A3_{0,2}|<10^{-2} \quad (3)$$

are satisfied.

6. The virtual image display apparatus according to claim 1,
   wherein a half mirror is formed on the second surface, video light is provided to an observer, a light transmission member is arranged integrally outside the second surface, diopter to external light is substantially set to zero, and external light and video light are provided to the observer in an overlapping manner.

7. The virtual image display apparatus according to claim 1, further comprising:
   a projection lens which makes video light from the video element enter the light guide member,
   wherein the projection lens is constituted by an axisymmetric lens and includes at least one aspheric surface.

8. The virtual image display apparatus according to claim 1, further comprising:
   a projection lens which makes video light from the video element enter the light guide member,
   wherein the projection lens includes at least one non-asymmetric aspheric surface.

9. The virtual image display apparatus according to claim 1,
   wherein the optical system including the light guide member covers a part in front of the eyes of the observer when it is worn, and a portion where the front of the eyes is not covered is provided.

10. The virtual image display apparatus according to claim 1,
    wherein the video element comprises:
    a signal light forming unit which emits signal light modulated corresponding to an image, and
    a scanning optical system which scans signal light entering from the signal light forming unit to emit signal light as scanning light.

11. A virtual image display apparatus comprising:
    a light guide member which includes two or more non-axisymmetric curved surfaces and is a part of an optical system, an intermediate image being formed inside the light guide member, the light guide member comprising:

a first surface; and
a third surface that is arranged to face the first surface; and
a video element which generates video light that is totally reflected by the third surface, is totally reflected by the first surface, is reflected by a second surface, is transmitted through the first surface, and reaches an observation side,
wherein a first condensing position where video light is most condensed in a first optical axis direction when light flux of video light is cut in a first direction and a second condensing position where video light is most condensed in a second optical axis direction when cut in a second direction orthogonal to the first direction, wherein the first and second directions are separated from a position relating to the optical axis direction of the image surface of the intermediate image, and
wherein a length of the distance between the first condensing position to the second condensing position is greater than a total length of a width of the light flux relating to the first direction at the first condensing position and a width of the light flux relating to the second direction at the second condensing position.

12. A virtual image display apparatus comprising:
a light guide member configured to form an intermediate image therein and comprising:
a first surface; and
a third surface arranged with the first surface so that the first and third surfaces face each other; and
a video element which generates light that is reflected by the third surface, is reflected by the first surface, is reflected by a second surface, is transmitted through the first surface, and then reaches an observation side,
wherein when a light flux is reversed with respect to an advancing direction of light from a position of an incidence pupil, a spreading width of the light flux at each position within the light guide member is greater than a spreading width of the light flux on the video element.

\* \* \* \* \*